US006434223B2

(12) United States Patent
Katz

(10) Patent No.: US 6,434,223 B2
(45) Date of Patent: *Aug. 13, 2002

(54) TELEPHONE INTERFACE CALL PROCESSING SYSTEM WITH CALL SELECTIVITY

(75) Inventor: Ronald A. Katz, Los Angeles, CA (US)

(73) Assignee: Ronald A. Katz Technology Licensing, L.P., Los Angeles, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/313,120

(22) Filed: May 17, 1999

Related U.S. Application Data

(63) Continuation of application No. 08/480,185, filed on Jun. 7, 1995, now Pat. No. 5,974,120, which is a continuation of application No. 08/132,062, filed on Oct. 4, 1993, now Pat. No. 5,828,734, which is a continuation of application No. 07/779,762, filed on Oct. 21, 1991, now Pat. No. 5,251,252, which is a continuation of application No. 07/425,779, filed on Oct. 23, 1989, now Pat. No. 5,128,984, which is a continuation-in-part of application No. 07/312,792, filed on Feb. 21, 1989, now Pat. No. 5,073,929, which is a continuation-in-part of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned, said application No. 08/132,062, is a continuation-in-part of application No. 08/306,751, filed on Sep. 14, 1994, which is a continuation of application No. 08/047,241, filed on Apr. 13, 1993, now Pat. No. 5,351,285, which is a continuation of application No. 07/509,691, filed on Apr. 16, 1990, now abandoned, and a continuation-in-part of application No. 07/640,337, filed on Jan. 11, 1991, now abandoned, which is a continuation of application No. 07/335,923, filed on Apr. 10, 1989, now Pat. No. 6,016,334, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned, said application No. 07/509,691, is a continuation-in-part of application No. 07/260,104, filed on Oct. 20, 1998, now Pat. No. 4,930,150, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned, said application No. 08/132,062, is a continuation-in-part of application No. 07/335,923, filed on Apr. 10, 1989, now Pat. No. 6,016,344, which is a continuation of application No. 07/194,258, filed on May 16, 1988, now Pat. No. 4,845,739, which is a continuation-in-part of application No. 07/018,244, filed on Feb. 27, 1987, now Pat. No. 4,792,968, which is a continuation-in-part of application No. 06/753,299, filed on Jul. 10, 1985, now abandoned.

(51) Int. Cl.[7] .............................................. H04M 11/00
(52) U.S. Cl. .................................... 379/93.13; 379/93.02
(58) Field of Search ........................... 379/93.13, 88.01, 379/88.19, 88.2, 93.02, 93.03, 91.01, 91.02, 93.26

(56) References Cited

U.S. PATENT DOCUMENTS

| | | |
|---|---|---|
| 2,902,541 A | 9/1959 | Singleton |
| 2,941,161 A | 6/1960 | Scantlin |
| 3,060,275 A | 10/1962 | Meacham et al. |
| 3,076,059 A | 1/1963 | Meacham et al. |
| 3,082,402 A | 3/1963 | Scantlin |
| 3,128,349 A | 4/1964 | Boesch et al. |
| 3,159,818 A | 12/1964 | Scantlin |
| 3,246,082 A | 4/1966 | Levy |
| 3,249,919 A | 5/1966 | Scantlin |
| 3,299,210 A | 1/1967 | Bandy |
| 3,337,847 A | 8/1967 | Olsson et al. |
| 3,347,988 A | 10/1967 | Marill et al. |
| 3,371,162 A | 2/1968 | Scantlin |
| 3,381,276 A | 4/1968 | James |
| 3,393,272 A | 7/1968 | Hanson |
| 3,394,246 A | 7/1968 | Goldman |
| 3,482,057 A | 12/1969 | Abbott et al. |
| 3,515,814 A | 6/1970 | Morgan |
| 3,544,769 A | 12/1970 | Hedin |

| | | | | | |
|---|---|---|---|---|---|
| 3,553,378 A | 1/1971 | Solomon et al. | 4,191,860 A | 3/1980 | Weber |
| 3,556,530 A | 1/1971 | Barr | 4,192,972 A | 3/1980 | Bertoglio et al. |
| 3,557,311 A | 1/1971 | Goldstein | 4,194,089 A | 3/1980 | Hashimoto |
| 3,568,157 A | 3/1971 | Downing et al. | 4,200,770 A | 4/1980 | Hellman et al. |
| 3,569,939 A | 3/1971 | Doblmaier et al. | 4,201,887 A | 5/1980 | Burns |
| 3,571,799 A | 3/1971 | Coker, Jr. et al. | 4,221,933 A | 9/1980 | Cornell et al. |
| 3,573,747 A | 4/1971 | Adams et al. | 4,223,183 A | 9/1980 | Peters, Jr. |
| 3,581,072 A | 5/1971 | Nymeyer | 4,232,199 A | 11/1980 | Boatwright et al. |
| 3,594,004 A | 7/1971 | Barr | 4,241,942 A | 12/1980 | Bachman |
| 3,617,638 A | 11/1971 | Jochimsen et al. | 4,242,539 A | 12/1980 | Hashimoto |
| 3,618,038 A | 11/1971 | Stein | 4,243,844 A | 1/1981 | Waldman |
| 3,624,292 A | 11/1971 | Guzak, Jr. | 4,255,618 A | 3/1981 | Danner et al. |
| 3,644,675 A | 2/1972 | Waltington | 4,255,619 A | 3/1981 | Saito |
| 3,647,973 A | 3/1972 | James et al. | 4,260,854 A | 4/1981 | Kolodny et al. |
| 3,651,480 A | 3/1972 | Downing et al. | 4,264,924 A | 4/1981 | Freeman |
| 3,656,113 A | 4/1972 | Lince | 4,264,925 A | 4/1981 | Freeman et al. |
| 3,665,107 A | 5/1972 | Kopec et al. | 4,270,024 A | 5/1981 | Theis et al. |
| 3,675,513 A | 7/1972 | Flanagan et al. | 4,277,649 A | 7/1981 | Sheinbein |
| 3,688,126 A | 8/1972 | Klein | 4,290,141 A | 9/1981 | Anderson et al. |
| 3,696,335 A | 10/1972 | Lemelson | 4,299,637 A | 11/1981 | Oberdeck et al. |
| 3,697,702 A | 10/1972 | Buonsante et al. | 4,302,810 A | 11/1981 | Bouricius et al. |
| 3,727,186 A | 4/1973 | Stephenson | 4,303,804 A | 12/1981 | Johnson et al. |
| 3,781,810 A | 12/1973 | Downing | 4,307,266 A | 12/1981 | Messina |
| 3,787,632 A | 1/1974 | Male et al. | 4,314,103 A | 2/1982 | Wilson |
| 3,792,446 A | 2/1974 | McFiggins et al. | 4,317,961 A | 3/1982 | Johnson |
| 3,794,774 A | 2/1974 | Kemmerly et al. | 4,320,256 A | 3/1982 | Freeman |
| 3,800,283 A | 3/1974 | Gropper | 4,323,770 A | 4/1982 | Dieulot et al. |
| 3,829,628 A | 8/1974 | Tripsas | 4,328,396 A | 5/1982 | Theis |
| 3,858,032 A | 12/1974 | Scantlin | 4,338,494 A | 7/1982 | Theis |
| 3,870,821 A | 3/1975 | Steury | 4,339,798 A | 7/1982 | Hedges et al. |
| 3,881,160 A | 4/1975 | Ross | 4,345,315 A | 8/1982 | Cadotte et al. |
| 3,889,050 A | 6/1975 | Thompson | 4,348,554 A | 9/1982 | Asmuth |
| 3,909,553 A | 9/1975 | Marshall | 4,355,207 A | 10/1982 | Curtin |
| 3,912,874 A | 10/1975 | Botterell et al. | 4,355,372 A | 10/1982 | Johnson et al. |
| 3,914,747 A | 10/1975 | Barnes et al. | 4,360,827 A | 11/1982 | Braun |
| 3,918,174 A | 11/1975 | Miller et al. | 4,360,875 A | 11/1982 | Behnke |
| 3,920,908 A | 11/1975 | Kraus | 4,371,752 A | 2/1983 | Matthews et al. |
| 3,928,724 A | 12/1975 | Byram et al. | 4,376,875 A | 3/1983 | Beirne |
| 3,934,095 A | 1/1976 | Matthews et al. | 4,389,546 A | 6/1983 | Glisson et al. |
| 3,940,569 A | 2/1976 | Schonbrun | 4,393,277 A | 7/1983 | Besen et al. |
| 3,947,972 A | 4/1976 | Freeman | 4,398,708 A | 8/1983 | Goldman et al. |
| 3,950,618 A | 4/1976 | Bloisi | 4,401,856 A | 8/1983 | Curtin et al. |
| 3,974,338 A | 8/1976 | Luzier et al. | 4,405,829 A | 9/1983 | Rivest et al. |
| 3,982,103 A | 9/1976 | Goldman | 4,420,656 A | 12/1983 | Freeman |
| 3,987,252 A | 10/1976 | Vicari | 4,427,848 A | 1/1984 | Tsakanikas |
| 3,989,899 A | 11/1976 | Norwich | 4,428,296 A | 1/1984 | Scheuchzer et al. |
| 3,991,406 A | 11/1976 | Downing et al. | 4,439,635 A | 3/1984 | Theis et al. |
| 3,998,465 A | 12/1976 | Mascola | 4,439,636 A | 3/1984 | Newkirk et al. |
| 4,009,342 A | 2/1977 | Fahrenschon et al. | 4,445,001 A | 4/1984 | Bertoglio |
| 4,012,599 A | 3/1977 | Meyer | 4,451,700 A | 5/1984 | Kempner et al. |
| 4,017,835 A | 4/1977 | Randolph | 4,468,528 A | 8/1984 | Reece et al. |
| 4,024,345 A | 5/1977 | Kochem | 4,475,189 A | 10/1984 | Herr et al. |
| 4,054,756 A | 10/1977 | Comella et al. | 4,489,438 A | 12/1984 | Hughes |
| 4,068,099 A | 1/1978 | Mikkola | 4,490,583 A | 12/1984 | Bednarz et al. |
| 4,071,698 A | 1/1978 | Barger, Jr. et al. | 4,494,197 A | 1/1985 | Troy et al. |
| 4,078,316 A | 3/1978 | Freeman | 4,511,764 A | 4/1985 | Nakayama et al. |
| 4,087,638 A | 5/1978 | Hayes et al. | 4,517,410 A | 5/1985 | Williams et al. |
| 4,088,838 A | 5/1978 | Nakata et al. | 4,517,412 A | 5/1985 | Newkirk et al. |
| 4,090,034 A | 5/1978 | Moylan | 4,518,824 A | 5/1985 | Mondardini |
| 4,090,038 A | 5/1978 | Biggs | 4,518,827 A | 5/1985 | Sagara |
| 4,108,361 A | 8/1978 | Krause | 4,521,643 A | 6/1985 | Dupuis et al. |
| 4,117,278 A | 9/1978 | Ehrlich et al. | 4,523,055 A | 6/1985 | Hohl et al. |
| 4,121,052 A | 10/1978 | Richard | 4,532,378 A | 7/1985 | Nakayama et al. |
| 4,145,578 A | 3/1979 | Orriss | 4,539,435 A | 9/1985 | Eckmann |
| 4,150,255 A | 4/1979 | Theis et al. | 4,539,436 A | 9/1985 | Theis |
| 4,152,547 A | 5/1979 | Theis | 4,541,087 A | 9/1985 | Comstock |
| 4,160,125 A | 7/1979 | Bower et al. | 4,544,804 A | 10/1985 | Herr et al. |
| 4,160,129 A | 7/1979 | Peyser et al. | 4,547,851 A | 10/1985 | Kurland |
| 4,162,377 A | 7/1979 | Mearns | 4,549,047 A | 10/1985 | Brian et al. |
| 4,187,498 A | 2/1980 | Creekmore | 4,549,291 A | 10/1985 | Renoulin |
| 4,191,376 A | 3/1980 | Goldman | 4,555,594 A | 11/1985 | Friedes et al. |

| Patent | Date | Inventor |
|---|---|---|
| 4,559,415 A | 12/1985 | Bernard et al. |
| 4,559,416 A | 12/1985 | Theis et al. |
| 4,562,342 A | 12/1985 | Solo |
| 4,565,903 A | 1/1986 | Riley |
| 4,566,030 A | 1/1986 | Nickerson et al. |
| 4,567,359 A | 1/1986 | Lockwood |
| 4,570,930 A | 2/1986 | Matheson |
| 4,577,062 A | 3/1986 | Hilleary et al. |
| 4,577,067 A | 3/1986 | Levy et al. |
| 4,578,700 A | 3/1986 | Roberts et al. |
| 4,580,012 A | 4/1986 | Matthews et al. |
| 4,581,486 A | 4/1986 | Matthews et al. |
| 4,582,956 A * | 4/1986 | Doughty .................... 379/142 |
| 4,584,602 A | 4/1986 | Nakagawa |
| 4,585,903 A | 4/1986 | Schiller et al. |
| 4,585,906 A | 4/1986 | Matthews et al. |
| 4,586,707 A | 5/1986 | McNeight et al. |
| 4,587,379 A | 5/1986 | Masuda |
| 4,591,190 A | 5/1986 | Clark |
| 4,591,664 A | 5/1986 | Freeman |
| 4,591,665 A | 5/1986 | Foster et al. |
| 4,592,540 A | 6/1986 | Fascenda et al. |
| 4,592,546 A | 6/1986 | Fascenda et al. |
| 4,594,476 A | 6/1986 | Freeman |
| 4,598,367 A | 7/1986 | DeFrancesco et al. |
| 4,599,493 A | 7/1986 | Ellis Cave |
| 4,600,809 A | 7/1986 | Tatsumi et al. |
| 4,603,232 A | 7/1986 | Kurland et al. |
| 4,611,094 A | 9/1986 | Asmuth et al. |
| 4,611,906 A | 9/1986 | Asmuth et al. |
| 4,614,367 A | 9/1986 | Breen |
| 4,625,079 A | 11/1986 | Castro et al. |
| 4,625,081 A | 11/1986 | Lotito et al. |
| 4,625,276 A | 11/1986 | Benton et al. |
| 4,630,200 A | 12/1986 | Ohmae et al. |
| 4,630,201 A | 12/1986 | White |
| 4,634,809 A | 1/1987 | Paulsson et al. |
| 4,635,251 A | 1/1987 | Stanley et al. |
| 4,640,991 A | 2/1987 | Matthews et al. |
| 4,645,873 A | 2/1987 | Chomet |
| 4,649,563 A | 3/1987 | Riskin |
| 4,652,998 A | 3/1987 | Koza et al. |
| 4,654,482 A | 3/1987 | DeAngelis |
| 4,658,417 A | 4/1987 | Hashimoto et al. |
| 4,663,777 A | 5/1987 | Szeto |
| 4,665,502 A | 5/1987 | Kreisner |
| 4,669,730 A | 6/1987 | Small |
| 4,671,512 A | 6/1987 | Bachman et al. |
| 4,672,660 A | 6/1987 | Curtin |
| 4,674,044 A | 6/1987 | Kalmus et al. |
| 4,677,552 A | 6/1987 | Sibley, Jr. |
| 4,677,553 A | 6/1987 | Roberts et al. |
| 4,685,123 A | 8/1987 | Hsia et al. |
| 4,685,127 A | 8/1987 | Miller et al. |
| 4,688,170 A | 8/1987 | Waite et al. |
| 4,689,742 A | 8/1987 | Troy et al. |
| 4,692,817 A | 9/1987 | Theis |
| 4,694,490 A | 9/1987 | Harvey et al. |
| 4,696,028 A | 9/1987 | Morganstein et al. |
| 4,696,029 A | 9/1987 | Cohen |
| 4,697,282 A | 9/1987 | Winter et al. |
| 4,704,725 A | 11/1987 | Harvey et al. |
| 4,706,275 A | 11/1987 | Kamil |
| 4,710,955 A | 12/1987 | Kauffman |
| 4,715,061 A | 12/1987 | Norwich |
| 4,716,583 A | 12/1987 | Groner et al. |
| 4,719,647 A | 1/1988 | Theis et al. |
| 4,722,526 A | 2/1988 | Tovar et al. |
| 4,745,468 A | 5/1988 | Von Kohorn |
| 4,747,124 A | 5/1988 | Ladd |
| 4,748,668 A | 5/1988 | Shamir et al. |
| 4,750,199 A | 6/1988 | Norwich |
| 4,756,020 A | 7/1988 | Fodale |
| 4,757,267 A | 7/1988 | Riskin |
| 4,759,056 A | 7/1988 | Akiyama |
| 4,761,684 A | 8/1988 | Clark et al. |
| 4,761,807 A | 8/1988 | Matthews et al. |
| 4,761,808 A | 8/1988 | Howard |
| 4,763,191 A | 8/1988 | Gordon et al. |
| 4,764,666 A | 8/1988 | Bergeron |
| 4,766,604 A | 8/1988 | Axberg |
| 4,769,834 A | 9/1988 | Billinger |
| 4,774,655 A | 9/1988 | Kollin et al. |
| 4,781,377 A | 11/1988 | McVean et al. |
| 4,782,510 A | 11/1988 | Szlam |
| 4,782,519 A | 11/1988 | Patel et al. |
| 4,783,796 A | 11/1988 | Ladd |
| 4,783,800 A | 11/1988 | Levine |
| 4,785,408 A | 11/1988 | Britton et al. |
| 4,785,473 A | 11/1988 | Pfeiffer et al. |
| 4,788,682 A | 11/1988 | Vij et al. |
| 4,788,715 A | 11/1988 | Lee |
| 4,788,716 A | 11/1988 | Zebe |
| 4,788,718 A | 11/1988 | McNabb et al. |
| 4,789,928 A | 12/1988 | Fujisaki |
| 4,791,664 A | 12/1988 | Lutz et al. |
| 4,791,666 A | 12/1988 | Cobb et al. |
| 4,792,968 A | 12/1988 | Katz |
| 4,796,293 A | 1/1989 | Blinken et al. |
| 4,797,818 A | 1/1989 | Cotter |
| 4,797,910 A | 1/1989 | Daudelin |
| 4,797,911 A | 1/1989 | Szlam et al. |
| 4,797,913 A | 1/1989 | Kaplan |
| 4,799,156 A | 1/1989 | Shavit et al. |
| 4,799,255 A | 1/1989 | Billinger et al. |
| 4,800,583 A | 1/1989 | Theis |
| 4,805,207 A | 2/1989 | McNutt et al. |
| 4,805,209 A | 2/1989 | Baker, Jr. et al. |
| 4,812,843 A | 3/1989 | Champion, III et al. |
| 4,815,031 A | 3/1989 | Furukawa |
| 4,815,121 A | 3/1989 | Yoshida |
| 4,815,741 A | 3/1989 | Small |
| 4,827,500 A | 5/1989 | Binkerd et al. |
| 4,829,563 A | 5/1989 | Crockett et al. |
| 4,832,341 A | 5/1989 | Muller |
| 4,835,630 A | 5/1989 | Freer |
| 4,842,278 A | 6/1989 | Markowicz |
| 4,845,739 A | 7/1989 | Katz |
| 4,847,890 A | 7/1989 | Solomon et al. |
| 4,850,007 A | 7/1989 | Marino et al. |
| 4,852,154 A | 7/1989 | Lewis et al. |
| 4,853,882 A | 8/1989 | Marshall |
| 4,856,050 A | 8/1989 | Theis et al. |
| 4,856,066 A | 8/1989 | Lemelson |
| 4,866,756 A | 9/1989 | Crane et al. |
| 4,876,592 A | 10/1989 | Von Kohorn |
| 4,876,717 A | 10/1989 | Barron et al. |
| 4,878,240 A | 10/1989 | Lin et al. |
| 4,881,261 A | 11/1989 | Oliphant et al. |
| 4,882,473 A | 11/1989 | Bergeron et al. |
| 4,893,325 A | 1/1990 | Pankonen et al. |
| 4,893,328 A | 1/1990 | Peacock |
| 4,893,330 A | 1/1990 | Franco |
| 4,894,857 A | 1/1990 | Szlam et al. |
| 4,896,345 A | 1/1990 | Thorne |
| 4,896,346 A | 1/1990 | Belfield et al. |
| 4,897,867 A | 1/1990 | Foster et al. |
| 4,899,373 A | 2/1990 | Lee et al. |
| 4,899,375 A | 2/1990 | Bauer et al. |
| 4,907,079 A | 3/1990 | Turner et al. |
| 4,908,761 A | 3/1990 | Tai |
| 4,908,850 A * | 3/1990 | Masson et al. ............... 379/88 |

| | | |
|---|---|---|
| 4,908,852 A | 3/1990 | Hird et al. |
| 4,916,726 A | 4/1990 | Morley, Jr. et al. |
| 4,922,519 A | 5/1990 | Daudelin |
| 4,922,520 A | 5/1990 | Bernard et al. |
| 4,922,522 A * | 5/1990 | Scanlon .................. 379/93.13 |
| 4,926,462 A | 5/1990 | Ladd et al. |
| 4,932,021 A | 6/1990 | Moody |
| 4,933,965 A | 6/1990 | Hird |
| 4,937,853 A | 6/1990 | Brule et al. |
| 4,942,598 A | 7/1990 | Davis |
| 4,942,599 A | 7/1990 | Gordon et al. |
| 4,942,616 A | 7/1990 | Linstroth et al. |
| 4,943,995 A | 7/1990 | Dandelin et al. |
| 4,951,307 A | 8/1990 | Willard |
| 4,955,047 A | 9/1990 | Morganstein et al. |
| 4,959,783 A * | 9/1990 | Scott et al. ............... 379/93.13 |
| 4,959,855 A | 9/1990 | Daudelin |
| 4,961,217 A | 10/1990 | Akiyama |
| 4,964,157 A | 10/1990 | Aoshima |
| 4,965,825 A | 10/1990 | Harvey et al. |
| 4,969,183 A * | 11/1990 | Reese ...................... 379/93.13 |
| 4,969,185 A | 11/1990 | Dorst et al. |
| 4,972,461 A | 11/1990 | Brown et al. |
| 4,974,252 A | 11/1990 | Osborne |
| 4,975,945 A | 12/1990 | Carbullido |
| 4,989,233 A | 1/1991 | Schakowsky et al. |
| 4,989,234 A | 1/1991 | Schakowsky et al. |
| 4,992,940 A | 2/1991 | Dworkin |
| 4,996,705 A * | 2/1991 | Entenmann et al. ...... 379/93.13 |
| 5,000,486 A | 3/1991 | Rua, Jr. et al. |
| 5,001,710 A | 3/1991 | Gawrys et al. |
| 5,003,574 A | 3/1991 | Denq et al. |
| 5,003,595 A | 3/1991 | Collins et al. |
| 5,014,298 A | 5/1991 | Katz |
| 5,017,917 A | 5/1991 | Fisher et al. |
| 5,018,736 A | 5/1991 | Pearson et al. |
| 5,023,904 A | 6/1991 | Kaplan et al. |
| 5,033,076 A | 7/1991 | Jones et al. |
| 5,033,088 A | 7/1991 | Shipman |
| 5,036,535 A | 7/1991 | Gechter et al. |
| 5,046,183 A | 9/1991 | Dorst et al. |
| 5,054,059 A | 10/1991 | Stern et al. |
| 5,083,272 A | 1/1992 | Walker et al. |
| 5,097,528 A | 3/1992 | Gursahaney et al. |
| 5,109,414 A | 4/1992 | Harvey et al. |
| 5,125,024 A | 6/1992 | Gokcen et al. |
| 5,127,003 A | 6/1992 | Doll, Jr. et al. |
| 5,128,984 A * | 7/1992 | Katz ....................... 379/93.13 |
| 5,146,491 A | 9/1992 | Silver et al. |
| 5,148,474 A | 9/1992 | Haralambopoulos et al. |
| 5,164,981 A | 11/1992 | Mitchell et al. |
| 5,168,548 A | 12/1992 | Kaufman et al. |
| 5,179,585 A | 1/1993 | MacMillan, Jr. et al. |
| 5,181,236 A | 1/1993 | LaVallee et al. |
| 5,181,238 A | 1/1993 | Medamana et al. |
| 5,186,471 A | 2/1993 | Vancraeynest |
| 5,199,062 A | 3/1993 | Von Meister et al. |
| 5,214,689 A | 5/1993 | O'Sullivan |
| 5,222,120 A | 6/1993 | McLeod et al. |
| 5,233,654 A | 8/1993 | Harvey et al. |
| 5,236,199 A | 8/1993 | Thompson, Jr. |
| 5,255,183 A | 10/1993 | Katz |
| 5,263,723 A | 11/1993 | Pearson et al. |
| 5,289,531 A | 2/1994 | Levine |
| 5,299,260 A | 3/1994 | Shaio |
| 5,303,298 A | 4/1994 | Morganstein |
| 5,303,299 A | 4/1994 | Hunt et al. |
| 5,327,554 A | 7/1994 | Palazzi, III et al. |
| 5,333,185 A | 7/1994 | Burke et al. |
| 5,335,277 A | 8/1994 | Harvey et al. |
| 5,351,276 A | 9/1994 | Doll, Jr. et al. |
| 5,351,285 A | 9/1994 | Katz |
| 5,353,335 A | 10/1994 | D'Urso et al. |
| 5,354,069 A | 10/1994 | Guttman et al. |
| 5,361,295 A | 11/1994 | Solomon et al. |
| 5,369,685 A | 11/1994 | Kero |
| 5,403,999 A | 4/1995 | Entenmann et al. |
| 5,415,416 A | 5/1995 | Scagnelli et al. |
| 5,416,830 A | 5/1995 | MacMillan, Jr. et al. |
| 5,418,844 A | 5/1995 | Morrisey et al. |
| 5,475,205 A | 12/1995 | Behm et al. |
| 5,490,207 A | 2/1996 | Schorr |
| 5,511,112 A | 4/1996 | Szlam |
| 5,537,143 A | 7/1996 | Steingold et al. |
| 5,561,710 A | 10/1996 | Helms |
| 5,599,046 A | 2/1997 | Behm et al. |
| 5,623,536 A | 4/1997 | Solomon et al. |
| 5,651,048 A | 7/1997 | Leeuw |
| 5,709,603 A | 1/1998 | Kaye |
| 5,768,348 A | 6/1998 | Solomon et al. |
| 5,787,156 A | 7/1998 | Katz |
| 5,790,636 A | 8/1998 | Marshall |
| 5,815,551 A | 9/1998 | Katz |
| 5,835,576 A | 11/1998 | Katz |

FOREIGN PATENT DOCUMENTS

| | | |
|---|---|---|
| AU | 66113/81 | 7/1981 |
| CA | 1022674 | 12/1977 |
| CA | 1025118 | 1/1978 |
| CA | 1056500 | 6/1979 |
| CA | 1059621 | 7/1979 |
| CA | 1162336 | 2/1984 |
| CA | 1225759 | 8/1987 |
| CA | 2009937-2 | 8/1990 |
| DE | OS 2929416 | 2/1981 |
| DE | 32 25 562 | 1/1984 |
| DE | OS 3726366 | 2/1988 |
| DE | 4005365 A1 | 8/1990 |
| EP | 0 120 322 | 2/1984 |
| EP | 0 120 322 | 3/1984 |
| EP | 0 217 308 A2 | 4/1987 |
| EP | 0 229 170 A | 7/1987 |
| EP | 0249575 | 12/1987 |
| EP | 0 249 795 | 12/1987 |
| EP | 0295837 | 12/1988 |
| EP | 0342395 | 11/1989 |
| EP | 0434181 | 6/1991 |
| EP | 0 451 685 A2 | 10/1991 |
| EP | 0 451693 A2 | 10/1991 |
| EP | 0 453 831 A2 | 10/1991 |
| EP | 0 454 363 A2 | 10/1991 |
| EP | 0 568 114 A2 | 11/1993 |
| EP | 0 568 114 A | 11/1993 |
| EP | 0 229 170 B1 | 2/1994 |
| EP | 0 620 669 A1 | 10/1994 |
| EP | 0 620 669 A | 10/1994 |
| EP | 0 342 295 B1 | 3/1995 |
| EP | 0 438 860 B1 | 9/1996 |
| EP | 0 382 670 B1 | 4/1997 |
| EP | 0 382 212 B1 | 7/1998 |
| EP | 0 917 335 A2 | 5/1999 |
| FR | 2 575 016 | 7/1986 |
| FR | 9002131 | 8/1990 |
| GB | 1162484 | 4/1967 |
| GB | 2184327 A | 6/1987 |
| GB | 2 230 403 A | 10/1990 |
| GB | 2 252 270 B | 8/1992 |
| GB | 2253542 | 9/1992 |
| GB | 2 230 403 B | 7/1993 |
| JP | 52-17739 | 2/1977 |
| JP | 52-17740 | 9/1977 |
| JP | 54-62708 | 5/1979 |

| | | |
|---|---|---|
| JP | 56-152365 | 11/1981 |
| JP | 59-83270 | 5/1984 |
| JP | 62-92654 | 4/1987 |
| JP | 62-98848 | 5/1987 |
| JP | 62-239757 | 10/1987 |
| JP | 500138/88 | 1/1988 |
| JP | 009353/1988 | 1/1988 |
| JP | 63-114442 | 5/1988 |
| JP | 246067/1988 | 10/1988 |
| JP | 117436/1989 | 5/1989 |
| JP | 298158/90 | 12/1990 |
| JP | 41855/91 | 2/1991 |
| WO | WO 82/02132 | 6/1982 |
| WO | 00370/87 | 1/1987 |
| WO | WO87/00375 | 1/1987 |
| WO | WO 87/00375 | 1/1987 |
| WO | WO88/02966 | 4/1988 |
| WO | WO88/05985 | 8/1988 |
| WO | WO89/02139 | 3/1989 |
| WO | WO89/09530 | 10/1989 |
| WO | WO 89/11768 | 11/1989 |
| WO | WO 90/10989 | 9/1990 |
| WO | WO 90/11661 | 10/1990 |
| WO | WO 91/15818 | 10/1991 |
| WO | WO 92/06548 | 4/1992 |
| WO | WO 92/09164 | 5/1992 |
| WO | WO 92/15166 | 9/1992 |
| WO | WO93/05483 | 3/1993 |

OTHER PUBLICATIONS

"The AT&T Multi–Mode Voice Systems—Full Spectrum Solutions . . . " by Hester et al., Sep. 1985.*

"Network Communications Applications and Services," AT&T Communications Consultant Liaison Program, Issue 1, Jun. 1984.

Brady, R.L., et al., "Telephone Identifier Interface", *IBM Technical Disclosure Bulletin*, Oct. 1976, vol. 19, No. 5, pp. 1569–1571—(Article).

Mullen, R.W., "Telephone—home's 'friendliest' Computer", *Inside Telephone Engineer And Management*, May 15, 1985, vol. 89, No. 10,—(Article).

Winckelmann, W.A., "Automatic Intercept Service", *Bell Laboratories Record*, May 1968, vol. 46, No. 5, pp. 138–143—(Article).

Hester, S.D., et al., "The AT&T Multi–Mode Voice Systems—Full Spectrum Solutions For Speech Processing Applications", Sep. 1985, pp. 1–10—(Proceedings Of The 1985 AVIOS Conference).

Moosemiller, J.P., "AT&T's CONVERSANT$^{TM}$ I Voice System" *Speech Technology*, Mar./Apr. 1986, pp. 88–93—(Article).

Frank, R.J., et al., "No. 4 ESS: Mass Announcement Capability", *The Bell System Technical Journal*, Jul./Aug. 1981, vol. 60, No. 6, Part 2, pp. 1049–1081—(Chapter from a Book).

"Chapter I General Description" *D.I.A.L. PRM/Release 3—Version 2* Mar. 1987 (Product Reference Manual).

Perdue, R.J., et al., "Conversant 1 Voice System: Architecture and Applications", *AT&T Technical Journal*, Sep./Oct. 1986—(Article).

Ozawa, Y., et al., "Voice Response System and Its Applications", *Hitachi Review*, Dec. 1979, vol. 28, No. 6, pp. 301–305—(Article).

Brochures (TWA Crew Scheduling/PSA's Reservation System/Universal Studios Program/Dow Phone): "AVIAR The communication system that keeps you flying", VoiceMail Int'l,—(Brochure) "TWA VOICEMAIL, Flight Attendants Users Guide" Aug. 1986,—(Brochure) Holtzman, Henry, "Voice Mail Soars At TWA", *Modern Office Technology* (Reprint), Mar. 1986,—(Article) "Bid Results via VOICE-MAIL—Flight Deck Crew Members", May 1, 1985 (Script) Borden, W.S., "Flight Attendant Self Input Of Monthly Bids Via Touch Tone Telephone", *In–Flight Services Bulletin*, Sep. 15, 1985—(Memo) "Look Ma, no operators! Automatic voice system does many airline jobs", *Air Transport World*, Oct. 1986—(Article) "1,000,000 Shares Common Stock" *Voicemail International, Inc.,*. Jan. 10, 1984—(Public Offering Summary).

Brochures (TWA Crew Scheduling/PSA's Reservation System/Universal Studios Program/Dow Phone): Levinson, S.E., et al., "A Conversational–Mode Airline Information and Reservation System Using Speech Input and Output", *The Bell System Technical Journal*, Jan. 1980, vol. 59, No. 1, pp. 1, pp. 119–137—(Chapter from a Book).

Corbett, A.J., "Telephone Enquiry System Using Synthetic Speech", *University of Essex*, Dec. 1984, (Thesis).

Sagawa, S., et al., "Automatic Seat Reservation By Touch-Tone Telephone", *Second USA Japan Computer Conference*, 1975, vol. 2, pp. 290–294—(Article).

Cox, Jr., Floyd, "Flora Fax", Jan. 22, 1986—(Letter and Advertisements).

Moslow, Jim, "Emergency reporting system for small communities", *Telephony*, Feb. 11, 1985, pp. 30–32, 34—(Article).

Press Release: "AT&T 2: Reaches Agreement with Rockwell (ROK)," Aug. 26, 1986.

Adams, Cynthia, "Conversing With Computers", *Computerworld on Communications*, May 18, 1983, vol. 17, No. 20A, pp. 36–44—(Article).

Advertisement: Cuervo Gold Beach Chair, VoiceMail Int'l, '83.

Emerson, S.T., "Voice Response Systems—Technology to the Rescue for Business Users", *Speech Technology*, Jan./Feb. '93, pp. 99–103—(Article).

Martin, James, "Design of Man–Computer Dialogues", *IBM System Research Institute*, Chapter 16, pp. 283–306—(Chapter from a Book).

Kaiserman, D.B., "The Role Of Audio Response In Data Collection Systems", *Proceedings of the Technical Sessions*, Paleis des Expositions, Geneva, Switzerland, Jun. 17–19, 1980, pp. 247–251—(Article).

A.J. Waite, "Getting Personal With New Technologies For Telemarketers," DM News, Feb. 15, 1987, p. 50 on.

Yoshizawa, K., et al., "Voice Response System for Telephone Betting", *Hitachi Review*, Jun. 1977, vol. 26, No. 6—(Article).

Inquiry Letter To The F.C.C., From Attorneys For the Prior Title Holder Seeking Rulings That A Particular Game Would Not Be Considered A Lottery Under F.C.C. Regulations (Exhibit A).

Reply Letter From The F.C.C. To The Inquiry Lettery Stating The Requested Rulings (Exhibit B).

Basinger, R. G., et al., "Calling Card Service—Overall Description and Operational Characteristics", The Bell System Technical Journal, Sep., 1982.

Confalone, D. E., et al, "Calling Card Service—TSPS Hardware, Software, and Signaling Implementation", The Bell System Technical Journal, Sep., 1982.

Eigen, D.J., et al., "Calling Card Service—Human Factors Studies", The Bell Techical Journal, Sep., 1982.

Lexis Search, Nov. 1, 1984, re: System 85 Computer Process.

Lexis Search, Jan. 28, 1985, re: Rolm Releases Four–Channel Phonemail Voice Message Unit.

Lexis Search Results (Great American Potato–Chip giveaway/Raisin Bran Game/Giants Baseball Trivia—Dial Info): "In The Chips" AdWeek, Jul. 22, 1985.

"San–Fran–Police–League", Business Wire, Aug. 2, 1985.

"Similar Campaigns", DM News, Dec. 15, 1985.

"Phone Offers Action At Push Of Button", Advertising Age, Feb. 6, 1986.

Boies, Stephen J., "A Computer Based Audio Communication System", Computer Sciences Department, Thomas J. Watson Research Center, Yorktown Heights, New York, USA, pp. 701–704—(Article) (Undated).

Winckelmann, W.A., "Automatic Intercept Service", Bell Laboratories Record, May 1968, vol. 46, No. 5, pp. 138–143—(Article) *.

"Proposed Agreement Between National Enterprises Board (N.E.B.) and Delphi", Jan. 30. 1979.

Voysey, Hedley, "Nexos wins rights to comms engine", Computing, Sep. 6, ??, vol. 7, No. 36—(Article).

"Appraisal Of The Fair Market Value Of Delphi Communications", Apr. 30, 1980—(Study) Delphi Communications—(Charts and Exhibits).

"Voice–Response System Improves Order Entry, Inventory Control", Communications News, Aug. 1976—(Article).

"Periphonics VOICEPACK"—(Brochure) (Undated).

"The Voice Response Peripheral That Turnes Every Touch-Tone Telephone Into A Computer Terminal", Periphonics Corporation—(Brochure) (Undated).

Rabin, Jeff, "Minorities Seek 30% Share of All Lottery Operations", Sacramento Bee, Apr. 12, 1985—(Article).

Advertisements (Dial Giants Baseball Trivia Game): San Francisco Chronicle, Jul. 3, 1984.

Curtis, Cathy, "976 numbers let you dial–a–whatever", San Francisco Business Journal, Nov. 26, 1984—(Article).

Ferrell, Jane, "Three little numbers for instant information", San Francisco Chronicle, Aug. 15, 1984—(Article).

"Dallas Telephone Call–In Game Uses Computer Voice Interface", Sep. 24, 1984—(Press Release).

Rivest, R.L., et al., "A Method for Obtaining Digital Signatures and Public–Key Cryptosystems", Communications of the ACM, Feb. 1978, vol. 21, No. 2, pp. 120–126—(Article).

Finnigan, Paul F, "Audiotex: The telephone as data–access equipment", Data Communications, 1987, pp. 155–161 (Article).

Ozawa, Y., et al., "Voice Response System and Its Applications", Hitachi Review, Dec. 1979, vol. 28, No. 6, pp. 301–305—(Article) *.

"AT&T 2: Reaches agreement with Rockwell (ROK)", Aug. 26, 1986—(Press Release) *. "AT&T: Expands Computer speech system product line", Apr. 14, 1986—(Press Release).

Adams, Cynthia, "Conversing With Computers", Computerworld on Communications, May 18, 1983, vol. 17, No. 20A, pp. 36–44—(Article) *.

Davidson, Leon, "A Pushbutton Telephone For Alphanumeric Input", Datamation, Apr. 1966, pp. 27–30—(Article).

Advertisement: Cuervo Gold Beach Chair, VoiceMail Int'l, '83 *.

"Digital's All–In–1 Voice Messaging", Digital—(Brochure) (Undated).

"Access Voice and Mail Messages From One Familiar Source", Insight,—(Article) (Undated).

"Get The Message . . . !" "New VoiceMail Features", Voicemail International, Inc., Oct. 1984—(Article).

Brochures (TWA Crew Scheduling/PSA's Reservation System/Universal Studios Program/Dow Phone): "AVIAR The communication system that keeps you flying", VoiceMail Int'l,—(Brochure) (Undated) *.

"TWA VOICEMAIL, Flight Attendants Users Guide" Aug. 1986,—(Brochure) *.

Holtzman, Henry, "Voice Mail Soars At TWA", Modern Office Technology (Reprint), Mar. 1986,—(Article) *.

"Bid Results via VOICEMAIL—Flight Deck Crew Members", May 1, 1985 (Script) *.

Borden, W.S., "Flight Attendant Self Input Of Monthly Bids Via Touch Tone Telephone", In–Flight Services Bulletin, Sep. 15, 1985—(Memo) *.

"Look Ma, no operators! Automatic voice system doesmany airline jobs", Air Transport World, Oct. 1986—(Article) *.

"1,000,000 Shares Common Stock" Voicemail International, Inc.,. Jan. 10, 1984—(Public Offering Summary) *.

Levinson, S.E., et al., "A Conversational–Mode Airline Information and Reservation System Using Speech Input and Output", The Bell System Technical Journal, Jan. 1980, vol. 59, No. 1, pp. 119–137 *.

Emerson, S.T., "Voice Response Systems—Technology to the Rescue for Business Users", Speech Technology, Jan./Feb. '83, pp. 99–103—(Article) *.

Moslow, Jim, "Emergency reporting system for small communities", Telephony, Feb. 11, 1985, pp. 30–32, 34—(Article) *.

Rabiner, L.R., et al., "Digital Techniques for Computer Voice Response: Implementation and Applications", Proceedings Of The IEEE, Apr. 1976, vol. 64, No. 4, pp. 416–432—(Article).

Moosemiller, J.P., "AT&T's CONVERSANT™ I Voice System" Speech Technology, Mar./Apr. 1986, pp. 88–93—(Article) *.

Frank, R.J., et al., "No. 4 ESS: Mass Announcement Capability", The Bell System Technical Journal, Jul./Aug. 1981, vol. 60, No. 6, Part 2, pp. 1049–1081—(Chapter from a Book) *.

"Chapter I General Description" D.I.A.L. PRM/Release 3—Version 2 Mar. 1987 (Product Reference Manual) *.

"Announcing Release 3.3" D–A–S–H– D.I.A.L. Application and Support Hints, Jan./Feb. Mar. 1987, vol. 3, No. 1—(Brochure).

"D.I.A.L. Software Relase 4", OPCOM, Jan. 1988, Version 1—(Product Reference Manual).

Brady, R.L., et al., "Telephone Identifier Interface", IBM Technical Disclosure Bulletin, Oct. 1976, vol. 19, No. 5, pp. 1569–1571—(Article) *.

Corbett, A.J., "Telephone Enquiry System Using Synthetic Speech", University of Essex, Dec. 1974, (Thesis) *.

Yoshizawa, K., et al., "Voice Response System for Telephone Betting", Hitachi Review, Jun. 1977, vol. 26, No. 6—(Article) *.

Sagawa, S., et al., "Automatic Seat Reservation By Touch-Tone Telephone", *Second USA Japan Computer Conference*, 1975, vol. 2, pp. 290–294—(Article) *.

Smith, S.L., "Computer–Generated Speech and Man–Computer Interaction", *Human Factors*, 1970, 12(2), pp. 215–223—(Article).

Newhouse, A., et al., "On The Use Of Very Low Cost Terminals", *University of Houston*, pp. 240–249—(Paper) (Undated).

Mullen, R.W., "Telephone—home's 'friendliest' Computer", *Inside Telephone Engineer And Management*, May 15, 1985, vol. 89, No. 10,—(Article) *.

Kutler, Jeffrey, "Technology, System Sharing Improve Phone Banking Outlook", *American Banker*, Dec. 7, 1979, vol. CXLIV, No. 237—(Article).

Kutler, Jeffrrey, "Phone Bill Paying Accessed By Pioneer", *American Banker*, Dec. 7, 1979, vol. CXLIV, No. 237—(Article).

"User's Guide", *Dowphone* (Undated).

"Audiotex Information From Dow Jones", *The Computer Review*, Nov. 1984, vol. 2, No. 1—(Article).

"Dow Phone Adds Innovest Systems' Technical Analysis Reports" *IDP Report*, Jan. 3, 1986—(Report).

Perdue, R.J., et al., "Conversant 1 Voice System: Architecture and Applications", *AT&T Techical Journal*, Sep./Oct. 1986—(Article) *.

Martin, James, "Design of Man–Computer Dialogues", *IBM System Research Institute*, Chapter 16, pp. 283–306—(Chapter from a Book) (Undated) *.

Kaiserman, D.B., "The Role Of Audio Response In Data Collection Systems", *Proceedings of the Technical Sessions*, Paleis des Expositions, Geneva, Switzerland, Jun. 17–19, 1980, pp. 247–251—(Article) *.

Boies, S.J., et al., "User Interface for Audio Communication System", *IBM Technical Disclosure Bulletin*, Dec. 1982, vol. 25, No. 7A, pp. 3371–337—(Article).

Kramer, J.J., "Human Factors Problems in the Use of Pushbutton Telephones for Data Entry", *Bell Telephone Laboratories*, Holmdel, N.J., Apr. 74, pp. 241–258—(Paper).

Cox, Jr., Floyd, "Flora Fax", Jan. 22, 1986—(Letter and Advertisements) *.

Isayama, Tetsuya, "Automatic Response Processing Equipment as a Multi–media Communication Node", *Japan Telecommunications Review*, 1987, vol. 29, No. 1, pp. 29–36—(Article).

Imai, Y., et al., "Shared Audio Information System Using New Audio Response Unit" *Japan Telecommunications Review*, Oct. 1981, vol. 23, No. 4, pp. 383–390—(Article).

"Distrust of computer kills home service plan" (date and source missing).

"Automatic Call Distributor/Management Information System: Interface between 1/1AESS™ Switch Central Office and Customer Premises Equipment", *Bell Communications Research*, Dec. 1986, Technical Reference TR–TSY–000306, Issue 1—(Article).

"Comparison Of ACD Systems", *Connection*, Feb. 1990—(Chart).

"ACD Comparison", *Aspect*, Feb. 2, 1990—(Final Report).

Lanzeter, Ygal, "Automatic Number Identification System For Step–By–Step Exchanges", *The Ninth Convention of Electrical and Electronics Engineers In Israel*, Apr. 1975—(Paper).

Flanagan, J.L., et al., "Speech Synthesis", Chapters 1, 39, 42, 45 and 46—(Chapter from a Book).

"Bell Atlantic's Bolger Wants To Be Free", *Telephony*, Jul. 14, 1986—(Article).

"Advanced New Cable TV Technology Developed For Impulse–Pay–Per–View", Jun. 3, 1985—(Search).

Noll, M.A., "Introduction to Telephones & Telephone Systems", Second Edition, Chapter 9—(Chapter from a Book).

"Proposal for Kome Mediavoice Interactive Phone/Database Marketing System", "Mediavoice Startup Software Package For Kome" "Optional Mediavoice Software Packages For Kome" "Why ATI Mediavoice Is The Choice For Success"—(Proposal).

Meade, Jim, Dec., 29, 1992—(Letter).

"All About Voice Response", *Datapro Research Corporation*, Delran, N.J., Mar. 1972 and Sep. 1974—(Article).

"Voice Response in Banking Applications", *Datapro Research Corporation*, Delran, N.J., Oct. 1974 and Feb. 1983—(Article).

Schiller, T.R., "Field Craft Technician Communication With A Host Computer Synthesized Voice", *Proceedings AVIOS '86 Voice I/O Systems Applications Conference*, Sep. 16–18, 1986 Rabin, Richard, "Telephone Access Applications: The Growth Market For Voice Processing", *Proceedings AVIOS '86 Voice I/O Systems Applications Conference*, Oct. 6–8, 1987 Schuster, E.R., "B.R.U.T.U.S. Better Registration Using Touch–Tone phones for University Students", *Proceedings AVIOS '86 Voice I/O Systems Applications Conference*, Oct. 4–6, 1988.

"Exxon3 s Next Prey. IBM and XEROX", *BusinessWeek*, Apr. 28, 1980, pp. 92–96 and 103—(Article).

Weinstein, S.B., "Emerging Telecommunications Needs of the Card Industry", *IEEE Communications Magazine*, Jul. 1984, vol. 22, No. 7, pp 26–31—(Article).

"Riding Gain", *Broadcasting*, Mar. 7, 1983—(Article).

Pickup, Mike, "Bank from home, by screen or by phone", *Building Society Gazette*, Jul. 1988—(Article).

Pickup, Mike, "Voice Response", *Computer Sytems*, Sep. 1986—(Article).

Rabiner, L.R., et al., "Isolated and Connected Word Recognition—Theory and Selected Applications", *IEEE Transaction Communications*, May 1981, Com. 29, No. 5, pp. 621, 622, 633, 644–646, 655–659—(Article).

Takahashi, K., et al., "The Audio Response System for Telephone Reservation", *U.D.C.* Oka, Y., et al., "Development of Ventilating Equipment for Shinkansan Train", *U.D.C.*—(Articles in Japanese).

Pagones, M.J., et al., "New services follow increased digitization on the long–haul transmission network", *AT&T Bell Laboratories Record*, 1983, vol. 61, pp. 25–33—(Article).

"New phone service tells customer who's calling", *Bell Laboratories Record*, 1984, vol. 62, p. 9—(Article).

Hirschman, C.B., et al., "LASS: Putting the telephone customer in charge", *Bell Laboratories Record*, 1985, vol. 63, pp. 10–16—(Article).

"AT&T building communications network for Defense Department" and "AT&T inaugurates pay–per–view TV", *Bell Laboratories Record*, 1986, vol. 64, p. 2—(Article).

"Power To . . . ", *Dialogic Corporation*, Littleton Road,—(unidentifiable Article).

"Representative Customer List For Interface Technology's Total Entry System", "Toes Solutions—Pharmaceutical Manufacturer", "The Voice Response Solution For Answering Customer/Sales Calls", "Toes Solutions—Orthopedic Equipment" and "Toes Solutions –Convenience Store"—(Articles).

Lummis, R.C., "Speaker Verification: A Step Toward the "Checkless" Society", *Bell Laboratories Record*, pp. 254–259—(Article).

Flanagan, J.L., et al., "Synthetic voices for computers", *IEEE Spectrum*, Oct. 1970, vol. 7, No. 10, pp. 22–45—(Article).

Rabiner, L.R., et al., "Computer Synthesis of Speech by Concatenation of Formant–Coded Words", *The Bell System Technical Journal*, May/Jun. 1971, pp. 1541–1558—(Chapter from a Book).

Flanagan, J.L., et al., "Wiring Telephone Apparatus from Computer–Generated Speech", *The Bell System Technical Journal*, Feb. 1972, pp. 391–397—(Chapter from a Book).

Hornsby, Jr., Thomas G., "Voice Response Systems", *Modern Data*, Nov. 1972, pp. 46–50—(Article).

Diffie, W., et al., "New Directions in Cryptography", *IEEE Transactions On Information Theory*, Nov. 1976, vol. IT–22, No. 6, pp. 644–654—(Article).

Rosenthal, L.H., et al., "Automatic voice response: interfacing man with machine", *IEEE Spectrum*, Jul. 1974, vol. 11, No. 7—(Article).

Rosenthal, L.H., et al., "A Multiline Computer Voice Response System Utilizing ADPCM Coded Speech", *IEEE Transactions on Acoustics, Speech, and Signal Processing*, Oct. 1974, vol. ASSP–22, No. 5, pp. 339–352—(Article).

Flanagan, James L., "Computers that Talk and Listen: Man-Machine Communication by Voice", *Proceedings for the IEEE*, Apr. 1976, vol. 64, No. 4, pp. 405–415—(Article).

Maisel, Ivan, "To Put Your Baseball Savvy On The Line, Pick Up The Phone And Call", *Sports Illustrated*, Sep. 3, 1984—(Script) Brown, Merrill, "Hollywood Saga: Who Bought J.R.?", *The Washington Post*, Final Edition, Oct. 14, 1984—(Script) "SPECIAL–OLYMPICS; Teams with baseball trivia expert Brad Curtis", *Business Wire*, Sep. 30, 1985—(Script).

Lucas, W.A., et al., "The Spartanburg Interactive Cable Experiments In Home Education", *Rand Corp.*, U.S. Department of Commerce, National Technical Information Service, Feb., 1979—(Publication).

Martin, James, "Viewdata And The Information Society",—(Book).

Gawrys, G.W., "Ushering In The Era Of ISDN", *AT&T Technology*, 1986, vol. 1, No. 1, pp. 2–9—(Article).

Cummings, J.L., et al., "AT&T Network Architecture Evolution", *AT&T Technical Journal*, May/Jun. 1987, vol. 66, Issue 3, pp. 2–12—(Article).

Yates, C.E., "Telemarketing And Technology: Perfect Business Partners", *AT&T Technology*, 1987, vol. 1, No. 3, pp. 48–55—(Article)[4].

Herr, T.J., "ISDN Applications In Public Switched Networks", *AT&T Technology*, 1987, vol. 2, No. 3, pp. 56–65—(Article).

"Only the best. Only from Florafax", *Florafax*—(Advertisement).

Aldefeld, B., et al., "Automated Directory Listing Retrieval System Based on Isolated Word Recognition", *Proceedings of the IEEE*, Nov. 1980, vol. 68, No. 11, pp. 1364–1379—(Article).

Rabiner, L.R., et al., "On the Application of Embedded Training to Connected Letter Recognition for Directory Listing Retrieval", *AT&T Bell Laboratories Technical Journal*, Mar. 1984, vol. 63, No. 3, pp. 459–477—(Chapter from a Book).

Rosenberg, A.E., et al., "Recognition of Spoken Spelled Names for Directory Assistance Using Speaker–Independent Templates", *The Bell System Technical Journal*, Apr. 1980, vol. 59, No. 4, pp. 571–592—(Chapter from a Book).

"The Voicestar Series By Periphonics", *Periphonics*, Jan. 1986—(Publication) "Bank–From–Home system by Periphonics Corporation" "Bill Payment Success Story", *Periphonics Corporation* "A History of Imagination", *Periphonics* "Banking Success Story", *Periphonics Corporation* "Data-Voice and the PDT II", *Periphonics Corporation* "Banking Success Story", *Periphonics Corporation*—(Brochures).

Schulman, Roger, "TeleLearning: The Computer Brings the Classroom Home", *Family Computing*, Sep. 1984, pp. 50–53—(Article).

"ICS launches new ?–home interactive video service package", *Cable Vision*, Sep. 3, 1984, pp. 71/73—(Article).

"The Remarketing of Prestel", *Which Computer?*, Aug. 1984, pp. 106, 107 and ?—(Article).

"Four–Line TeleClerk Calls, Answers, Stores, Surveys", *Hardcopy*, Jan. 1985, vol. 14, No. 1—(Article).

"Peripheral Speaks On Phone", *Hardcopy*, Dec. 1984—(Article).

Page from *What's new in Computing*, Apr. 1985—(Article).

Page from *Today*, A Compuserve Publication, Jun. 1985—(Article).

Page from *Computer Communications*, Feb. 1984, vol. 7, No. 1—(Article).

Gits, Victoria, "Interactive device doesn't interrupt telephone calls", *Cable Vision*, Jun. 17, 1985, p. 20—(Article).

Cuilwik, Tony, "Reach Out & Touch The Unix System", *Unix Review*, Jun. 1985, pp. 50, 52, 53, 56—(Article).

Blackwell, Gerry, "Dial–a–Quote: first Canadian commercial audiotex service", *Computing Canada*—(Article).

Applebaum, Simon, "Two–way television"*Cable Vision*, Aug. 8, 1983, p. 66—(Article).

Sw??ne, Michael, "Fiber–optic TV network lets viewers talk back", *Info World*—(Article).

Morrill, C.S., et al., "User Input Mode and Computer–Aided Instruction", *Human Factors*, 1968, 10(3), pp. 225–232—(Chapter from a Book).

Results of Lexis Search Request for "Dial Info or Dialinfo", Date of Search Apr. 13, 1992, pp. 1–38.

Results of Lexis Search Request for "Phone Programs or International Information Network", Date of Search Apr. 15, 1992, pp. 1–35.

Van Gieson, Jr. W.D., et al., "Machine–Generated Speech For Use With Computers, and the problem of fitting a spoken word into one half second", *Computers and Automation*, Nov. 1968, pp. 31–34—(Article).

Patel, Jay, "Utility of voice response system depends on its flexibility", *Bank Systems & Equipment*, Dec. 1988, pp. 101/103—(Article).

Buron, R.H., "Generation of a 1000–Word Vocabulary for a Pulse–Excited Vocoder Operating as an Audio Response Unit", *IEEE Transactions On Audio And Electroacoustics*, Mar. 1986, vol. AU–16, No. 1, pp. 21–25—(Article).

Gaines, B.R., et al., "Some Experience in Interactive System Development and Application", *Proceedings of the IEEE*, Jun. 1975, vol. 63, No. 6, pp. 894–911—(Article).

"Application For Registration Of Equipment To Be Connected To The Telephone Network", *Federal Communication Commission*, FCC Form 730.

Dudley, Homer, "The Vocoder", Circuit Research Department, Dec. 1939, pp. 122–128—(Chapter from a Book).

"Voice Response System Order Entry, Inventory Control".

"Vendor Index", *Audiotex Directory & Buyer's Guide*, Fall/Winter 1989/90, pp. 114–156.

Francas, M., et al., "Input Devices For Public Videotex Services", *Human–Computer Interaction—INTERACT '84*, 1985, pp. 171–175—(Paper).

Labrador, C., et al., "Experiments In Speech Interaction With Conventional Data Services", *Human–Computer Interaction—INTERACT '84*, 1985, pp. 225–229—(Paper).

Long, J., et al., "Transaction Processing Using Videotex or: Shopping on Prestel", *Human–Computer Interaction—INTERACT '84*, 1985, pp. 251–255—(Paper).

*Electrical Communication*, 1981, vol. 56, Nos. 1–4, pp. 1–110—(Paper).

Conway, R.W., et al., "Tele–CUPL: A Telephone Time Sharing System", *Communication of the ACM*, Sep. 1967, vol. 10, No. 9, pp. 538–542—(Article).

Marill, T., et al., "DATA–DIAL: Two–Way Communication with Computers From Ordinary Dial Telephones", *Communications of the ACM*, Oct. 1963, vol. 6, No. 10, pp. 622–624—(Article).

Witten, I.H., "Communicating With Microcomputers", pp. 121–158—(Chapter from a Book).

"Call–It–Co. Hangs Up On Dial–It In Four Markets", *The 976 Exchange*, 1984, vol. 2, pp. 1–6 (Article).

"DECtalk Help Boston's Shawmut Bank Cut Costs And Improve Service", *Digital*—(Article).

"VTK 81 Voice Computer", *Voicetek*, 1987 (Brochure).

"How a Computerized "Voice" Answers Customers' Inquiries", *Bank Automation Newsletter*, Feb. 1985, vol. 19, No. 2 (Article).

Rickman, J., et al., "Speech Synthesizers—Communications Interface—Implementing A Touch Tone Telephone Talker With DECtalk", *The DEC Professional*, May 1985, pp. 38, 39, 42–44 (Article).

"DECTALK DELIVERS", *Digital Review*, Sep. 1985—(Article) "DECtalk turns a telephone into a terminal",—"UNIX and Digital",—"Legal protection for semiconductor chips",—"Product safety",—*DECWORLD*, Apr. 1985, vol. 9, No. 2, pp. 1, 3, 5, 6–8—(Article).

"DECtalk: A New Text–to–Speech Product" *Digital Guideline*, Mar. 1984, vol. 8, No. 3, pp. 1–8—(Article).

*Straight Talk*, A Newsletter about the DECtalk Speech Synthesizer from Ditigal Equipment Corporation, vol. 1, No. 1, pp. 1–6 *Straight Talk*, A Newsletter about the DECtalk Speech Synthesizer from Digital Equipment Corporation, vol. 1, No. 2, pp. 1–7 *Straight Talk*, A Newsletter about the DECtalk Speech Synthesizer from Digital Equipment Corporation, vol. 1, No. 3, pp. 1–8 *Straight Talk*, A Newsletter about the DECtalk Speech Synthesizer from Digital Equipment Corporation, vol. 1, No. 4, pp. 1–8 *Straight Talk*, A Newsletter about the DECtalk Speech Synthesizer from Digital Equipment Corporation, vol. 2, No. 2, pp. 1–8 *Straight Talk*, A Newsletter about the DECtalk Speech Synthesizer from Digital Equipment Corporation, vol. 2, No. 4, pp. 1–8.

Various References/Articles attached with a letter from Smithwin Associates, dated Apr. 22, 1992: Riley, A.A., "Latest: 2–way communication by computer and telephone" ??evens, W.?., "Computer Helps Children to Add", *The New York Times*, Apr. 20, 1970 Harvey, R.W., *Times*, The Kiplinger Magazine "A Computerized System ???", Nov. 23, 1970, p. 14, (unidentifiable Article) "Hardware for the 'cashless society'", *Electronic Design 3*, Feb. 4, 1971, p. 26 Tennant, R.P., "Advanced credit system smooths operation and hastens payout", *Data Processing Magazine*, Jun. 1971, vol. 13, No. 6, pp. 34–35 "Computers that talk back to you", *Business Week*, Date ?? Smith, Gene, "Chatting Via Computer", *New York Times*, Sep. 12, 1971 *EDP Weekly*, (unidentifiable Article) "Did Anybody Here Call a Computer", *Data Management*, Feb. 196?.

Skala, Martin, "Straight talk from a computer", *Christian Science Monitor*, Jun. 14, 1973. "Computer for Watergate Probe", *Science*, Jun. 15, 1973. "Tapping AT&T for a 50–million refund", *Business Week*, Jun. 9, 1973. "Distrust of computer kills home service plan". Scherer, Ron, "Chit-chat with a computer", *Christian Science Monitor*, Apr. 16, 1975, p. 2. "Trying Out the Pay–by–Phone Service", *Technology Review*, Mar./Apr. 1976, p. 15. "Pentagon seeks more control", *Electronics*, Apr. 5, 1976, p. 39. "Everyman' Computer Terminal", *Industrial Research*, Mar./Apr. 1976, p. 14. "DOD could save on test equipment".

Martin, J., et al., "The Computerized Society—An apprisal of the impact of computers on society over the next fifteen years", Chapter 10, pp. 211–226—(Chapter from a Book).

New products, *Datamation*, Jul. 1966, vol. 12, No. 7, pp. 7/89—(Article).

Meacham, L.A., et al., "Tone Ringing and Pushbutton Calling", *The Bell System Technical Journal*, 1958, pp. 339–360—(Book).

Suppes, Patrick, "The Uses of Computers in Education", *Scientific American*, Sep. 1966, vol. 215, No. 3, pp.—(Article).

Bruckert, E., et al., "Three–tiered software and VLSI aid developmental system to read text aloud", *Electronics*, Apr. 21, 1983, pp. 133–138—(Article).

Hochman, David, "Implementing Automatic Number Identification", *Telecommunications*, Dec., 1978, vol. 12, No. 12—(Article).

Martin, James, "Telecommunications and the Computer", 2nd Edition, Introduction, pp. 20–23, Chapter 5, pp. 94–95, Chapter 18—(Chapter from a Book).

Martin, James, "Telematic Society", Chapter 6, pp. 45–48, Chapter 9, pp. 67–69, Chapter 20, pp. 181–188—(Chapters from a Book).

Martin, James, "The Wired Society", pp. 53–55, 71–79, 99–100, 204–205, 229–231—(Chapters from a Book).

Martin, James, "Future Developments in Tele–Communications", 2nd Edition, Box A, Chapter 1, p. 5, Chapter 7, pp. 95–111, Chapter 9, pp. 149–105, Chapter 12, pp. 207–209, Chapter 18, pp. 310–311, Chapter 19, pp. 314–317, 320, Chapter 20, pp. 330, Chapter 23, pp. 379–401—(Chapters from a Book).

Ferrarini, E.M., "Infomania", pp. 59–61, 176–177, 191, 213–214, 223, 245, 250, 257, 285, 286—(Book).

Kimura, Y., et al., "Audio Response System", vol. 55, No. 10, pp. 49–54—(Article in Japanese).

Takano, Y., "Characteristics of Multipair Exchange Area Telephone Cable with Cellular Polyethylene Insulation by Gas Injection Blouing", p. 55—(Article in Japanese).

Takahashi, T., et al., "SR–2000 Voice Processor and Its Application", *NEC Research and Development*, 1984, No. 73, pp. 98–105—(Paper).

"Concept Diagram Voicemail International System" "Voicemail Instruction Manual", *Televoice International*, Jun. 1981, Index.

Eckhouse, John, "Voice mail spells relief for phone frustration", *San Francisco Examiner*, Feb. 7, 1982 (Article).

Meade, Jim, "Throw away those pink Call–back slips", *InterOffice*, Jan./Feb. 1984, vol. 3, No. 1—(Article).

Welsh, Jack, "Everybody's Talking About Talking Bouquets", *Design for Profit*, Spring 1986, pp. 7–10—(Article).

Mosco, Vincent, "Pushbutton Fantasies", Contents, Chapter 3 and 4, pp. 67–118—(Chapters from a Book).

Bretz, Rudy, "Media for Interactive Communication", Chapter 5, pp. 110–116, Chapter 7, pp. 143–153—(Chapters from a Book).

Robinson, G., et al., ""Touch–Tone" Teletext A Combined Teletext–Viewdata System", *IEEE Transactions on Consumer Electronics*, Jul. 1979, vol. CE–25, No. 3, pp. 298–303—(Article).

Voice News, Mar. 1982 Voice News, Jun. 1982, *William W. Creitz* Voice News, Oct. 1982, p. 5 Voice News, Nov./Dec. 1983.

"Consultant Report 28?", *AIS American Bell Advanced Information Systems*, Apr. 1983, pp. 27, 118–119, 123–124—(Report).

"T–1 Board Sets Deliver High Performance All Digital T–1 Solutions", *NMS Natural MicroSystems*—(Product Bulletin).

"VBX Product Family Overview", *NMS Natural MicroSystems*, pp. 1–20—(Brochure).

"Machine Operation Manual", May 12, 1978, Issue 1, pp. 1–3, 9–10—(Manual).

Davey, J.P., "Dytel Western Region Sales Training Manual", 1985—(Manual).

Gutcho, Lynette, "DECtalk—A Year Later", *Speech Technology*, Aug./Sep. 1985, pp. 98–102—(Article) *.

Daniels, Richard, "Automating Customer Service", *Insurance Software Review*, Aug./Sep. 1989, pp. 60–62—(Article).

Golbey, S.B., "Fingertip Flight Service", Oct. 1985—(Article).

"ARO Goes Pushbutton", *Newsletter*, Nov. 1985, p. 9—(Article).

"ROLM Centralized Attendant Service", *ROLM Corporation*, 1979.

"AIS, Versatile Efficient Information Service", *Fujitsu Limited*, 1972, p. 153–162—(Brochure).

Smith, S.L., et al., "Alphabetic Data Entry Via the Touch-Tone Pad: A Comment", *Human Factors*, 1971, 13(2), pp. 189–190—(Book).

Holtzman, Henry, "Still an Infant Technology VOICE MAIL", *Modern Office Technology*, Jun. 1985, pp. 78–80, 82, 84, 90—(Article).

Leander, Monica, "Voice Response—A Technology for Solving Management Problems", *Speech Technology*, Mar./Apr. 1986, pp. 50–52—(Article).

Stolker, Bud, "CompuCorder speech storage and output device. (evaluation)", *Creative Computing*, Jul. 1983, pp. 1–7.

Witten, I.H., et al., "The Telephone Enquiry Service: a man–machine system using synthetic speech", *Int. J. Man-Machine Studies*, Jul. 1977, 9, pp. 449–464—(Book).

Gould, R.L., "Fidelity's Automated Voice Response System", *Telecommunications*, Jan. 1981, pp. 27–28—(Article)

"Fidelity Automated Service Telephone", *Fidelity Group*, 4 pages—(Manual) *.

"Data Set 407 Interface Specification", *Manager—Data Systems & Operations*, Jun. 1975, Issue 2, pp. 1–69 plus Table of Contents—(Manual).

Fitzwilliam, J.W., et al., "Transaction Network, Telephones, and Terminals", *The Bell System Technical Journal*, Dec. 1978, vol. 57, No. 10, pp. 3325–3537—(Book).

*Inbound Outbound*, May 1988, complete issue.

Koch, Helmut, "Concord Design Services, Inc. Corporate Description", *Exacom* Federal Communications Commission, FDC Form 484, Registration, Registrant: Concord Design Services, Inc. *Exacom Telecommunication Systems*—Brochure General Description Installation and Operation Manual for Direct Inward Dial (DID) Trunk Interface Unit, *Exacom Telecommunication Systems*, Nov. 21, 1989, Issue 3—(Manual) General Description Installation and Operation Manual for Answering Service Monitor System, *Concord Design Services, Inc.*, Dec. 19, 1986, Issue 1—Manual.

"Dialogic Voice Solutions", *Dialogic Corporation*, pp. 1–72 "Why Is T–1 Important And How Can It Be Used", *Dialogic Corporation*, Application Note, pp. 1–6 "Use of Dialogic T–1 For Telemarketing Applications", *Dialogic Corporation*, Application Note, pp. 1–6 "Use of Dialogic T–1 In Operator Service Applications", *Dialogic Corporation*, Application Note, pp. 1–6 "Use of Dialogic T–1 In Telephone Company Networks", *Dialogic Corporation*, Application Note, pp. 1–10 "Use of Dialogic T–1 Equipment in CPE Gateways", *Dialogic Corportion*, Application Note, pp. 1–4 "Integrating Analog Devices into Dialogic–Based T–1 Voice Processing Systems", *Dialogic Corporation*, Application Note, pp. 1–16 "Use of Dialogic Components in Automatic Number Identification (ANI) Systems", *Dialogic Corporation*, Application Note, pp. 1–16 "Dialogic Unit Pricing", pp. 1–6.

"Voice '92 Spring Conference & Exposition", 1992, pp. 1–24—(Brochure).

"Telecom Developers '92", Jan. 1992—(Advertisement).

Newton, Henry, "The Sheer Thrill Of It All", *Teleconnect*, May 1991.

"AFIPS Conference Proceedings", 1987 National Computer Conference, Jun. 15–18, 1987, Chicago, Illinois "Dynamic Network Allocation".

"Calling your computer is as easy as calling your broker, says AT&T", *Record*, Nov. 1985.

Singleton, L.A., "Telecommunications in the Information Age", Chapter 12, pp. 115–125—(Chapter from a Book).

Weitzen, H.S., "Telephone Magic", pp. 28–31, 38–39, 54–55, 62–67, 70–79, 82–85, 88–91, 106–115, 118–121, 126–127, 134–137, 176–177, Index—(Chapters from a Book).

Weitzen, H.S., et al., "Infopreneurs", pp. 18–19, 138–145, 206–209, Index—(Chapters from a Book).

Sullivan, Kathleen, "Paper firm relies on voice–based inventory system", *IDG Communications, Inc.*, Sep. 10, 1984—(Script).

"VTK Training Section" and "Disk Initialization Procedures for VTK–30/60", *Voicetek Corporation*—(Manual).

"VoiceStor Systems Integration Guide", *Voicetek Corporation*, May 2, 1983—(Manual).

"VTK 60 Voice Computer—Technical Description", *Voicetek Corporation*, Oct. 1986—(Manual).

"Voicetek VS–50 Telephone Interface System", Apr. 25, 1984, System Integration Guide—(Manual).

"VTK Voice System—Programmers Guide", *Voicetek*—(Manual).

"Disk Initialization Procedures for VTK–30/60", *Voicetek Corporation*—(Manual).

"VTK81 Voice Computer—Technical Description", *Voicetek Corporation*, Oct. 1986—(Manual).

"VTK Voice System—VTK/CE Guide", *Voicetek*, Jul. 6, 1987—(Manual).

Newton, Harry, "Newton's Telecom dictionary", *Telecom Library Inc.*, 1991—(Advertisement).

"1987 Buyers Guide", *Teleconnect*, Jul. 1987, pp. 194, 197–210—(Brochure).

Syntellect Inc.—Advertisements.

Various copies of Business cards.

Guncheon, M.C., "The Incredible Dial–A–Message Directory", *Contemporary Books, Inc.*, 1985—(Directory).

"Voice Box Maintenance Manual", *Periphonics*, 1986—(Manual).

"Voicepac Maintenance Manual", *Periphonics*, 1984—(Manual).

Dyer, Ellen, "Wichita Firm Sells 25% Share", Dec. 14, 1987, and "Spectrum Carving Role in Volatile Business", Jul. 7, 1986, Search Results.

"Don't Miss The Unique Gift Idea Of The Year", *Yam Educational Software*, 1987—(Advertisement).

"Welcome to the future of advertising.", *Teleline, Inc.*, 1990—(Presentation).

"Greeting Card Project", *Teleline, Inc.*, Nov. 7, 1988—(Flow Chart).

Sharkey, Betsy, "Dialing for Dollars and Data", *Adweek*, Nov. 16, 1987, pp. 6–8—(Article).

Gay, Verne, "CBS may tie rates to buying p?", 1988—(Article).

Flanagan, J.L., et al., "Synthetic Voices For Computers", *IEEE International Conference on Communications*, 1970, pp. 45–9—45–10—(Conference Record).

Rabiner, L.R., et al., "Computer Voice Response Using Low Bit Rate Synthetic Speech", *Digest IEEE 71 International Convention*, Mar. 22–25, 1971, p. 1–2, Fig. 1–2—(Paper).

"DT1000 DIGITALKER Speech Synthesis Evaluation Board", *National Semiconductor Corp.*, Oct. 1980—(Manual).

"Data Set 407C Interface Specifications Nov. 1977", *Bell System Technical Reference*, Nov. 1977, pp. 1–50—(Paper).

Broomfield, R.A., et al., "Making a data terminal out of the Touch–Tone telephone", *Electronics*, Jul. 3, 1980, pp. 124–129—(Paper).

Godfrey, D., et al., "The Telidon Book—Designing and Using Videotex Systems", pp. 1–103—(Book).

"Industry Marketing Bulletin", *Honeywell EDP Wellesley Hills*, Aug. 9, 1967.

"Honeywell Communications Configuration Charts And Aids In Designing", *Data Communications*, pp. 3–1—3–7 and A.

"Burroughs Audio Response System", Reference Information for Sales Representatives, pp. 1–6 "New Product Announcement", *Burroughs Corporation*, Feb. 5, 1968.

"Stand–Alone Lockbox Application Voice Response (Slave) Communication System Functional Specification", *Cognitronics Corporation*, Feb. 19, 1982, p. 21 "Unlock lockbox reporting. with Cognitronics Voice Response Communications System/Banking.", *Speech–maker a division of Cognitronics Corporation* "Voice Response for Banking", *Cognitronics Corporation* (Brochure) "voice response application brief", *Speech–maker*—(Brochure) "Instant credit authorization is an easy touch when any telephone is a voice response computer terminal", *Speech–maker a division of Cognitronics Corporation*—(Article).

Slutsker, Gary, "Relationship marketing", *Forbes*, Apr. 3, 1989—(Article).

Finnigan, P.F., "To Our Shareholders", Jun. 1985, Apr. 7, 1986, Apr. 10, 1987—(Letters) "International Programs" (Voicemail).

Finnigan, P.F., "Our guest", *Radio–Schweiz AG Telekommunikation und Flugsicherung*, Jan. 1983, pp. 12–14—(Bulletin).

Finnigan, P.F., "Voice mail", *1983 National Computer Conference*, May 16–19, 1983, Anaheim, CA, pp. 375–377 and Abstract.

"Conversations in Your Mailbox", *Software News*, Jan. 1985—(Article).

Fredric, Paul, "Voicemail Int'l, Radio Page America To Offer A 'Pocket News Network'", *Communications Week*, Jul. 8, 1985—(Article).

"Voice–Messaging System: Use It While You're In, Not Out", *Information WEEK*—(Article).

"Corporate Performance—Companies To Watch", *Fortune*, Sep. 30, 1985—(Article).

"Dream Weaver", *Jon Lindy*, Aug. 1986, pp. 32–35, 37—(Article).

"Turn any telephone into a complete electronic message service", *Voicemail*—(Brochure).

Pages from Company Brochure, *Televoice International, Inc.*

"VMI Big Talker", *Voicemail International, Inc.*—(Newsletter).

"Newsline", *Voicemail International, Inc.*, Oct. 1984 and Nov. 1984, "Voiceletter No. 1", *Voicemail International, Inc.*, Dec. 1985.

"A New, More Productive Way to Use the Telephone", *Voicemail International, Inc.*—(Brochure) "While You Were Out . . . "—(Brochure) "?For People Who Can't Afford To Miss Messages", *Voicemail International, Inc.*—(Brochure) "Voicemail The electronic news service saves time, money and nerves", *Radio–Suisse Ltd.*, (Voicemail Agent for Europe)—(Brochure) "Are You Being Robbed of Your Time . . . ?", *Voicemail International, Inc.*—(Brochure).

"Voicemail Instruction Manual B—85", *Televoice International*, Nov. 1980—(Manual) "Local Telephone Numbers"(for Voicemail) and "Televoice Is As Easy As 1, 2, 3 !", *Televoice International*—(Manual) "Voicemail Instruction Manual C—25", *Televoice International*, Jun. 1981—(Manual) "Telephone Numbers" (for Voicemail) and "How To Use Voicemail", *Televoice International*—(Manual) "Message Receiving/Sending" (and others), *Voicemail International, Inc.*—(Manual) "You Can Use Voicemail To Send And Receive Messages At Anytime Anywhere In The World", *Voicemail International, Inc.*, 1981—(Brochure) "Advanced User Guide", *Voicemail International, Inc.*—(Manual) "Voicemail's Basic User's Guide", *Voicemail International, Inc.*—(Manual).

"Welcome To Dowphone", *Dowphone*, Jan. 1986—(Manual).
"Telephone 1–800 Check–PDR", *Officers of Medical Economics Company, Inc.*, 1986—(Circulation/Brochure).
"Turn your telephone into an efficient electronic "mailbox"", *Western Union*, Jan. 1984,—(Brochure) "Western Union Voice Message Service User's Guide", *Western Union*, Jul. 1984—(Brochure).
"PSA's 24 hour reservation system", *PSA*, Sep. 1986—(Brochure).
"To Better Serve Your Business, We're On Call Days, Nights and Weekends.", *Maryland Business Assistance Center*—(Brochure).
"Voice Response: Breaks Trough Call Blockage.", *Business Week*, Aug. 26, 1985—(Advertisement for Preception Technology Corporation).
"Tools for heavy hitters", *Forbes*, May 6, 1985.
"The Fidelity Automated Service Telephone", *Fidelity Group*—(Manual/Brochure).
"Stockquote Hotline", *Norwest Brokerage Services*—(Brochure) "All You Need To Get The Stock Quotes And News You Want." *Dowphone*, 1984—(Advertisement).
"The Most Respected Name In Telemarketing", *West Interactive Corporation*—(2 Brochures).
Borison, V.S., "TRANSACTION—telephone gets the fact at the point of sale", *Bell Laboratories Record*, Oct. 1975, pp. 377–383—(Article).
Demeautis, M., et al., "The TV 200 A Transactional Telephone", *Commutation & Transmission n 5*, 1985, pp. 71–82—(Article).
Eriksson, G., et al, "Voice and Data Workstations and Services in the ISDN", *Ericsson Review.*, May 1984, pp. 14–19—(Article).
Schrage, Michael, "A Game Von Meister in Pursuit of Profits", *Washington Post*, Sep. 23, 1985—(Article).
Svigals, J., "Low Cost Point–Of–Sale Terminal"*IBM Technical Disclosure Bulletin*, Sep. 1982, vol. 25, No. 4, p. 1835.
Turbat, A., "Telepayment And Electronic Money The Smart Card", *Commutation & Transmission n 5*, 1982, pp. 11–20—(Article).
"Voice Mail", *Sound & Communications*, Apr. 1983, vol. 28, No. 12, pp. 84–85—(Article).
Aso, Satoshi, "Trends and Applications of Voice Output Devices", *2209 J.E.E. Journal of Electronic Engineering*, Feb. 1982, vol. 19, No. 182, pp. 102–107—(Article).
Kroemer, F., "TELEBOX", Unterrichtsblätter, year 38/1985, No. 4, pp. 131–141 (Article)—no translation.
Kroemer, F., "TELEBOX", Unterrichtsblätter, year 41/1988, No. 2, pp. 67–83 (Article)—no translation.
C.R. Newson, "Merlin Voice Mail VM600," British Telecommunications Engineering, vol. 4, Apr. 1985, pp. 32–35.
A.S. Yatagai, "Telephonic Voice Synthesis Systems," Telecommunications, Aug. 1985, pp. 56h–I, 68.
A.J. Waite, "Getting Personal With New Technologies For Telemarketers," DM News, Feb. 15, 1987 at 50 *.
"Shopping via a network is no longer just talk," Data Communications, Aug. 1981 at 43.
"Growth–Oriented Systems," Restaurant Technology, Nation's Restaurant News Newspaper, Jul. 1, 1985 at 51.
"Let your fingers do the tapping . . . and the computer the talking," Modern Office Tech., May 1984 at 80.
"American Software unveils systems for IBM mainframes," Computerworld, Mar. 26, 1984 at 59.

"Business Units Get Order Entry," Computerworld, Jul. 12, 1982 at 36.
Dial Info Articles (various articles with various dates) (R0016101–R0016188).
Svigals, J., "Security Method For Remote Telephone Banking," IBM Technical Disclosure Bulletin, vol. 23, No. 12, May 1981, pp. 5306–5307 (pb424).
AT&T Conversant Voice Response Systems Historical Overview, Jan. 1988 (FD 023585–FD023596).
"All About Automated Attendant Systems," Datapro Research Corporation, Mar. 1987 (SM 1000682–SM 1000691).
"New Product—Dytel's Automated Switchboard Attendant," reprinted from Business Communications Review, Mar.–Apr. 1984, pp. 39–41 (SM10006976–SM1000699).
Arbogast, James G. et al., "Home Diabetes Monitoring Through Touch–Tone Computer Data Entry and Voice Synthesizer Response," Annual Symposium on Computer Applications in Medical Care 8th Care Proceedings—Eighth Annual Symposium on Computer Applications in Medical Care, 1984 (MMI 020731).
Perdue, Robert J., et al., "AT&T Voice Processing System Architectures," AT&T Technical Journal, Sep./Oct. 1990, pp. 52–60 (MMI 024142–MMI 024151).
Sable, E.G., et al., "AT&T Network Services Architecture Capabilities, Administration and Performance," AT&T Technical Papers, International Switching Symposium–ISS '87, AT&T Network Systems, Mar. 15, 1987.
"The Stored Program Controlled Network" The Bell System Technical Journal, Sep. 1982.
The World's Telephones, a Statistical Compilation as of Jan. 1980, AT&T Long Lines, 1981 (Book).
Engineering and Operations in the Bell System, AT&T Bell Laboratories, 1983 (Book).
Joel, A.E., "A History of Engineering and Science in the Bell System, Switching Technology (1925–1975)," Bell Telephone Laboratories, 1982 (Book).
"ISDN—Proceedings of the conference held in San Francisco, Nov. 1986," OnLine, New York: London.
Raack, G.A., et al., "Customer Control of Network Services," IEEE Communications Magazine, Oct. 1984 (A21717089) also ISS 84, Florence Italy, May 1984.
Soderberg, J.H., "Machines at your Fingertips," Bell Laboratories Record, Jul. 1969 (A21717175).
Gawrys, G.W. et al., "A New Protocol for Call Handling Functions for the SPC Network," Globecrom '82 Conference Record, Nov./Dec. 1982.
Buss, C.M., "Tuning the Human/Machine Interface for AT&T Advanced 800 Service," IEEE, Jul. 1985.
Asmuth, R.L., et al., "Transaction Capabilities for Network Services," Globecom '85 IEEE Global Telecommunications Conference, New Orleans, Dec. 1985.
Mahood, Gerald K., "Human Factors in TOUCH–TONE Data Systems," Bell Laboratories Record, Dec. 1971 (A21717170).
"4 ESS System Evolution," Bell System Technical Journal, Aug. 1981.
Basinger, R. G., et al., "Calling Card Service—Overall Description and Operational Characteristics", The Bell System Technical Journal, Sep., 1982.
Confalone, D. E., et al, "Calling Card Service—TSPS Hardware, Software, and Signaling Implementation", The Bell System Technical Journal, Sep., 1982.

Eigen, D.J., et al., "Calling Card Service—Human Factors Studies", The Bell Technical Journal, Sep., 1982.

Lexis Search, Nov. 1, 1984, re: System 85 Computer Process.

Lexis Search, Jan. 28, 1985, re: Rolm Releases Four–Channel Phonemail Voice Message Unit.

Inquiry Letter To The F.C.C., From Attorneys For the Prior Title Holder Seeking Rulings That A Particular Game wold Not Be Considered A Lottery Under F.C.C. Reply Letter From The F.C.C. To The Inquiry Letter Stating The Requested Rulings.

Reply Letter From The F.C.C. To The Inquiry Letter Stating The Requested Rulings.

A page (p. 7) from literature on the Charles Schwab corporation, which is not dated nor identified.

A page (p. 4) from an annual report dated Mar. 1, 1989, though the actual date on which the report was distributed to the public is unknown.

An early brochure based on a Mar., 1989, survey by Charles Schwab & Co., Inc.

A trademark scan (U.S. Federal) indicating a first date of use for Telebroker in Jun. 18, 1988.

Bulfer, Andrew F., "AT&T's Pay–Per–View Television Trial", published in AT&T Technical Journal, May/Jun., 1987.

Friedes, A., et al., "ISDN opportunities for large business—800 service customers," IEEE International Conference on Communications '86, Jun. 22–25, 19086, vol. 1, pp. 28–32.

Allyn, Mark R. et al., "Planning for people: Human factors in the design of a new service," Bell Laboratories Record, May 1980, pp. 155–161.

Hanson, Bruce L., et al., "No. 1A VSS New custom calling services," Bell Laboratories Record, Jun. 1980, pp. 174–180.

Aarons, D., "The Voice of the 80's," PC Magazine, vol. 4, No. 5, Mar. 5, 1985, p. 114 (A21707135).

"ACD 'Magic' from AT&T's Merlin," Telecommunications Product Review, vol. 13, No. 4, Apr. 1986 (A21708371).

"Actor Promotes Phone Services," Hammond Louisiana Star, Aug. 23, 1984 (A21708860).

Allerbeck, M., "Experience with the Voice Mail System EMS 2000 Info—Results of an Acceptance Study," ISS '84 Florence, May 1984, Session 14 A, Paper 6, p. 1.

Amano, Fumio, et al., "Imagephone!!: Integrated Voice/Data Terminal With Hand–Drawing Man–Machine Interface," IEEE, 1985 (A03701430).

Ambrosio, Johanna, "Electronic and Voice Mail; They're No Match for Each Other–Yet," Computerworld, May 19, 1986, p. 53 (A21708461).

"American–Network: Files Complaint Against Pacific Northwest Bell," Business Wire, Jun. 4, 1986 (A21708495).

"American–Network: Signs Letter of Intent to Merge L D Communications Long Distance Service into the Company," Business Wire, Aug. 14, 1984 (A21708856).

Andrews, Edmund L., "Patents: Computer System Lets TV Audience Join Show," The New York Times, Dec. 24, 1988 (A01331146).

Arnst, Catherine, Press Release, Reuters, Sep. 16, 1984 (A21708908).

"AT&T Announces Major Additions to Telemarketing Products and Services," Telephone News, Dec. 14, 1987 (A21723927).

"AT&T; AT&T Announces New Software Enhancements," Business Wire, Feb. 10, 1987 (A21707782).

"AT&T Announces New Software Enhancements for its PBX," PR Newswire, Feb. 10, 1987 (A21707779).

"AT&T Computer System will be Produced Here," The Columbus Dispatch, Sep. 9, 1985 (A01354694).

"AT&T CPU Puts Voice Recog on Any Phone," Article Source Unknown (A01354681).

"AT&T Inaugurates Pay–Per–View TV," Bell Laboratories Record, Jan. 1986 (A21708191) repeated (A21716664).

"AT&T's Digital MERLIN," Telecommunications Product Review, vol. 13, No. 7, Jul. 1987 (A21724743).

"AT&T's Flagship System 75: A Comprehensive Analysis of the System 85's 'Little Cousin,'" Telecommunications Product Review, vol. 11, No. 7, Jul. 1984 (A21724612).

"AT&T Forms Unit to Sell Synthetic Speech Systems," Wall Street Journal, Sep. 10, 1985 (A01354689).

"AT&T Plans Computer Unit," The New York Times, Sep. 10, 1985 (A01354690).

"AT&T; Showtime's Viewer's Choice, Viacom Cable and AT&T to Test Pay–Per–View Ordering System," Business Wire, Dec. 5, 1985 (A21708103).

"AT&T Sports Service," PR Newswire, Sep. 24, 1980 (A21710432).

"The AT&T System 25," Telecommunications Product Review, vol. 13, No. 8, Aug. 1986 (A21706368).

Press Release, PR Newswire, Nov. 1, 1984 (A21708963).

AT&T Technical Journal—The 5ESS Switching System, vol. 64, No. 6, Part 2, Jul.–Aug. 1985 (A21723626).

Excerpt from AT&T Technical Journal, Sep.–Oct. 1990, pp. 53–60 (A21723942).

"Automated Switchboard Attendant Helps Insuance Company Control Net Expenses," Communications News, Jul. 1985 (A21726011).

Aversano, Nina, "The Telephone as Computer," Review of Business, Fall 1989, p.5 (A21723928).

Ayres, Paul, "Voice Response Pay–By–Phone Matures," Computerworld, Nov. 9, 1979, p. 47 (A21725960).

Baker, Janet M., "Voice–Store–And–Forward: The Voice Message Medium," Speech Technology, Aug.–Sep. 1984 (A21724633).

Bakke, Bruce B., "Electronic Voice Mailbox: Potential for Fast Growth," BC Cycle, Jun. 29, 1984 (A21708785).

Bakke, Bruce, B., "GTE's 'Voice Mailboxes' Page the World," U.P.I., Apr. 11, 1983 (A21713359).

Barbetta, Frank, "AT&T Offers Digital PBX Enhancements," Electronic News, vol. 30,, Nov. 5, 1984, p. 69 (A21708967).

Barbetta, Frank, "Custom Functions Offered in New AT&T Co. Package," Article Source Unknown (A21726008).

Barkauskas, B. J., et al., "Network Services Complex: A Generalized Customer Interface to the Telephone Network," IEEE International Conference on Communications, Conference Record, vol. 2, Jun. 1983, p. 805 (A21725715).

Barlin, David, "Switch–Hitter: A Data Man's Guide to the World of Voice," Data Communications, Oct. 1984, p. 114 (A21708926).

Basso, Richard J., et al., "Expanding the Capabilities of the ! Traffic Service Position System," Bell Laboratories Record, Feb. 1983, pp. 22–27 (A21724556).

Belcher, Jerry, "Earthquakes in Mexico; U. S. Relief Includes Hardware, Experts; Cash Aid Suggested," Los Angeles Times, Sep. 22, 1985 (A21708026).

"Bell Files Tariffs on CO–Based Switching System in PA.," Communications, Date Unknown (A21725944).

Bell Laboratories Record, Aug. 1984, Cover Page and Table of Contents (A21708811).

The Bell System Technical Journal, May–Jun. 1982 (A21709814).

Excerpt from The Bell System Technical Journal, Oct. 1980, pp. 1384–1395.

Bertoglio, O., et al., "An Interactive Procedure for Voice Messaging Services in a Traditional Network," CSELT Technical Reports, vol. 12, Supplement 10, No. 3, Jun. 1984 (A21708755).

Bingham, Sanford, "Groceries By Phone," Inbound/Outbound, Aug. 1988 (A21725728).

"Some Tips on Integration," Inbound/Outbound, Aug. 1988 (A21725731).

Black, Philip, "How ISDN Services Could Make or Break the Big Network," Data Communications, Jun. 1984, p. 247 (A21708771).

"'Blast' from Data Systems Runs Under DG's AOS/VS," Computerworld, May 3, 1982, p. 38 (A21724423).

Booker, Ellis, "How to Save Big Bucks on Phone Calls," Computer Decisions, vol. 16, Nov. 15, 1984, p. 16 (A21708983).

Borchering, J. W., et al., "Customized Switching Systems," ISS'84 Florence, May 1984, Session 14 A, Paper 4, pp. 1–5 (A21725533).

Bowling, Tom, "Pay TV: A Pay–Per–Minute System Prototype," Television: Journal of the Royal Television Society, Mar.–Apr. 1984, pp. 79–83 (A21724588).

Brady, Erik, "Players, Fans Get Back in the Swing," USA Today, Date Unknown (A21706710).

Brady, Erik, "Resentful Fans Verbally Strike Back," USA Today, Date Unknown (A21706709).

Brooke, Jill, "A Hi–Tech Interactive TV Service is Planned," New York Post, Jan. 20, 1989 (A01331148).

Brown, Jim, "Contracts; Rolm Wins College Bid," Network World, Mar. 9, 1987, p. 4 (A21707859).

Brown, Jim, et al., "ICA Preview; AT&T May Steal Show," Network World, May 26, 1986, p. 1 (A21708473).

Brown, Jim, et al., "PBX Market; Rolm Beefs up CBX Line Capacity," Network World, Feb. 9, 1987, p. 4 A2170777).

Brown, Jim, "VMX 5000 Series; Voice Messager Debuts," Network World, Oct. 13, 1986, p. 6 (A21706653).

Brown, Jim, "Voice Mail; Rolm to Accounce New LowCost Phonemail," Network World, Feb. 2, 1987 (A21707763).

Buckhout, Wayne, "Columbus–Born AT&T Computer Listens, Talks and Shows Promise," Article Source Unknown, Sep. 10, 1985 (A01354692).

Bulfer, Andrew F., et al., "A Trial of a National Pay–Per–View Ordering and Billing System," NCTA, 1986 (A21724669).

Burstyn, H. Paris, "Phone Features: The Next Wave," High Technology, Jun. 1986 (A21726009).

Capital Cities/ABC Video Enterprises, Inc. Teams with FDR Interactive Technologies to Explore Applications for New Telephone Technology, Capital Cities/ABC, Inc. Broadcast Group, Jan. 19, 1989 (A01331147).

Carlson, Rolf, et al,, "Text–To–Speech conversion in Telecommunications," Proceedings of the Tenth International Symposium on Human Factors in Telecommunications, Jun. 1983, pp. 239–245 (A21725801).

Press Release, PR Newswire, Dec. 5, 1985 (A21708106).

Chapin, Dwight, "A Kids' Game," Article Source Unknown (A21706674).

Charlish, Geoffrey, "Telephone Message that Failed to Get Across to the U. K.," Financial Times, Jan. 16, 1986 (A21708203).

Collins, Francis R., "Reality of Equal Access: Implementation Problems," Telephone Engineer & Management, vol. 88, Sep. 1, 1984, p. 128 (A21708884).

"Company News: Phone Service to be Tested," The New York Times, Jan. 20, 1989 (A01331395).

"Components," Electronic News, 1984 (A21726007).

"Computerized Telecommunications Switching Systems," Article Source Unknown.

Connolly, James, "Republican Convention Set to Test Telecommunications," Computerworld, Jul. 9, 1984, p. 17 (A21708804).

Conroy, Cathryn, "Audiotex Arrives," Monitor, Date Unknown (W71189).

"Corporate Preoccupation with Costs Spurs Telephone Management Sales," Computerworld Focus, May 14, 1986, p. 13 (A21708457).

Cox, John D., "Talk Into Telephone, Command a Computer," The Sacramento Bee, Sep. 10, 2985 (A01354683).

"CPU, PBX Vendors Drawing Alliances," Computerworld, Apr. 23, 1984, p. 15 (A21708674).

Crawford, K. E., et al., "4A Toll Crossbar Application," The Bell System Technical Journal, vol. 57, No. 2, Feb. 1978, pp. 283–323 (A21716223).

Croxall, L. M., et al., "Operational Experience with the 5ESS™ Switch," ISS Florence, Session 42 A, Paper 4, May 1984 (A21725550).

Cummings, Steve, "Voice–Mail Systems Attract Tentative Interest," PC Week, vol. 3, No. 49, Dec. 9, 1986, p. 140 (A21707565).

Curtis, Janice, "At a Turning Point, VMX Makes Moves to Boost Voice Messaging Business," Dallas Business Courier, vol. 2, No. 13, Section 1, Jul. 14, 1986, p. 19 (A21706328).

Daniel, Heidi C., "Inventor Battles Computer Giants," South Florida Business Journal, Aug. 12, 1985 (A21707969).

Press Release, Communications Daily, vol. 4, No. 177, Sep. 11, 1984, p. 7 (A21708903).

Danner, Patrick, "Dial Info Charges Electronics Giant Disconnected Deal," San Francisco Business Times, vol. 2, No. 33, Apr. 18, 1988 (A21724767).

Excerpt from Data Communications, Sep. 1985, pp. 399–410 (A21707991).

Davis, Judith R., "Voice Messaging System," Patricia Seybold's Office Computing Report, vol. 10, No. 9, p. 1–28 (A21716964).

Day, J. F., et al., "Networking Voice and Data with a Digital PBX," AT&T Technology, Date Unknown (A21707584).

Whitten, W. B., II, "Advanced Interfaces Speed Delivery of Services," AT&T Technology, Date Unknown (A21707593).

"Definity Announcement Includes Other New Products," Telecommunications Product Review, vol. 16, No. 3, Mar. 1989 (A21712758).

DeLessio, N. X., et al., "An Integrated Operator Services Capability for the 5ESS System," ISS '84 Florence, May 1984, Session 22 C, Paper 3, Page 1–5 (A21725538).

Desmond, Paul, "Patented Call–Routing Tool Boon for Retail Industry; Instalink Will Use ISDN for Automatic No. ID," Network World, Aug. 1, 1988 (A21712653).

"Dial–A–Drill," The New York Times, Jan. 20, 1969 (A21725951).

"Dialing for Pennies," California Living Magazine, Aug. 12, 1984 (A21708855).

"Distributed Data Processing and Messaging Systems," Data Communications, May 1986, p. 105 (A21708428).

Dix, John, "AT&T Breathes New Life into its Switch–and–Wire Beast," Network World, Oct. 27, 1986, p. 1 (A21706662).

Dix, John, "AT&T Tries Different Tack," Computerworld, Nov. 25, 1985, p. 19 (A21708097).

Dix, John, "AT&T Unleashes 'Gazelle,'" Computerworld, Apr. 30, 1984, p. 2 (A21708710).

Dix, John, "Enhancements Out for AT&T's High–End PBX," Computerworld, Nov. 12, 1984, p. 99 (A21708970).

Brown, Jim, "VMX 5000 Series: Voice Messager Debuts," Network World, Oct. 13, 1986, p. 6 (A21706653).

Dix, John, "Ford Motor Co.; Driving Down Costs with Voice Mailboxes," Network World, Jul. 14, 1986, p. 32 (A21706326).

Dix, John, "'Hello, This is a Voice Mail Recording.,'" Network World, Jul. 14, 1986, p. 1 (A21706331).

Dix, John, "Rolm; Long–Awaited Redwood to Debut at ICA Today," Network World, Jun. 2, 1986, p. 4 (A21708493).

Dix, John, "Switch Management: DEC Tools Debut at ICA," Network World, Jun. 9, 1986, p. 8 (A21708497).

Dix, John, "Unified Messaging; AT&T Reveals New Message Blueprint," Network World, Sep. 22, 1986, p. 1 (A21706473).

Dix, John, "Voice/Data PBXs: More than Today's Users Need?," Computerworld, Apr. 23, 1984, p. 14 (A21708669).

Dorros, Irwin, "Evolving Capabilities of the Public Switched Telecommunications Network," Business Communications Review, Jan.–Feb. 1981 (A21725652).

Dowd, Ann Reilly, et al., "Dollars from Dialing," Fortune, Mar. 16, 1987, p. 10 (A21707869).

Drinkwater, Larry, "Voice Processing: An Emerging Computer ? Technology," Speech Technology, Aug.–Sep. 1984, pp. 50–54 (A21708826) (illegible).

Edwards, M., "Digital PBXs Zero in on the Key Role as Hub of Office," Communications News, vol. 21, No. 12, Dec. 1984, p. 44 (A21708992).

Egly, Diana G., et al., "Mnemonic Aids for TelephoneBased Interfaces," Proceedings of the Eleventh International Symposium on Human Factors in Telecommunications, Sep. 1985 (A21725818).

Eichenwald, Kurt, "Just a Phone Call Away: More Dial–It Services," The New York Times, Apr. 16, 1988 (A21725852).

Excerpt from Electrical Communication Facilities (in Japanese), vol. 33, No. 9, 1981 (A21724248).

"Electronic Switching: Digital Central Office Systems of the World," Edited by Amos E. Joel, Jr., IEEE Press, 1982 (A21716673).

"Electronic Voice Mail Revolutionizing Communications," Tulsa Business Chronicle, vol. 5, No. 26, Jun. 30, 1986 (A21708510).

Press Release, PR Newswire, Mar. 20, 1984 (A21708647).

Elliot, Thomas R., "A Voice in the Wilderness," Computerworld, Jun. 13, 1984, p. 76 (A21708779).

Emerson, Jim, "Catalog Business," DM News, Dec. 15, 1985 (A21708115).

Emerson, Jim, "Eliminating Live Operators," DM News, Dec. 15, 1985 (A21708114).

Engelbardt, Robert M., "Island Paradise Gets System Update," Telephone Engineer & Management, vol. 88, Sep. 15, 1984, p. 104 (A21708904).

Evan, S. A., et al., "Talking and Listening to the Conversant 1 Voice System," AT&T Technology, Date Unknown (A21710392).

Fantel, Hans, "Video: Movies Hot Off the Tube," The New York Times, Mar. 29, 1987 (A21707890).

"The Father of Voice Messaging," Network World, Nov. 1984, p. 57 (A21708942).

Feldman, Robert, "New AT&T Packages Designed to Spruce up Systems 75/85," MIS Week, Jun. 2, 1986, p. 30 (A21725895).

Fine, Happy, "Tavern on the Bluegrass," Eastern Basketball, Date Unknkown (A21706749).

"Firm Created After Patent Suit Against First Data," Reuters, Oct. 17, 1994 (A01331388).

Fischell, David R., et al., "Interactive Voice Technology Applications," AT&T Technical Journal, Sep.–Oct. 1990 (A34100164).

Foster, Robin Harris, "In the Forefront with Integrated Call Centers," AT&T Technology, vol. 7, No. 4, 1992 (A21712913).

Froehlich, F. E., et al., "The Switched Network Transaction Telephone System," The Bell System Technical Journal, vol. 57, No. 10, Dec. 1978, pp. 3475–3485 (A21725995).

Froehlich, Leopold, "Are Smart Buildings a Dumb Idea? If They're Going to Prosper, Shared Service Providers Will Have to Move from Telephony into Office Automation," Datamation, vol. 31, Oct. 1, 1985, p. 101 (A21708046).

Gates, G. W., et al., "Software," The Bell System Technical Journal, vol. 61, No. 5, May–Jun. 1982, pp. 863–883 (A21725913).

Gawron, L. J., et al., "Scanned–Image Technologies Bring New Ways to Conduct Business," AT&T Technology, vol. 6, No. 4, 1991 (A21713611).

Gawronski, Jane Donnelly, et al., "Audio Response System to Practice Mental Computation Skills," Proceedings of the Digital Equipment Computer Users Society, vol. 1, No. 2, Fall 1974, pp. 633–636 (A21725979).

Gawrys, G. W., "ISDN: Integrated Network/Premises Solutions for Customer Needs," IEEE, 1986, pp. 1.1.1–1.1.5 (A21725555).

Gaylord, D. M., "Better Health for Hospitals with DIMENSION 2000 PBX," Bell Laboratories Record, Jul.–Aug. 1981, pp. 170–173 (A21724371).

Gerald, Jeannette A., "A Voice Response System for General Aviation Pilots," Article Source Unknown (A21708877).

Gibson, Stanley, "Audix Upgrades Include Messaging, Billing, Management," Computerworld, Dec. 15, 1986, p. 29 (A21707568).

Gibson, Stanley, "Octel Links Voice Mail System to Rolm PBX," Computerworld, Dec. 8, 1986, p. 42 (A21707564).

Gillon, A. C., et al., "Voice Power Gives You Voice Messaging—And Then Some," AT&T Technology, vol. 4, No. 2, 1989 (A21712712) repeated (A21724818).

Gitten, L. J., et al., "5ESS System Evolution," ISS Florence, Session 41 A, Paper 1, May 1984 (A21725543).

Goecke, D., et al., "A Software Engineering Approach Applied to the Complete Design and Production Process of Large Communication Systems Software," ISS '84 Florence, Session 13 C, Paper 1, May 1984.

Goldstein, Mark L., "Send A Message. Now! New Digital Networks Can Give Companies a Competitive Edge," Industry Week, Jul. 21, 1986, p. 43 (A21706347).

"Gotcha!," Edited by John A. Conway, Forbes, Mar. 10, 1986, p. 9 (A21708345).

Gottlieb, Dan, "Does the Bell Toll for Voice/Data Independents?," Purchasing, Dec. 13, 1984, pp. 103–108 (A21724641).
Grau, Jeff, "IBM Hints at Entering Voice Response Market in 1992," Article Source Unknown, Dec. 11, 1990 (A01346366).
Greene, James E., et al., "Voice Response System Sticks to the Script and Saves Time, Money and Tempers for University Students and Adminstrators," Communication Age, Jan. 1986 (A21724080).
Grumhaus, Audrey, "What's New in Telephone Service: Some Bad News for Nuisance Callers," The New York Times, Nov. 16, 1986 (A21725855) repeated (A21725857).
Grunbaum, Rami, "Genesis Electronics Heeds the Voice Mail Calling," The Business Journal—Sacramento, vol. 2, No. 49, Mar. 10, 1986 (A21708341).
Gunderson, Gary W., "Computer Consoles; Can Your Community Save Lives when Seconds Count?," Business Wire, Feb. 11, 1987 (A21707785).
Hafner, Katherine, "Hello Voice Mail, Goodbye Message Slips," Business Week, Jun. 16, 1986 (A21708507).
Hafner, Katherine, "System 85 Targets Leading–Edge Users: NBI," Computerworld, Sep. 5, 1983, p. 53 (A21724580).
Hafner, Katherine, "Temporary Telephones," Network World, May 2, 1984 (A21708739).
Hafner, Katherine, "The Venture Capital Adventure," Network World, Aug. 1, 1984 (A21708837).
Hamel, Bob, "Voice Messaging; VMX Gives Firms Edge," Network World, Mar. 16, 1987 (A21707864).
Hanson, Robert J., "The DSC–2000 VoiceServer System," Speech Technology, Aug.–Sep. 1984, pp. 55–65 (A21708818).
Herits, E., et al., "A New Look for the White Pages," Bell Laboratories Record, Jun. 1980 (A21709547).
Hardy, James O., et al., "Handling Coin Toll Calls—Automatically," Bell Laboratories Record, Sep. 1980, pp. 256–262 (A21710422).
Harrar, George, "Interview: Ed Landry; Making Office Connections at John Hancock," Computerworld, Apr. 14, 1986, p. 63 (A21708404).
Hasui, Kouya, et al., "Man–Machine Interfaces in Office Communication Systems," IEEE Communications Magazine, vol. 24, No. 7, Jul. 1986, pp. 18–23 (A03701435).
Coover, Edwin R., "Voice–Data Integration in the Office: A PBX Approach," IEEE Communications Magazine, vol. 24, No. 7, Jul. 1986, pp. 24–29 (A03701442).
Haszto, E. D., et al., "ALLIANCE Teleconferencing Services Boost Business Efficiency," AT&T Technology, vol. 3, No. 1, 1988 (A21724796).
Heberle, W., "Accumulation of the Signals when Using the Pushbutton Telephone for Data Entry," Proceedings of the 5$^{th}$ International Symposium on Human Factors in Telecommunications, Sep. 1970 (A21725766).
Heffron, W. G., et al., "Transaction Network Service," The Bell System Technical Journal, vol. 57, No. 10, Dec. 1978, pp. 3331–3347 (A21725986).
Henricks, Mark, "DSC Makes Japanese Connection," Dallas–Fort Worth Business Journal, vol. 9, No. 30, Mar. 17, 1986 (A21708347).
Hillhouse, Joseph, "PABX, the Hub: Keeping Communications on Track," Computer Decisions, vol. 16, Nov. 15, 1984, p. 84 (A21708974).
Hindlin, Eric, "PBXs Becoming Practical Alternative to LANs," PC Week, vol. 4, Mar. 17, 1987, p. C16 (A21707870).
Hird, E. V., "Party Line Cost Cutters," Telephone Engineer & Management, vol. 90, May 1, 1986, p. 51 (A21708442).
Hollitz, John, "Giving Information without Human Intervention," The Business Journal—Sacramento, vol. 3, No. 26, Section 1, Sep. 29, 1986, p. 25 (A21706505).
"Home Shopping Network Halts Talks," The Washington Post, Feb. 19, 1987 (A21707804).
"The HORIZON Call Management System Tackles High Call Volume Demands," Telecommunications Product Review, Jan. 1983 (A21724553).
Horton, L. A., et al., "AT&T Systems Link the University of Maryland," AT&T Technology, vol. 7, No. 2, 1992 (A21712897) repeated (A21725512).
Horwitt, Elisabeth, "AT&T Enhancements Fill Gaps in System 75 Ditigal PBX," Computerworld, Jun. 16, 1986 (A21708505).
Horwitt, Elisabeth, "Rolm to Unveil Low–End PBX: Digital System Bucks Feature–Rich Trend," Computerworld, Jun. 2, 1986, p. 8 (A21708489).
Howitt, Doran, "Boom For Voice Mail Systems," InfoWorld, Oct. 29, 1984, pp. 37–38 (A21708940).
Hubbard, Thomas Leo, "Richardson: High–Tech Prosperity," Dallas Magazine, vol. 66, No. 2, Feb. 1987 (A21707741).
Huber, K. M., et al., "Getting the Message with UMS," AT&T Technology, vol. 1, No. 1, 1986 (A21708123).
Swann, L., "Universal Operations Systems—Integrated Building Blocks," AT&T Technology, vol. 1, No. 1, 1986 (A21708141).
Hunter, John J., "Telephone Tag Alternative: Voice Messaging Unshackles Users from Traditional Telephone Limitations," Network World, Jul. 13, 1987 (A21714278).
Hutchins, Dexter, "The Legal Battles Over Voice Messaging," Fortune, Oct. 28, 1985 p. 104 (A21708066).
"IBM Gives Voice to PS/2, RS/5000 Platforms," Voice Processing Newsletter, vol. 10, No. 22, Aug. 1, 1991 (A01346371).
"IBM Introduces 2 Phone Systems," The New York Times, Date Unknown (A01346365).
"IBM, Inventor Reach Patent Agreement," The Washington Post, Aug. 30, 1985 (A21707976).
"IBM Reaches Patent Agreement with Inventor," U.P.I., Aug. 29, 1985 (A21707974).
"IBM–Rolm Eye CBX–SNA Link," Computerworld, Jan.5, 1987 (A21707572).
"IBM Says New Line of Big Computers is Faster than Promised," Wall Street Journal, Date Unknown (A10346364).
"ICA Slates Huge Meeting, Exhibit; Includes Program and List of Exhibitors," Telephone Engineer & Management, vol. 88, Apr. 15, 1984, p. 96 (A21708657).
IEEE Transactions on Consumer Electronics, vol. CE–25, No. 3, Jul. 1979 (A21725141).
"Index to Theses," Edited by Geoffrey M. Paterson, et al., vol. XXVI, Part. 1, 1977 (A21718028).
"Industry Leaders License Katz Interactive Technology Patents," PR Newswire, Sep. 25, 1995 (A01331383).
Press Release, Communications Daily, vol. 5, No. 126, Jun. 28, 1985, p. 5 (A21724661).
"Inside an Internetworking Voice–Mail Processor," Data Communications, Oct. 1986, p. 158 (A21706523).

"Integratec's Niche is Collecting on Delinquent Bank Card Accounts," American Banker, Aug. 10, 1988, p. 22 (A21724771).

"Card Titan Sees Gold in Electronic Commerce," Financial Service Online, Jul. 1996, p. 8 (A21724775).

"International Communications Network Service Installed by Commercial Cable," The Magazine of Bank Management, Jun. 1984, p. 126 (A21708770).

"International Information Network Acquisition," PR Newswire, Nov. 7, 1985 (A21708093).

"International Information Network Agreement," PR Newswire, Dec. 16, 1985 (A21708117.

"International Information Network Announces Agreements," PR Newswire, Feb. 12, 1986 (A21708309).

International Information Network Contract, Article Source Unknown, Feb. 25, 1986 (A21708312).

"International Information Network Earnings," PR Newswire, Dec. 9, 1985 (A21708110).

"International Information Sets Financing Program," PR Newswire, Oct. 22, 1985 (A21708064).

Press Release, Communications Daily, vol. 6, No. 41, Mar. 3, 1986, p. 11 (A21708337) repeated (A21706387).

"Megaphone Intl Wins Calif. Lottery Contract," PR Newswire, Aug. 4, 1986 (A21706387).

"Introducing Voice Quote," The Washington Post, Oct. 9, 1986 (A21707805).

Press Release, Communications Daily, vol. 6, No. 189, Sep. 30, 1986, p. 7 (A21706510).

Press Release, Communications Daily, vol. 6, No. 189, Sep. 30, 1986 (A21706511).

Jenkins, Avery, "Iowa State Launching Campus Wide Network," PC Week, vol. 4, Feb. 3, 1987, p. C14 (A21707767).

Jerman, Max, et al., "A CAI Program for the Home," Educational Technology, Dec. 1971, p. 49 (A21725984).

Johnson, Eric, "Analysts Say that Voice–Message Will Talk up $1 Billion," Data Communications, Jan. 1984, p. 50 (A21708551).

Johnson, J. W., et al., "Integrated Digital Services on the 5ESS™ System," ISS '84 Florence, May 1984, Session 14 A, Paper 3, Pages 1–8 (A21725525).

Johnston, David, "'Pay Radio' Tunes in Charities, Turns off Some Consumer Groups," Los Angeles Times, Part 6, Aug. 24, 1986, p. 1 (A21706399).

Excerpt from Journal of Information Processing Society of Japan (in Japanese), vol. 23, 1981 (A21724246).

Excerpt from Journal of the Institute of Electronics and Communication Engineers of Japan (in Japanese), vol. 60, No. 10, 1977 (A21725080).

Kaplan, Jeffrey M., "4$^{th}$ Generation Lacking," Network World, Oct. 6, 1986, p. 38 (A21706646).

Kaplan, Jeff, "The Uncertain Future of Centrex," Network World, Mar. 14, 1984, p. 17 (A21708640).

Karpinski, Richard, "IBM Offers Voice Processing Line," Telephony, Aug. 5, 1991 (A01346377).

"Katz Scratch Fever," Telemedia News and Views, Date Unknown (A01331216).

Katzel, Jeanine, "Selecting and Installing a Plant PBX System," Plant Engineering, vol. 37, Mar. 3, 1983 (A21713341).

Kawakami, Tokuhiro, et al., "Speaker Independent Speech Recognition and Audio Response System and Facsimile Response System," NEC Technical Journal, vol. 39, No. 7, 1986, pp. 54–79 (A21708159).

Kelleher, Joanne, "Users; Mastering DEC," Computerworld Extra!, Sep. 24, 1986, p. 61 (A21706475).

Kemezis, Paul, "The Shared Tenant–Services Debacle and Lessons from it" Data Communications, Sep. 1986, p. 94 (A21706444).

Koike, H., et al., "An Office–Use Voice Storage System with Elaborate User's Operativity," Proceedings of the Tenth International Symposium on Human Factors in Telecommunications, Jun. 1983, pp. 197–203 (A21725793).

Koike, Tsunehiko, et al., "Parco–Type Audio Response Unit (in Japanese)," Article Source Unknown (A21724841).

"Kokusai Voicemail to Start International Voicemail Service," COMLINE Daily News Telecommunications, Mar. 10, 1987 (A21707861).

Kolodziej, Stan, "Where is the Electronic Messaging Explosion?," Computer World, Oct. 16, 1985, p. 21 (A21708056).

Korzeniowski, Paul, "Voice Messaging; ETS Demise Hits Rolm, Octel Users," Network World, Aug. 4, 1986, p. 1 (A21706390).

Kylin, J. C. et al., "Benefits of Integrating Data Bases into the SPC Network," ICC '79 Conference Record, vol. 1, Jun. 1979 (A21726001).

Lawson, Michael, "AT&T Leaves 'Super–PBX' money on the table for Northern Telecom," Data Communications, Sep. 1987 (A21712210).

Lazarus, George, "Pepsi Also Won the Super Bowl," Chicago Tribune, Jan. 30, 1987 (A21707647).

Lee, Linda, et al., "Meridian SL Information Services," Telesis, 1985, pp. 13–19.

Leibowitz, Ed, "The Wonder Years: Intriguing ACD Trends for the 1990s," Teleconnect, vol. 8, No. 4, Apr. 1990, p. 84 (A21712064).

Levin, David, "Private Branch Exchanges: The Best Time to Shop Might Be Right Now," Data Communications, Aug. 1987, p. 100 (A21714315).

Lineback, J. Robert, "VMX Girds for a Fight in Market it Pioneered," Electronics, May 12, 1986 pp. 55–56 (A21708453).

Lukeson, David R., "CLASS: The Smart Local Telephone Network," Proceedings of the International Congress on Technology and Technology Exchange, Oct. 1984, pp. 100–103 (A21725864).

"The LUMA Visual Telephone," Telecommunications Product Review, vol. 13, No. 7, Jul. 1986 (A21706313).

Lyman, Guy C., III, "Voice Messaging Comes of Age," Speech Technology, Aug.–Sep. 1984, pp. 45–49 (A21724634).

Mankin, Eric, "Playing TV Telephone: New System Opens Door for Audience Participation," Electronic Media, Apr. 24, 1989 (A01331389).

Marino, P. J., et al., "AT&T Communications ISDN Plans," IEEE, 1985, pp. 247–251 (A21723894) repeated (A21725560).

"Marubeni to Install Voice–Box–Mail System," Japan Economic Journal, Mar. 13, 1984, p. 9 (A21708639).

Mason, G. C. W., "Use of Recorded Announcements for Guidance of Users of Telecommunications Networks," Proceedings of the Eighth International Symposium on Human Factors in Telecommunications, Sep. 1977, pp. 257–262 (A21725784).

Massey, David K., "Voicetek Hears Sweet Success with Market Strategy," Boston Business Journal, vol. 7, No. 21, Section 1, Jul. 20, 1987, p. 6 (A21714290).

"The Master of Trivia," The Sporting News, Aug. 19, 1985 (A21706671).

Matheson, David, "ISDN: The Technology has Discovered its Purpose," Telemarketing, May 1990 (A40002414).

Maxemchuk, N. F., "An Experimental Speech Storage and Editing Facility," The Bell System Technical Journal, vol. 59, No. 8, Oct. 1980 (A21724241).

Mearns, Allison B., et al., "Calling Card—Don't Tell It–Dial It," Bell Laboratories Record, May–Jun. 1982, pp. 117–119 (A21709811) repeated (A21709808).

Michaelson, Marlene, "Business, Services Use 'Dial A' Formats," Contra Costa Times, Sep. 8, 1986 (A21707858).

Mier, Edwin E., "A Big Bonanza in Little Switches," Data Communications, Jun. 1984, p. 68 (A21708764).

Miles, J. B., "AT&T System Upstages its FTS Rivals at Shows; The FTS 2000 Telecommunications Contract," Government Computer News, vol. 6, No. 4, Feb. 27, 1987, p. 1 (A21707808).

Miles, J. B., "Bypass Starts to Soar; More Businesses are Avoiding the Public Phone Network as New Technologies Surface and Telecomm Costs Rise," Computer Decisions, vol. 17, Nov. 5, 1985, p. 82 (A21708087).

Miles, J. B., "Network Control Under Control; Corporations Seeking Unified Network Management Systems May Find Hope in Several New Offerings," Computer Decisions, vol. 18, Jul. 15, 1986, p. 70 (A21706340).

Excerpt from Modern Office Technology, Jul. 1986 (A21706315).

Moore, Steve, "Project Management; Anatomy of a Cutover, Part 1" Network World, Aug. 25, 1986, p. 26 (A21706408).

Moore, Steve, "Project Management; Anatomy of a Cutover, Part 2" Network World, Sep. 1, 1986, p. 35 (A21706447).

Press Release, Data Communications, Aug. 1984, p. 58 (A21708825).

"MTV–Networks Signs with American Express Affiliate FDR Interactive Technologies," Business Wire, Mar. 28, 1989 (A01331393).

"NAB in the 'Big D.,'" Broadcasting, vol. 112, Mar. 30, 1987, p. 83 (A21707892).

"National Railways' Seat Reservation System by Touch Tone Telephone," Electrical Communication Facilities, vol. 38, No. 339, 1975 (A21724984).

"Newly Formed company Assigned Several Interactive Technology Patents Following the Settlement of Multimillion Dollar Patent Lawsuit," Business Wire, Oct. 17, 1994 (A01331386).

"New AT&T Device Made in Columbus," Columbus Citizen Journal, Sep. 7, 1985 (A01354693).

"New Products Telecommunications," Sound & Communications, vol. 28, No. 12, Apr. 1983, pp. 84–85 (A21713354).

"New Systems Stem Losses from Credit Card Debt; Technology Streamlines Phone Contacts," American Banker, Aug. 10, 1988 (A21724777).

"New Voice Processing Products Mean Improved Customer Service," Article Source Unknown, (A01346357).

Newton, Harry, "AT&T Information Systems One Year Later," Office Administration and Automation, vol. 45, Jan. 1984, p. 37 (A21708557).

Newton, Harry, "Dumb Smart Switches," Teleconnect, May 1991, pp. 14–18.

Newton, Harry, et al., "Send Us Your Pre–1989 Brochures," Computer Telephony, Oct. 1996, pp. 16–26 (A01331210).

Nishikado, Iwamasa, et al., "Voice Storage System for Centralized Extension System," Review of the Electrical Communication Laboratories, vol. 32, No. 6, 1984, pp. 1010–1018 (A21725924).

Press Release, The American Banker, Oct. 20, 1986, p. 13 (A21706658).

"Northern–Telecom–2; (NT) Northern Telecom Announces Software Feature Package," Business Wire, Feb. 18, 1987 (A21707802).

"No. Telecom Upgrades Digital PBX," Electronic News, vol. 30, Apr. 30, 1984, p. 63 (A21708708).

Nowogrocki, Jim, "City, County Spend About $ 1 Million on 911," St. Louis Business Journal, vol. 6, No. 43, Section 3, Aug. 4, 1986, p. 1C (A21706393).

"Office Automation Advances 'White Collar' Productivity," Dun's Business Month, vol. 126, Mar. 1986, p. 59 (A21708336).

The Official Proceedings of Speech Tech '85, Media Dimensions, Inc., Apr. 1985, Cover and General Information Pages.

Excerpt in Japanese, Article Reference Unknown (A21724849).

Press Release, PR Newswire, May 9, 1986 (A21708451).

Paznik, Megan Jill, "Voice Mail: Pitfalls and Promises," Administrative Management, vol. 48, Mar. 1987, p. 16 (A21707849).

"The PBX Marketplace; Private Branch Exchanges," Administrative Management, vol. 47, Jan. 1986, p. 45 (A21708194).

"Peek at Future of 'General Hospital'" Times–Picayune, Date Unknown (A21708536).

Pelline, Jeff, "AT&T System Links Voice to Computer," San Francisco Chronicle, Sep. 10, 1985 (A01354691).

"Perception Technology; (PCEP) Perception Technology Announces ANI, DID Enhancements," Business Wire, Feb. 27, 1987 (A21707811).

Petit J. C., et al., "GALAXIE: Toward Adaptive Distributed Control Systems," ISS '84 Florence, May 1984, Session 41 A, Paper 3.

Petrosky, Mary, "Interactive Speech System From AT&T's Business Unit," Infoworld, vol. 7, Issue 38, Sep. 23, 1986 (A21708029).

Pfister, George M., "The PBX: What Matters, What Doesn't," Datamation, vol. 30, Aug. 1, 1984, p. 121 (A21708831).

Plakias, Mark, "The Katz that Ate the Canary," Telemedia News and Views, vol. 2, No. 11, Nov. 1994 (A01331037).

Pollack, Andrew, "Autiotex: Data By Telephone," The New York Times, Jan. 5, 1984 (A21725850).

Portantiere, Nick, "AT&T Introduces System 25 Digital PBX," Electronic News, Jul. 7, 1986, p. 34 (A21706324).

Power of Attorney for USPA 5,109,404 Inventor Ronald A. Katz.

Prell, E. M., et al., "The Changing Role of the Operator," International Switching Symposium, May 1979, pp. 697–703 (A21725933).

Prince, Terry, et al., "A Telephone for the 'Checkless' Society," Bell Laboratories Record, Sep. 1972, pp. 249–253 (A21725647).

"Profit from Impulse Pay–Per–View," Advertisement for Science Dynamics Corporation, Telephony, Jul. 14, 1986 (A21706337).

"Prudential Insurance Mortgage by Phone Program," PR Newswire, Feb. 19, 1986 (A21708310).

Pulford, Jack, "Aurora System is Built to Grow," Telephone Engineer & Management, vol. 88, Aug. 1, 1984, p. 78 (A21708841).
Putnam, Jane, "Winners," Contra Costa Sun, Aug. 14, 1985 (A21706705).
"Putting an End to Telephone Tag," ABA Banking Journal, Feb. 1987, (A21707747).
Raack, G. A., et al., "Customer Control of Network Features," ISS '84 Florence, May 1984, Session 14 A, Paper 2 (A21725520) repeated (A21725717).
Raimondi, Donna, "AT&T Debuts Primary Rate for System 85," Computerworld, Feb. 23, 1987, p. 41 (A21707806).
Rappaport, David M., "Voice Mail: Key Tool or Costly Toy," Data Communications, Oct. 1986, p. 153 (A21706526).
"Redwood by Rolm," Telecommunications Product Review, vol. 13, No. 6, Jun. 1986 (A21708487).
Rees, Norm, "Flexible Voice Response Software Speeds Development for Resellers," Speech Technology, Mar.–Apr. 1988, pp. 46–49.
Results of Lexis Search Request for "Call Interactive," Date of search Aug. 5, 1996 (A01331399).
Rice, Valerie, "AT&T Enters Speech–Processing Business, Names First Customers," Investor's Daily, Sep. 10, 1985 (A01354684).
Riederer, S. A., "Conversant VIS Means Business," AT&T Technology, vol. 5, No. 4 (A21711986).
Rangnekar, S., et al., "AT&T Voice Mail Service," AT&T Technology, vol. 5, No. 4 (A21711992).
"Ring System; Provides District of Columbia with Automatic Number and Location Identification to Aid in Emergency Services Response," Business Wire, Aug. 7, 1986 (A21706396).
Press Release, PR Newswire, Mar. 3, 1986 (A21708338).
Rippeteau, Jane, "'Smart' Way to Get Message Across," Financial Times, Jun. 12, 1986 (A21708502).
Rogers, Thomas, et al., "Scouting—A Worthwhile Trivial Pursuit," The New York Times, Aug. 9, 1985 (A21707968).
"Rolm–Corp; Appoints Harvey and Zalisk as Vice President," Business Wire, May 21, 1986 (A21708472).
"Rolm–corp; Introduces Redwood for Branch Offices and Small Businesses," Business Wire, Jun. 2, 1986 (A21708491).
"Rolm; Links PhoneMail to IBM VM Host," Business Wire, May 5, 1986 (A21708447).
"Rolm Releases Four–Channel Phonemail Voice Message Unit," Computerworld, Jan. 28, 1985.
"Rolm; Rolm Announces PhoneMail Network," Business Wire, Feb. 9, 1987 (A21707775).
"Rolm; Rolm Awarded Major contract by Columbia University," Business Wire, Mar. 2, 1987 (A21707855).
"Rolm; Rolm CBX II 9000AE Offers Abundant System Power for Applications Growth," Business Wire, Feb. 3, 1987 (A21707765).
"Rolm; 15–Node Rolm System to be Installed at University of Rochester," Business Wire, Nov. 11, 1985 (A21708096).
Roman, David R., "Building Up Your Personal Computer; Part II: Data–Input Devices," Computer Decisions, vol. 16, Mar. 1984, p. 110 (A21708630).
Rosenbaum, Art, "This 'Maniac' Spreads His Loot Around," San Francisco Chronicle, Jul. 24, 1986 (A21706875).
Rosinski, R. R., "Uses of AT&T Speech Processing Technology," AT&T Technology, vol. 5, No. 4, Date Unknown, pp. 4–5 (A21723940).

Ruhl, H. W., et al., "Sprein—A Voice I/0 Mail Order System with Telephone Access," Article Source Unknown.
Salter, Stephanie, "When the 'Say Hey Kid' Met the 'Say How' Bunch," San Francisco Examiner, Date Unknown (A21706704).
Sanger, David E., "A Driving Force Leaves Rolm," The New York Times, Jan. 15, 1986 (A21708200).
Press Release, PR Newswire, Sep. 17, 1985 (A21708022).
Schindler, Paul E., Jr., "AT&T Talking up Conversant 1 Unit," Information Week, Sep. 16, 1985 (A21723912).
Schinke, David, "Speaker Independent Recognition Applied to Telephone Access Information Systems," Speech Tech '86, 1986 (A21718178).
Schulman, Henry, "AT&T Device: Talk to Computer By Phone," The Oakland Tribune, Sep. 10, 1985 (A01354685).
Schumaker, Robert M., Jr., "Phone–Based Interfaces: Research and Guidelines," Proceedings of the Human Factors Society $36^{th}$ Annual Meeting, 1992, pp. 1051–1055.
Schwartz, Jeffrey, "IBM Enhances Voice Processing," Article Source Unknown (A01346375).
Schwartz, P., et al., "JISTEL 500—Time Division Exchange Including Voice and Data with Voice Messaging," ISS '84 Florence, May 1984, Session 21 A, Paper 6, pp. 1–4.
Scully, Sharon, "Product News; Saturn PBX Revamped," Network World, May 19, 1986, p. 4 (A21708470).
Seaman, John, "Voice Mail: Is Anybody Listening?," Computer Decisions, vol. 16, May 1984, p. 174 (A21708731).
"Select List of Telecommunications Providers," The Magazine of Bank Management, Aug. 1986, p. 32 (A21706373).
Semilof, Margie, "High–End Voice/Data PBXs: Voicing Doubts about Data," Network World, Mar. 31, 1986, p. 65 (A21708354).
"Senate Panel Meets Today; C&P Objects to House Decision Awarding Telephone Contract to AT&T–IS," Communications Daily, vol. 5, No. 238, Dec. 10, 1985, p. 4 (A21708112).
Session No. 13—Contemporary Developments in Addressability and Pay–Per–View, Pay–Per–View Conference, Apr. 28, 1985, p. 21 (A21707196).
Sharma, Ranjana, "PBX Users Benefit from Vitality of ACD Market," Network World, Oct. 17, 1988 (A21712686).
Shaw, Peter, "The Need for BT's Managed Information Services," British Telecommunications Engineering, vol. 11, Apr. 1992, pp. 2–6.
Shepherd, John, et al., "Managed Recorded Information Services—An Overview," British Telecommunications Engineering, vol. 11, Apr. 1992, pp. 7–13.
Shimizu, Hiroshi, "Advanced Credit Call Service," Japan Telecommunications Review, Oct. 1986, pp. 247–250.
Press Release, PR Newswire, Dec. 5, 1985 (A21708108).
Siragusa, Gail, "Voice Mail Takes Off: Send and Receive Messages by Phone," Administrative Management, vol. 47, Apr. 1986, p. 43 (A21708393).
"Small Company Initial Public Offerings: Dec. 1983," Goldhirsch Group, Inc., Mar. 1984, p. 138 (A21708624).
Smith, Tom, "Production Use of ISDN Lives up to Expectations," Network World, Feb. 26, 1990 (A21712004).
Snow, Stephen A., "Consumers Show Strong Preference for Automated Telephone Call Processing," Business Wire, Oct. 19, 1988 (A21724781).
"AT&T to Offer New Service," Reuter Newswire, Nov. 21, 1988 (A21724788).
"Soap Opera Updates Now Available in Area," Contra Costa Times/TV, May 28, 1984, p. 4 (A21708748).

"Something for Everyone at NAB's Equipment Exhibition," Broadcasting, vol. 112, Mar. 23, 1987, p. 63 (A21707873).

Song, D, et al., "System 12 Line and Trunk Testing," ISS Florence, May 1984, Session 32 A, Paper 5, p. 1.

"Special Information Tones Provide Computer with Vital Call Data," Bell Laboratories Record, Nov. 1981 (A21710768).

Staehler, R. E., "Toward a More Automated Network—TSPS Enhancements Lead the Way," Telephony, Feb. 8, 1982, pp. 45–48 (A21725941).

"The Stamp of Approval for Voicemail," Article Source Unknown, (A21707760).

Stern, Aimee, "Cable Operators Fight Back; Pay–Per–View TV," Dun's Business Month, vol. 129, Feb. 1987 (A21707748).

Stewart, Alan, "Signaling Changes for Interconnects; NATA 86 Trade Show," Telephone Engineer and Management, Vol. 90, Dec. 15, 1986, p. 72 (A21707569).

Stix, Gary, "Many Bands = Light Work," Computer Decisions, vol. 17, Sep. 10, 1985, p. 92 (A21708015).

Press Release, Communications Daily, vol. 5, No. 148, Jul. 31, 1985, p. 7 (A21708033) repeated (A21724666).

"International Information Network Earnings," PR Newswire, Sep. 30, 1985 (A21708033) repeated (A21724666).

"International Information Sets Financing Program," PR Newswire, Oct. 22, 1985 (A21708034) repeated (A21724667).

Stoffels, Bob, "REA Takes its Show on the Road: Engineering and Management Seminars," Telephone Engineer & Management, vol. 88, May 15, 1984, p. 129 (A21708746).

"Strike Three," S. F. Progress, Aug. 7, 1985 (A21706708).

Strom, David, "Telephone or MIS Managers: Who Flips the PBX Switch; Management and Use of New Communications Technology; Connectivity—Focus on LANs," PC Week, vol. 4, Feb. 17, 1987, p. C1 (A21707798).

Sullivan, Linda, "Ameritech Services Signs Leading National Information Provider as a Master Dealer," Business Wire, Sep. 25, 1989 (A21724794).

Susca, Paul, "Telemarketing: Reach Out and Sell Someone," Network World, May 4, 1987 (A21714122).

Swan, Gary E., "Gift to Kids Wasted if Ballplayers Strike," San Francisco Chronicle, Date Unknown (A21706673).

"System 85 Voice Messaging Due in '85," Data Communications, Dec. 1984, p. 204 (A21709005).

Tagg, Ed, "Automating Operator–Assisted Calls Using Voice Recognition," Speech Technology, Mar.–Apr. 1988, pp. 22–25.

Takahashi, Y., "Technique to Use Chinese Letters for the On–Line System in Marketing Business," Packaging Technology, vol. 19, No. 11, 1981 (A21724264).

Talmadge, Candace, "MetroCal Dumps Richards for K–C," Adweek, Jan. 5, 1987 (A21707728).

"Tech Deals," Phillips Business Information, vol. 7, No. 120, Jun. 25, 1996 (A01331382).

Telecommunication Technology, vol. 4, No. 4, Apr. 1986, p. 68 (A21724070).

"'Teleguide' Network Gives Tourists the Answers," ComputerData, Apr. 1983 (A21724569).

"Telephone Service Offers the Latest News on the Soaps," Augusta, GA Chronicle–Herald, Jul. 28, 1984 (A21724626). Telephony, Sep. 29, 1980 (A21716447).

"Test Your Baseball I. Q. and Win Four Tickets to All–Star Workout Day," Contra Costa Times, Date Unknown (A21706787).

Tetschner, Walt, "PC–Based Voice Processing Software Tools," Speech Technology, Mar.–Apr. 1988, pp. 42–45.

Tetschner, Walt, "The Voicetek VTK 90 Voice Computer," Speech Technology, Mar.–Apr. 1987, pp. 102–106.

"They've Got Your Number in AT&T's first Primary–Rate Test," Data Communications, Feb. 1988, p. 15 (A21712494).

"Toshiba Telecom Introduces Universal Instrumentation for Entire Line of Key and PBX Systems," Telecommunications Product Review, vol. 11, No. 2, Feb. 1984 (A21708573).

"Tracking the Trucks," Network World, Sep. 5, 1984, p. 55 (A21708897).

Excerpt from Transportation Technology (in Japanese), vol. 30, No. 7, 1975 (A21725045).

"Trivia Promo Chips Away for Frito–Lay," Advertising Age, Date Unknown (A21707650).

"Trivial Tickets," The fort Wayne Journal–Gazette, Aug. 11, 1985 (A21706713).

"Two Firms Introduce FMS Products," Energy User News, vol. 9, Aug. 6, 1984, p. 12 (A21708848).

Tyson, David O., "Voice Mail Technology Streamlines Bank Telephone Messaging Services," The American Banker, Oct. 15, 1986, p. 13 (A21706655).

Upton, Molly, "No Clear Winner in War of Mails," Computerworld, May 19, 1986, p. 60 (A21708459).

Vanandel, M. A., "While You're Away, AUDIX Will Answer," AT&T Technology, vol. 3, No. 3, 1988 (A21724808).

"Vendor Support Eases GOP Costs," Computerworld, Aug. 27, 1984 (A21708865).

"View from Silicon Valley: Silicon Valley Companies Battle for Advantage, Compatibility," Communications Daily, vol. 4, No. 90, May 8, 1984, p. 1 (A21708743).

Virzi, Robert A., "Skip and Scan Telephone Menus: User Performance as a Function of Experience," Proceedings of the Human Factors Society 36th Annual Meeting–1992, p. 211–215.

Vizcarrondo, John, et al., "HOBIS: New Designs on Hotel Billing," Bell Laboratories Record, Jan. 1980 (A21709392).

"VMX Announces InfoLink: New capability in Voice Messaging Arena," Business Wire, Jun. 16, 1987 (A21714159).

"VMX/Honneywell; (VMXI) (HON) Take Voice Messaging 'Down Under' After Signing Distribution/OEM Agreement for Australia and Pacific Basin," Business Wire, Sep. 3, 1986 (A21724699) repeated (A21706451).

"VMX, Inc. Adds Internal Revenue Service to Voice Message (SM) Users," Southwest Newswire, Feb. 8, 1984 (A21708587).

"VMX, Inc. Announces Another Good Quarter," Southwest Newswire, Aug. 1, 1984 (A21708846).

"VMX, Inc. Announces First Quarter Results," Southwest Newswire, Oct. 18, 1985 (A21708063).

"VMX, Inc. Announces Landmark Approval of first Voice Message System in Japan," Southwest Newswire, Jun. 1, 1984 (A21708776).

"VMX; (VMXI) AT&T Tops List of Seven License Agreements Granted in Third Quarter," Business Wire, Sep. 9, 1986 (A21706457).

"VMX–Inc; (VMXI) Hosts First International Networking Seminar," Business Wire, Jul. 18, 1986 (A21706345).

"VMX, Inc. Provides First Voice Message (SM) Systems to Three Bell Operating Companies," Southwest Newswire, Dec. 11, 1984 (A2109007).

"VMX, Inc. Releases Audited Fiscal 1984 Financials—It was a Very Good Year," Southwest Newswire, Aug. 7, 1984 (A21708852).

"VMX; (VMXI) Voice Messaging Leader VMX, Inc. Launches New Generation Technology with VMX(R) 5000 Series," Business Wire, Oct. 7, 1986 (A21706650).

"VMX; (VMXI) Voice Messaging Patent–Holder VMX Inc. Moves into France after Signing Distribution Agreement with Jeumont–Schneider," Business Wire, Sep. 15, 1986 (A21706459).

"VMX; (VMXI) VMX 5000 Series Voice Messaging System Scores High Sales During First Quarter," Business Wire, Mar. 10, 1987 (A21707862).

Press Release, Communications Daily, vol. 4, No. 209, Oct. 26, 1984, p. 6 (A21708939).

Press Release, Computerworld, Oct. 7, 1985, p. 68 (A21708055).

Press Release, PR Newswire, Jan. 18, 1984 (A21708570).

Press Release, PR Newswire, Apr. 10, 1984 (A21708655).

Press Release, PR Newswire, Oct. 16, 1984 (A21708935).

Press Release, PR Newswire, Jan. 24, 1986 (A21708207).

Voice Mail Brochure, Radio–Suisse Ltd., Date Unknown (W70172).

"Voice Messaging Capability from VMX," The Magazine of Bank Management, Oct. 1985, p. 86 (A21708037).

Voice Processing International Conference Program, Jul. 1986 (A21723351).

Voice Processing—The New Revolution, Proceedings of the International Conference, Jul. 1986 (A21722980).

"Voice '92," Conference Information and Program, 1992 (W11651).

"Voice System Tunes up Automaker's Communications," Computerworld, Nov. 12, 1984, p. 35 (A21708972).

Press Release, Communications Daily, vol. 4, No. 110, Jun. 6, 1984, p. 9 (A21708778).

"Votrax Announces Centrum 9000, Model 5," Source Unknown, Oct. 16, 1987 (A21724763).

Waite, Andrew J., "Applying IVR Systems," Inbound/Outbound, Sep. 1988, pp. 30–39 (A21725733).

Walker, Murt, "CCS7 Offers New Paths to Revenue Generating Services," AT&T Technology, vol. 6, No. 2, 1991, pp. 8–19 (A21713600).

Wallace, Bob, "All Voice Systems Are Not Alike," Network World, Sep. 14, 1987 (A21712240).

Wallace, Bob, "Comnet '87; AT&T Announces ISDN Interface for System 85," Feb. 16, 1987 (A21707796).

Walters, R. E., et al., "Voice Processing Systems in British Telecom," British Telecommunications Engineering, vol. 9, Jul. 1990, pp. 88–97.

Warner, Edward, "Bank's Speech Synthesizers Greet Financiers' Calls with Daily Balance," Computerworld, Oct. 22, 1984, p. 6 (A21708937).

Watt, Peggy, "Local Phone Companies Eyeing Market for Voice Mail Services," Computerworld, Mar. 24, 1986, p. 23 (A21708350).

Watt, Peggy, "Republicans Ready for High–Tech: GOP Convention will Feature Voice Message System," InfoWorld, Aug. 27, 1984 (A21708862).

Weinstein, Bob, "Stock Exchange Gets News by Phone," Inbound/Outbound, Oct. 1988, pp. 39–46 (A21725744).

Weinstein, Bob, "Stopping the Broker's Bottleneck," Inbound/Outbound, Nov. 1988, pp. 22–23 (A21725753).

West Interative Settles with FDR: Patent Suit Settlement Could Have major Industry Impact, Enterprise Communications, Nov. 1994 (A01331040).

Whalen, Bernie, "Marketers Expand Applications of Dial–It 900 Technology," Marketing News, Nov. 26, 1982 (A21725861).

"What's An 'Automated' Attendant," Inbound/Outbound, Jul. 1989, pp. 40–42 (A21724789).

"Whether to Answer the Phone," The Washington Post, Dec. 7, 1986 (A21707563).

Whitten, W. B., "Advanced Interfaces Speed Delivery of Services," AT&T Technologies, vol. 2 No. 3 (A21707593).

"Who Switches Data Along with Voice? PBX Users, Increasingly," Data Communications, Feb. 1987, p. 77 (A21707751).

Wilpon, Jay G., et al., "Speech Recognition: From the Laboratory to the Real World," AT&T Technical Journal, Sep.–Oct. 1990, pp. 14–24 (A21723481).

Wise, Deborah C. "This Computer Even Deciphers Noo Yawk Talk," Businss Week, Sep. 23, 1985, pp. 40–42 (A01354687).

Witten, Ian H., "Making Computers Talk: An Introduction to Speech Synthesis," Prentice–Hall, 1986 (A21708148).

Witten, Ian H., "Principles of Computer Speech," Academic Press, 1982 (A21709597).

Wolfe, R. M., et al., "Telecommunications Data Base Application with the 3B™20 Processor," ISS '84 Florence, May 1984, Session 22 A, Paper 2 (A21725518).

Wollenberg, Skip, "American Express Affiliate Plans Interactive Phone Service," The Associated Press, Jan. 19, 1989 (A01331396).

Wong, Stephanie Lam, "Just a Phone Call Away," San Francisco Chronicle, Date Unknown (A21707649).

Wood, Lamont, "Stretching the Workday; Corporate Users Find that Voice Mail Saves them Time in Transmitting Important Messages," Computer Decisions, vol. 18, Dec. 2, 1986, p. 44 (A21707561).

Wood, Lamont, "Will New Alliances Forge Better Links? Private Branch Exchange Vendors Merge with Computer Firms," Computer Decisions, vol. 18, Jul. 29, 1986, p. 40 (A21706353).

Worrall, D. P., "New Custom Calling Services," The Bell System Technical Journal, vol. 61, No. 5, May–Jun. 1982 pp. 821–839 (A21725897).

"Worthwhile Trivia," The New York Times, Date Unknown (A21706711).

"Yes! Songs For You," Advertisement, Source Unknown (W73764).

Youngs, E. A., "The Changing Role of Human Factors Work Supporting New Telecommunications Products and Service," Proceedings of the Tenth International Symposium on Human Factors in Telecommunications, Jun. 1983 (A21725809).

Youngs, E. A., "Effects of Automating Operator Services on Customers and Operations," Proceedings of the Eighth International Symposium on Human Factors in Telecommunications, Sep. 1977, pp. 251–255 (A21725776).

"Zenith; Centel Plans Zenith Phonevision Pay–Per–View Cable TV System," Business Wire, Dec. 5, 1985 (A21708105).

Zeno, Charlie, "Trivia Buff's Special Party for 678 Kids," Contra Costa Times, Date Unknown (A21706788).

Zuckerman, Steve, "Ogilvy & Mather/Dallas Looks for Partner to Go After Bigger Accounts," Dallas Business Courier, vol. 2, No. 21, Sec. 1, Sep. 8, 1986, p. 12 (A21706454).

Complete Issue of Bell Labs News, vol. 21, No. 40, Oct. 5, 1981 (A21710762).

Complete Issue of Bell Labs News, vol. 25, No. 36, Sep. 30, 1985 (A21724662).

Complete Issue of Bell Labs News, vol. 26, No. 31, Aug. 18, 1986 (A21706398).

Complete Issue of Bell Labs News, vol. 27, No. 33, Aug. 17, 1989 (A21710741).

Bell of Pennsylvania Press Release, Mar. 13, 1984 (A21725876).

Dorros, Irwin et al., "Reaching into the Future with Stored Program Control," Bell Laboratories Record, Dec. 1980, pp. 387–393 (A21710507).

Complete Issue of Voice News, vol. 4, No. 9, Oct. 1984 (A21708913).

Complete Issue of Voice News, vol. 6, No. 7, Jul./Aug. 1986 (A21706303).

Complete Issue of Voice News, vol. 7, No. 2, Feb. 1987 (A21707730).

Complete Issue of Voice News, vol. 7, No. 3, Mar. 1987 (A21707834).

Complete Issue of Voice News, vol. 7, No. 5, May 1987 (A21714110).

Complete Issue of Voice News, vol. 7, No. 10, Oct. 1987 (A21724749).

\* cited by examiner

*Primary Examiner*—Stella Woo
(74) *Attorney, Agent, or Firm*—Reena Kuyper; B. J. Nilsson

(57) ABSTRACT

For use with a public telephone network CO incorporating a vast number of terminals Ti–Tn, a system CS limits and controls interface access to implement voice-digital communication for statistical processing. The system CS accommodates calls in different modes, e.g. "800", "900" or area code and incorporates qualifying apparatus to restrict against caller misuse. Alternative calling modes are used to reach an interface facility that also affords some control based on calling terminal identification, e.g. as by ANI equipment.

107 Claims, 2 Drawing Sheets

TELEPHONE INTERFACE CALL PROCESSING SYSTEM WITH CALL SELECTIVITY

RELATED SUBJECT MATTER

This is a continuation of application Serial No. 08/480,185 filed on Jun. 7, 1995, now U.S. Pat. No. 5,974,120 and entitled "Telephone Interface Call Processing System With Call Selectivity," which is a continuation of application Ser. No. 08/132,062 filed on Oct. 4, 1993, and entitled "Telephone Interface Call Processing System With Call Selectivity," now U.S. Pat. No. 5,828,734, which is a continuation of application Ser. No. 07/779,762 filed on October 21, 1991, and entitled "Telephone Interface Call Processing System With Call Selectivity," now U.S. Pat. No. 5,251,252, which is a continuation of application Ser. No. 07/425,779 filed on Oct. 23, 1989, and entitled "Telephone Interface Call Processing System With Call Selectivity," now U.S. Pat. No. 5,128,984, which is a continuation-in-part of application Ser. No. 07/312,792 filed on Feb. 21, 1989, and entitled "Voice-Data Telephonic Control System," now U.S. Pat. No. 5,073,929, which was a continuation-in-part of application Ser. No. 07/194,258 filed on May 16, 1988, and entitled "Telephonic-Interface Statistical Analysis System," now U.S. Pat. No. 4,845,739, which was a continuation-in-part of application Ser. No. 07/018,244 filed on Feb. 24, 1987, and entitled "Statistical Analysis System For Use With Public Communication Facility," now U.S. Pat. No. 4,792,968, which was a continuation-in-part of application Ser. No. 06/753,299 filed on Jul. 10, 1985, and entitled "Statistical Analysis System For Use With Public Communication Facility," now abandoned.

Also, said application Ser. No. 08/132,062 is a continuation-in-part of application Ser. No. 08/306,751 filed on Sep. 14, 1994, and entitled "Multiple Format Telephonic Interface Control System," which is a continuation of application Ser. No. 08/047,241 filed on Apr. 13, 1993, and entitled "Multiple Format Telephonic Interface Control System," now U.S. Pat. No. 5,351,285, which is a continuation of application Ser. No. 07/509,691 filed on Apr. 16, 1990, and entitled "Multiple Format Telephonic Interface Control System," now abandoned and a continuation-in-part of application Ser. No. 07/640,337 filed on Jan. 11, 1991, now abandoned, and entitled "Telephonic-Interface Statistical Analysis System", which is a continuation of application Ser. No. 7/335,923 filed on Apr. 10, 1989, and entitled "Telephonic-Interface Statistical Analysis System," now U.S. Pat. No. 6,016,344, which is a continuation of application Ser. No. 07/194,258 filed on May 16, 1988, and entitled "Telephonic-Interface Statistical Analysis System," now U.S. Pat. No. 4,845,739, which is a continuation-in-part of application Ser. No. 07/018,244 filed on Feb. 24, 1987, and entitled "Statistical Analysis System For Use With Public Communication Facility," now U.S. Pat. No. 4,792,968, which is a continuation-in-part of application Ser. No. 06/753,299 filed on Jul. 10, 1985, and entitled "Statistical Analysis System For Use With Public Communication Facility;" now abandoned, said application Ser. No. 07/509,691 filed on Apr. 16, 1990, now abandoned, is a continuation-in-part of application Ser. No. 07/260,104 filed on Oct. 20, 1988, and entitled "Telephonic Interface Control System," now U.S. Pat. No. 4,930,150, which is a continuation-in-part of application Ser. No. 07/018,244 filed on Feb. 24, 1987, and entitled "Statistical Analysis System For Use With Public Communication Facility," now U.S. Pat. No. 4,792,968, which is a continuation-in-part of application Ser. No. 06/753,299 filed on Jul. 10, 1985, and entitled "Statistical Analysis System For Use With Public Communication Facility," now abandoned.

Also, said application Ser. No. 08/132,062 is directly a continuation-in-part of application Ser. No. 07/335,923 filed on Apr. 10, 1989, now U.S. Pat. No. 6,016,344 and entitled "Telephonic-Interface Statistical Analysis System," which is a continuation of application Ser. No. 07/194,258 filed on May 16, 1988, and entitled "Telephonic-Interface Statistical Analysis System," now U.S. Pat. No. 4,845,739, which is a continuation-in-part of application Ser. No. 07/018,244 filed on Feb. 24, 1987, and entitled "Statistical Analysis System For Use With Public Communication Facility," now U.S. Pat. No. 4,792,968, which is a continuation-in-part of application Ser. No. 06/753,299 filed on Jul. 10, 1985, and entitled "Statistical Analysis System For Use With Public Communication Facility," now abandoned. The benefit of the earlier filing dates in the United States is claimed under 35 U.S.C. §120.

BACKGROUND AND SUMMARY OF THE INVENTION

Recent years have seen a considerable growth in the use of telephonic communications. For example, in various applications, telecommunications applications have expanded to accommodate voice-digital interfaces between computer apparatus and callers at remote telephone terminals. For example, by actuating the push buttons at a remote telephone terminal, a caller controls a computer apparatus to provide various entertainment or information. In using such a system, a caller might telephone a financial service and selectively actuate the telephone key panel to receive information on specific stocks or bonds.

Digital interface systems also have been implemented to utilize digital signals provided independently of the caller's actions. For example, the so-called "ANI" telephone equipment provides digital signals indicating a caller's telephone number. Equipment designated "DNIS" is similarly available to indicate the called number. Thus, digital signals may be provided telephonically to a system associated with individual calling terminals as for identification or other use.

Telephonic games and contests are among the various applications that have been recognized for implementation with telephone interface systems. Such games and contests may be variously presented, as in cooperation with an advertising program for a product or in a lottery format. Generally with respect to such applications, various call modes might be utilized.

Essentially, three telephonic calling modes or services are in widespread use. Specifically, caller-charge or "900" service (including "976" calls) involves a charge to the caller for each call. The "900" calling mode is useful for implementing games and contests with telephone interface systems; however, certain problems are encountered. Specifically, certain telephone terminals, e.g. pay phones, do not accommodate "900" service. Also, with respect to certain forms of games and contests, it is important to offer members of the public an alternative "free" method of participation. In general, the system of the present invention may be employed to implement "900" calling modes while accommodating "free" participation with reasonable control.

Telephone calls may be accommodated without charge using "800" service or calling mode. Generally, the "800" calling mode accommodates free calls by callers in various areas to a particular station incurring the charges. In most applications, it is important to regulate the use of the "800"

calling mode. Another calling mode is the traditional method of calling, involving area-code numbers which also includes calls placed within a given area code which do not usually involve a specific charge and usually do not require dialing the area code. One of the problems associated with using the area-code calling mode for interface systems is the vast number of calls. For example, even in association with an advertising campaign, inviting members of the general public to participate in a free contest or game by telephone may prompt an overwhelming response. Accordingly, a need exists for a practical system to control and limit calls to an interface service in the traditional free area-code number mode.

Another aspect of telephonic-interface contests involves zealous or obsessive participants. For example, in a quiz contest, a zealous person might call repeatedly, researching answers to given questions until ultimately a question is repeated. At that time, the caller is ready with an answer and has an unfair advantage in the contest. Thus, a need exists for control within the interface system.

In general, the system of the present invention involves a telephone call processing system for receiving calls from a multitude of terminals in different call modes and for processing calls, as to a game or contest format, with means to limit repeat-call advantages. In a disclosed form, the system implements three calling modes to facilitate various formats while accomplishing certain protection both with regard to the calling mode and contest formats.

BRIEF DESCRIPTION OF THE DRAWINGS

In the drawings, which constitute a part of this specification, exemplary embodiments exhibiting biting various objectives and features hereof are set forth, specifically.

DESCRIPTION OF THE ILLUSTRATIVE EMBODIMENT

As required, a detailed illustrative embodiment of the present invention is disclosed herein. However, telephone techniques, physical communication systems, data formats and operating structures in accordance with the present invention may be embodied in a wide variety of forms and modes, some of which may be quite different from those of the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
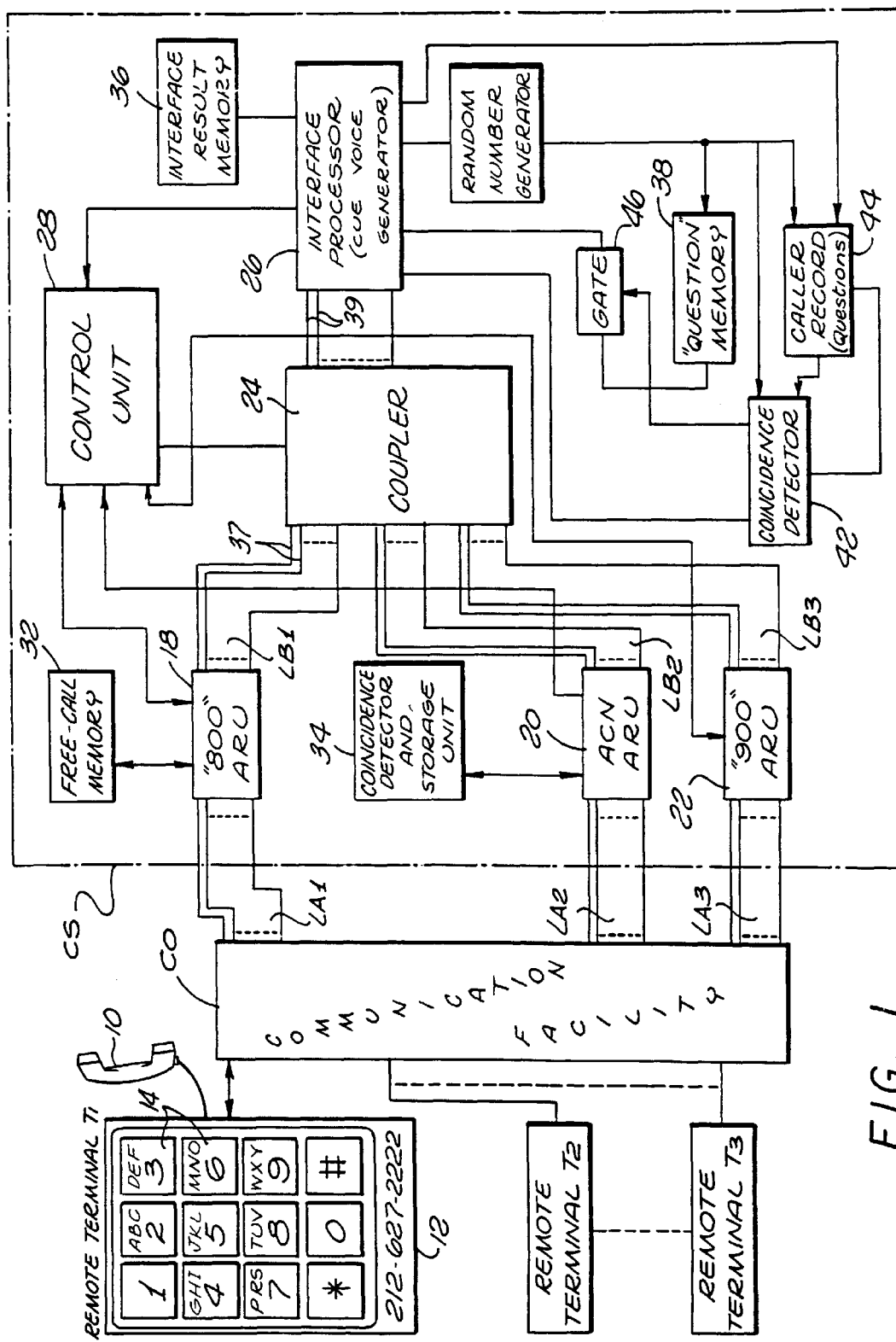
FIG. 1 is a block diagram of a system constructed in accordance with the present invention.

Referring initially to FIG. 1, a series of remote terminals T1–TN (telephone instruments) are represented (left). The terminals T1–TN may be functionally similar and accordingly only the terminal T1 is shown in any detail. The indicated terminals T1–TN represent the multitude of telephone terminals existing in association with a communication facility CO which may comprise a comprehensive public telephone network.

The communication facility CO, accommodating the individual terminals T1–TN, is coupled to a central processing station CS generally indicated within a dashed-line block. In the station CS, to illustrate operating aspects of the present invention, calls are selectively accepted and interfaced so as to accomplish a desired operating format, for example a contest or game.

Generally, calls from the individual terminals T1–TN might be in any of three modes, i.e. the "800" mode, the "900" mode or the area-code mode (traditional area code plus number or local number dialing). In the disclosed illustrative system, depending on individual calling modes, calls are selectively accepted for interface processing. Generally, the interface format accommodates "900" calls with supplemental "800" calls to accommodate both "free" access and all types of telephone terminals. In the disclosed embodiment, calls in the "800" mode are restricted in accordance with prearranged limitations. Furthermore, calls in the area-code mode (from all areas), the 800 mode and 900 mode may be limited to callers having a station number containing a predetermined digit sequence.

For example, calls might be restricted to those from terminals having a telephone number ending in the digits "234".

The processing station CS also is controlled to limit the effectiveness of zealous callers. For example, in a contest format, callers may be quizzed with questions randomly drawn from an inventory. In accordance herewith, questions are not repeated to individual telephone terminals T1–TN. Thus, some control is imposed on an aggressive caller who might otherwise be given two opportunities to answer the same question.

Considering the system of FIG. 1 in greater detail, the exemplary telephone terminal T1 includes a handpiece 10 (microphone and earphone) and a panel 12 provided with a rectangular array of individual push buttons 14 in a conventional configuration. Of course, the handpiece 10 accommodates analog signals while the panel 12 is a digital apparatus. During an interface operation, as disclosed in detail below, the caller is queued or prompted vocally through the handpiece 10 (earphone) to provide digital responses using the buttons 14.

At this stage, some specific aspects of the communication interface are noteworthy. Essentially, as a result of telephonic dialing at one of the terminals T1–TN, the communication facility CO couples the select terminal to an audio response unit. Specifically, to illustrate various aspects, three separate audio response units are provided in the station CS to accept calls in the three distinct modes. That is, an audio response unit 18 receives calls in the "800" mode. An audio response unit 20 receives calls in the area-code dialing mode, and an audio response unit 22 receives calls in the "900" dialing mode.

It will be understood that although three separate audio response units are illustrated, systems incorporating the principles of the present invention may well incorporate various numbers of audio response units for each calling mode, with each audio response unit having the capability to accommodate a substantial number of calls as indicated by the lines from the communication facility CO in FIG. 1. Alternatively, a single composite unit might be utilized. Also, the mode or aspects of the described embodiment might well be implemented singly or in various combinations. Herein, for purposes of explanation, calls are treated individually and processed accordingly through the three audio response units 18, 20 and 22.

Generally, the audio response units 18, 20 and 22 connect callers at remote terminals T1–TN from the communication facility Co through a coupler 24 (FIG. 1, station CS, center) to an interface processor 26. Both the coupler 24 and the processor 26 are connected to a control unit 28 that is also connected to the audio response units 18, 20 and 22. Accordingly, with overall supervision by the control unit 28, the audio response units 18, 20 and 22 answer and preliminarily qualify callers from the terminals T1–TN for connection through the coupler 24 to the interface processor 26.

Upon completion of an interface connection in the disclosed embodiment, a contest format is executed by vocally prompting callers to respond with digital data. At this point, it is noteworthy that the communication facility CO also provides identification signals to the audio response units 18, 20 and 22. Specifically, digital identification signals representing numbers associated with the calling terminals T1–TN are provided by "ANI" equipment independent of any action by the caller. In the event "ANI" equipment is not available, callers may be vocally prompted to provide the digital representations by selectively depressing the buttons 14.

The telephone communication facility CO also may provide digital signals indicating the called number. Generally, such a capability involves equipment designated "DNIS". The capability may be useful in various embodiments of the present system, as to distribute calls from a single equipment as mentioned above.

Pursuing the exemplary structure of FIG. 1 in still greater detail, the communication facility CO provides three sets of trunks or lines LA1, LA2 and LA3 respectively coupled to the audio response units 18, 20 and 22. From the audio response units 18, 20 and 22, sets of lines LB1, LB2 and LB3 are connected to the coupler 24. Under control of the control unit 28, the coupler 24 connects individual lines 37 of the sets LB1, LB2 and LB3 to the processor 26 through lines 39.

Generally, the audio response units 18, 20 and 22 may take the form of well known telephonic structures with the capability to "answer" calls and interface callers in a preliminary way. Each of the units 18, 20 and 22 incorporate a voice generator along with some basic programmable logic capability.

The audio response unit 18 is coupled to a free-call memory 32. Generally, the unit 18 in cooperation with the memory 32 operates with the control unit 28 to qualify acceptable calls in the "800" mode.

The audio response unit 20 is connected to a select-number coincidence detector 34. These structures along with the control unit 28 test area-code mode calls. The audio response unit 22 accepts calls without initial qualification.

The system of the disclosed embodiment selectively qualifies callers depending on their calling mode. Additionally, the system responds to caller identification to enhance contest equity.

Generally, the interface processor 26 poses questions to calling contestants and stores the resulting answers in a result memory 36. Questions given to contestants are selected from a memory 38 by a random number generator 40. Essentially, the memory 38 contains an inventory of questions addressable by numbers provided by the random number generator 40. The address numbers from the generator 40 are also supplied to a coincidence detector 42 that also receives the address numerals of questions previously presented to a specific caller from a record 44. Thus, before a question is presented to a caller, the number of the calling terminal is checked to assure that the same question has not previously been posed to a caller at that terminal.

If the coincidence detector 42 clears the current question as not being repetitive, a gate 46 is qualified and the question is supplied from the memory 30 to the interface processor 26. A voice generator within the interface processor 26 then provides signals through a designated line 39, the coupler 24, a line 37, one of the audio response units and the communication facility CO to the connected remote terminal. As a result, the caller hears a simulated voice question. The answer is provided by the caller actuating the buttons 14 at the calling terminal. In that regard, the question may be in a multiple choice or true-false format to accommodate simple push button actions at the terminal.

In view of the above description of structural elements in the disclosed embodiment, a comprehensive understanding of the system may now best be accomplished by assuming certain operating conditions and describing the resulting operations.

Accordingly, assume that the system CS is programmed to accommodate a relatively simple game format, that is, a sponsored contest for the promotion of a product, e.g. the XYZ Widget. Further assume the contest is of limited participation based either upon: the payment of a token fee ("900" calling mode), prearranged participation ("800" calling mode), lottery selection (area-code calling mode) or lottery selection in combination with either 800 or 900 calling modes. Considering exemplary possibilities of the format, the XYZ Widget might be advertised with an invitation to participate via the "900" calling mode. Alternatively, participants might be variously qualified as by select notification; however, in the exemplary format, such participants would incur a token charge imposed through "900" telephonic service. To consider an example, an offering might be stated: "If your last three phone digits are 972 you may call, 1) if you wish, call 1 900 XXXX972 ($0.95 service charge) provided your last three phone digits are 972; 2) if you have written in for a 'free to enter' you can use the one-time PIN number provided your last three phone digits are 972. In this case you can use the 'free' 800 number provided to you with your PIN number."

As indicated above, some telephone terminals do not accommodate "900" calling mode. Also, under certain circumstances, it is important to afford members of the public "free" access to participate in various games or contests. For example, such participation might be arranged by mail or other communication to provide a participant with a limited-use (i.e. one) qualification number. With use, the numbers are stored in the memory 32 and the list is checked subsequently to avoid repeat use.

A third class of contest participants might be considered lottery winners. For example, the sponsor might televise a drawing of three decimal digits to provide a sequence of three numbers. The three numbers might identify "winning" or "entitled" participants by corresponding to the last three numbers (digits) of their telephone number. For example, the drawing of the numbers "257" would entitle a single call participation from any of the telephone terminals T1–TN designated by a number, the last three digits of which are "257".

In an exemplary contest format, participants might be asked a few test questions (for minor prizes and the ability to participate in a lottery). Of course, a vast variety of possibilities exist; and in that regard, interim prizes may be awarded to participants as the format proceeds from the initial call to the ultimate prize. At the present point, it is important to appreciate that the system accommodates participants using various telephone call modes with select qualification to participate in an interface format utilizing voice prompt and push-button digital communication. In accordance with the described example, the sponsor invites participants to enter using "900" calling mode service. As a part of such an invitation, persons are advised that "free" entry or participation may be gained by sending a self-addressed envelope to receive an entry number, e.g. eight digits, for use via "800" calling mode service. In the disclosed embodiment, the eight-digit numeral is coded for verification. Of course, numerous possibilities exist. As a simple example the second and sixth digits of the number might have a specific sum, e.g. seven or seventeen. That is, the second and sixth digits might be: three and four, five and two, six and one, seven and zero, nine and eight and so on. A qualifying number would be: "34726313", the second and sixth digits being four and three, respectively.

With the arrangements completed for calling entries in the "900" and "800" mode, the contest might operate for several days before being opened to area-calling participants. That is, the area-calling mode might be available only after a televised drawing entitling participation from a select group of telephone numbers for a limited period of time.

Figure 2:
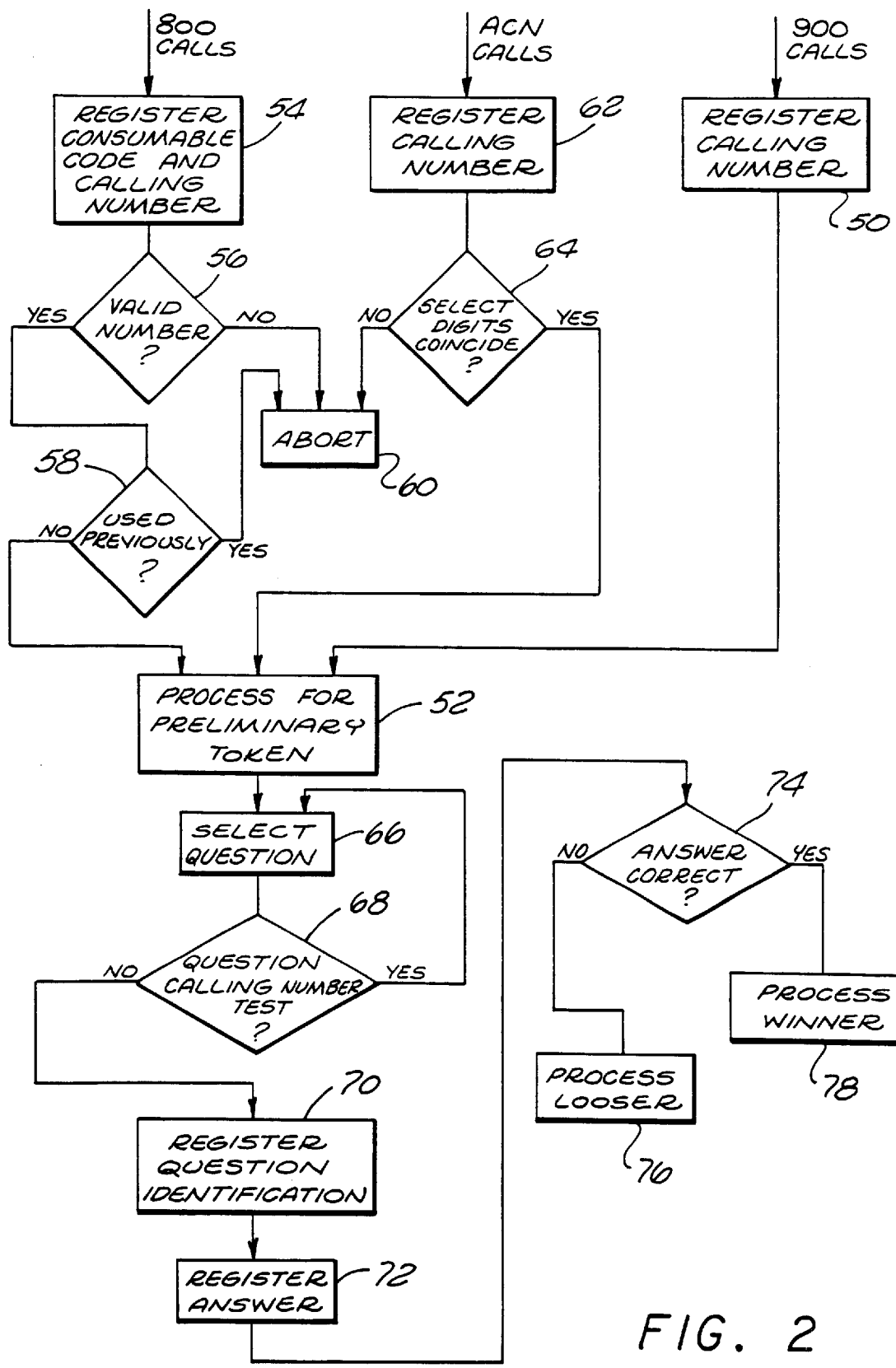
FIG. 2 is a flow diagram of an operating format of the system of FIG. 1.

In view of the above assumptions and descriptions, consider now the operation of the system as depicted in FIG. 1 in relation to the process diagram of FIG. 2. That is, assume the system of FIG. 1 is implemented and programmed to accommodate the exemplary operations as will now be described with reference to the process diagram of FIG. 2.

First, suppose a caller at the terminal T1 places a call in the "900" mode in response to an advertisement by a sponsor promoting XYZ Widgets. Perhaps the caller will receive at least a token gift and might qualify for a major lottery prize.

The assumed call involves the caller actuating the buttons 14 as for example to input: "1 900 5558945". As a result, signals are provided to the communication facility Co resulting in a connection from the remote terminal T1 to the audio response unit 22. With the connection, the communication system CO also provides the audio response unit 22 with digital identification signals representative of the designation for remote terminal T1 ("212 627 2222"). The identification signals are provided by the ANI equipment within the communication facility CO and are registered by the audio response unit 22. The operation is illustrated as a process step in FIG. 2 by the block 50 (upper right) for "900" mode calls.

As suggested above, it may be desirable for a format to provide a token award to all callers in the "900" mode. Recognizing such particulars as possibilities, in the disclosed embodiment, calls in the "900" mode are passed through the audio response unit 22 (FIG. 1) and the coupler 24 to the interface processor 26. Accordingly, the interface processor 26 receives the calling number and processes the contest format as described in detail below.

The initial step of the format common to all call modes is represented by the block 52 in FIG. 2. However, as calls in all modes are processed similarly from that point, before proceeding with the explanation, the preliminary operations attendant other calling modes first will be explained.

As explained above, certain accommodations are made for participation in the "800" (caller free) mode. Accordingly, assume a caller at the terminal T1 has been given an identification number: "34726313" for use in the "800" mode. Accordingly, the caller dials a number, e.g. "800 555 3478", actuating the terminal T1 and the communication facility CO to provide a connection with the audio response unit 18. With communication, the audio response unit actuates an internal voice generator prompting the caller to key in his assigned number, "34726313". As the digits of the number are keyed in by the caller, they are supplied from the audio response unit 18 to the control unit 28 and the free-call memory 32.

Within the control unit 28, logic is provided for verifying the identification number as proper. In accordance with the simple example explained above, the control unit 28 would simply sum the second and sixth digits to test for a total of "7". The coincidence test is represented by the query block 56 in FIG. 2. As indicated above, various codes and verification techniques are well known along with the apparatus for verifying assigned numbers.

If the control unit 28 validates the qualification number "34726313", it is recorded in the free-call memory 32 for future checking against repeat use. Accordingly, each call in the "800" mode also involves a check or test from the audio response unit 18 to the memory 32 to determine whether or not the assigned qualification number has been previously used. The previous-use test is illustrated as a process step by the query block 58 in FIG. 2.

If the control unit 28 determines the qualification number to be invalid or the memory 32 reveals the number has been previously used, the communication is aborted by the audio response unit 18. For example, the audio response unit 18 may be actuated to provide simulated audio signals carrying a message terminating the communication. For example, the caller might be advised: "The number you have provided is not valid. Consequently, your participation cannot be accepted on that basis."

If the entered number is valid and has not been previously used, the tests indicated by the query blocks 56 and 58 (FIG. 2) are positive and the process again proceeds to the common step as indicated by the block 52, e.g. as to receive a token gift.

As indicated above, a third possibility for contest participation involves calling in the area-code mode. While numerous format possibilities exist, as suggested above, access for callers in the area-code mode might be limited to a relatively short period of time. For example, a television program advertising the XYZ Widget might include a drawing to select the telephone terminals from which callers may participate for a period of twenty-four hours. As indicated above, the drawing might identify the last three digits of telephone numbers for the approved terminals.

Following a relatively short time (e.g. one day) during which area-code callers may enter the contest, the contest might be concluded with the ultimate winner or winners determined. In any event, assume the presence of a caller at the terminal T2 with an approved telephone number, i.e. "212 627 2257". Somewhat as explained above with respect to other calling modes, keying operations by the caller at the remote terminal T2 result in a connection through the communication system CO to the audio response unit 20. As previously, the communication facility CO provides digital signals to the audio response unit 20 indicating the calling number (ANI). Thus, the calling number is registered as indicated by the block 62 in FIG. 2. As previously, in the event ANI equipment is not operative to serve the remote terminal T2, then the caller may be asked to key in his telephone number for subsequent verification.

From the audio response unit 20, the caller's number is supplied to the coincidence detector and storage unit 34 for a two-stage test. A first test simply seeks a coincidence between the approved number sequence (three digits) and the last three digits of the calling number. In the example, the last three digits of the calling number ("257") are compared with the select digit sequence, "257". The test is indicated by the query block 64 in FIG. 2.

As a secondary test, the unit 34 may check a record of previous use. Thus, the unit 34 simply implements test logic to accomplish these comparison-step operations with structures as well known in the prior art.

If the tests are negative, as indicated by the query block 64, the communication is aborted as indicated by the block 60. Alternatively, a favorable test again directs the system to proceed to the step of block 52 at which the process enters a common phase for all calling modes.

With the entry of a call into the common phase, the line carrying the call is connected through the coupler 24 (FIG. 1) to the interface processor 26. That is, depending on the call mode, the call is passed through one of the audio response units 18, 20 or 22 and the coupler 24 to the interface processor 26. Note that as indicated above, each of the audio response units 18, 20 and 22 is capable of accommodating a large number of asynchronous calls. Similarly, the coupler 24 is capable of connecting lines from the audio response units 18, 20 and 22 (LB1, LB2 and LB3 respectively) to the interface processor on an individual basis through lines 37 and 39.

The interface processor 26 may comprise a relatively substantial computing capability for processing many individual calls with programmed variations. The processing operation is illustrated in FIG. 2 beginning with the block 52. However, note that as the interface processor 26 receives the telephone number identifying a calling terminal (ANI) reference may be made to a data bank. Therefore, the operation might involve reference to substantial data on a caller. Accordingly, a basis exists for several process variations accommodated by data from a bank. The block 52 represents such possibilities as well as further informing or processing callers.

With the receipt of a call at the interface processor 26, a voice generator may be actuated to specifically inform a caller, depending upon the specific format employed. Essentially, digital signals are provided to actuate a voice generator within the processor 26. Accordingly, an audio message is provided through the coupler 24, the associated audio response unit, and the communication facility CO to the connected remote terminal. Thus, the caller may be further informed or cued.

In the disclosed embodiment, concurrently with the operation of further informing the caller, the interface processor 26 actuates the random number generator 40 to provide a random address for the question memory 38. The process step is illustrated in FIG. 2 by the block 66.

The random number (identifying a question in the memory 38) is also provided to the coincidence detector 42 to test for the previous use of the question to the calling terminal. In that regard, the interface processor 26 provides the caller telephone number (ANI) to the caller record 44 which may simply take the form of a look-up table addressed by calling numbers and revealing the identification of previous questions propounded. The addresses of questions previously recorded for a calling number are supplied to the coincidence detector 42 for comparison with the current tentative question identification number. The process step is illustrated by the query block 68 in FIG. 2.

If the tentative question has been previously used for the calling terminal, a signal is provided from the coincidence detector 42 to the interface processor prompting a repeat operation by the random number generator 40 to select another question.

Alternatively, if the tentative question is not a repeat, then the coincidence detector 42 qualifies the gate 46 and the tentative question is supplied to the interface processor 26 for actual use. Note that upon the occurrence of an approved question, the coincidence detector also supplies a signal to the call record 44 which records the identification number of the question. The process step is illustrated in FIG. 2 by the block 70.

With the provision of signals representing a question through the gate 46 to the interface processor 26, the internal voice generator is actuated to propound the question to the caller. Recognizing the vast possibilities for contest formats, one or more rather difficult questions might be propounded to isolate lottery participants. Alternatively, a relatively easy question may be propounded as a minor obstacle to participation in the final phase of the contest. In any event, as prompted or cued, the caller responds using the buttons 14 and the response is registered for testing within the interface processor 26. The process steps are indicated by the block 72 and the query block 74 in FIG. 2. The results of the tests are then stored in the interface result memory 36. Note that in the interests of human perception, a printed record may be developed concurrently with the qualification of lottery participants.

Final processing to determine a winner or winners may involve any of various operations as a drawing, an event, and so on. Accordingly, as indicated by the blocks 76 and 78, final determinations are made of winners and losers with predetermined prize allocations. Thus, the system of the present invention enables effective regulation and control of interfaces between persons at telephone stations and a central processing apparatus. Calls in various modes are accommodated with appropriate tests, and interface data (e.g. test questions) are qualified.

In view of the above descriptions, it will be apparent that the disclosed embodiment is susceptible to considerable modification in the implementation of the present invention in conjunction with a telephone system to accommodate caller interface operations. Although the disclosed embodiment is directed to a contest, it will be apparent that aspects of the system may be variously embodied to accommodate any of a variety of telephone interface operations. Furthermore, it will be apparent that while the disclosed embodiment comprises specific elements and configurations, any of a variety of structures might well be utilized. Accordingly, the scope hereof is deemed to be as set forth in the claims below.

What is claimed is:

1. A telephone call processing system for receiving calls through a telephone communication facility from a multitude of terminals for processing in a select interface format wherein callers are cued by voice signals supplied to said multitude of terminals and respond with digital signals, as by actuating push to said multitude of terminals and respond with digital signals, as by actuating push buttons at said multitude of terminals, said system receiving from the telephone communication systems digital signals indicative of DIS, said telephone call processing system comprising:

means for selectively receiving calls from said multitude of terminals in a plurality of call modes to establish telephone communication with a select subset of callers utilizing calling number identification signals automatically provided by the telephone communication facility, said select interface format selected by said digital signals indicative of DNIS;

means for receiving identification signals for said callers of said select subset;

means for individually cuing said callers of said select subset to provide digital signals that are entered by the callers, wherein at least certain of the cues and their responsive digital signals are a part of common processing operations to isolate a sub-subset of said callers; and means for storing identification signals for said callers of said sub-subset.

2. A telephone call processing system according to claim 1, further comprising.

a random number generator utilized during the common processing operations for isolating said sub-subset of said callers.

3. A telephone call processing system for receiving calls through a telephone communication facility from a multitude of terminals for processing in a select interface format wherein callers are cued by voice signals supplied to said multitude of terminals and respond with digital signals, as by actuating push buttons at said multitude of terminals, said telephone call processing system comprising:

means for receiving calls from said multitude of terminals in at least two or more call modes and establishing telephone communication to select a subset of callers based upon online responses provided by said select subset of callers to questions provided via a voice generator of the telephone call processing system, said means for receiving calls receiving and utilizing automatic number identification signals associated with a calling terminal automatically provided by the telephone communication facility;

means for providing identification signals entered by said callers of said select subset; and means for processing data relating to said callers of said select subset in accordance with common processing operations for calls received in the two or more call modes to isolate a sub-subset of said callers.

4. A telephone call processing system according to claim 3, further comprising:

a random number generator utilized during the common processing operations for isolating said sub-subset of said callers.

5. A telephone call processing system for receiving calls through a telephone communication facility from a multitude of terminals for processing in a select interface format wherein callers are cued by synthesized voice signals supplied to said multitude of terminals and respond with digital signals, as by actuating push buttons at said multitude of terminals, said telephone call processing system comprising:

means for selectively receiving calls from said multitude of terminals to establish telephone communication with a select subset of callers, said means for selectively receiving calls comprising means for receiving calls in a plurality of call modes including a toll free calling mode and a caller charge calling mode or an area code mode;

means for providing identification signals entered by said callers of said select subset;

means for individually cueing said callers of said select subset to prompt digital signals, wherein at least certain of the cues and their responsive digital signals are a part of common processing operations for the plurality of call modes to isolate a sub-subset of said callers; and means for storing identification signals for said callers of said sub-subset.

6. A telephone call processing system for receiving calls through a telephone communication facility from a multitude of terminals for processing in an interface format wherein callers are cued by synthesized voice signals supplied to said multitude of terminals and respond with digital signals, as by actuating push buttons at said multitude of terminals, said telephone call processing system comprising:

means for receiving calls from said multitude of terminals and establishing telephone communication to select a subset of callers based upon online responses provided by said select subset of callers to questions provided by a voice generator of the telephone call processing system, said means for receiving calls comprising means for receiving calls in a plurality of call modes including an "800" toll free calling mode and a caller charge calling mode or an area code mode;

means for receiving identification signals entered by said callers of said select subset; and means for processing data relating to said callers of said select subset in accordance with common operations for the plurality of call modes to isolate a sub-subset of said callers.

7. A process for receiving calls through a telephonic communication facility from a multitude of terminals in different call modes including a toll free call mode and an area code call mode and processing the calls in accordance with respective interface formats for the different call modes, wherein the process involves digital signals including digital signals provided by the multitude of terminals as for identification or data, comprising the steps of:

receiving calls in the toll free call mode and providing an interface format associated with the toll free call mode;

providing an identification number to facilitate participation via the toll free call mode;

verifying the participation number for approval receiving calls in the area code mode and providing another interface format associated with the area code mode;

providing preliminary automated greetings specific to respective interface formats associated with the toll free call mode and the area code mode, prior to execution of at least certain common operations of the interface formats; and concurrently processing the verified calls received in the toll free call mode and the calls received in the area code mode in accordance with at least certain common operations of the interface formats associated with the toll free and the area code call modes.

8. A process for receiving calls according to claim 7, wherein a data bank relating to a caller is accessed to reference data on a caller.

9. A process for receiving calls according to claim 7, wherein the respective interactive interface formats are associated with an information service.

10. A process for receiving calls according to claim 7, further comprising the steps of:

prompting callers calling from the multitude of terminals in the different call modes with multiple questions; and further receiving responses from the callers in the form of digital data developed by the multitude of terminals.

11. A process for receiving calls according to claim 10, further comprising the step of:

isolating a subset of callers based on the responses received from the callers.

12. A process for receiving calls according to claim 7, further comprising the steps of:

receiving the identification number in the form of a caller pin-number as digital signals provided by the multitude of terminals for identification; and wherein the verifying step includes testing to determine if the caller pin-number is eligible to participate.

13. A process for receiving calls according to claim 7, wherein the caller identification number is tested based on limited use.

14. A telephone call processing system according to claim 7, wherein the toll free call mode is an "800" call mode.

15. A process for receiving calls according to claim 7, further comprising the steps of:
prompting callers calling from the multitude of terminals in the different call modes with multiple questions; and
further receiving responses from the callers in the form of digital data developed by the multitude of terminals to isolate a subset of callers.

16. A process according to claim 7, further comprising the step of:
receiving called number identification signals (DNIS) automatically provided by the telephonic communication facility at least for the calls in the toll free call mode and selecting the respective interface format under control of the called number identification signals (DNIS).

17. A process according to claim 16, further comprising the Step of:
testing the identification number to control for previous use under control of the called number identification signal.

18. A process according to claim 16, further comprising the step of:
testing the identification number to control for limited use based on a limited period of time under control of the called number identification signals.

19. A process according to 7, further comprising the step of:
receiving calling number identification data automatically by the telephonic communication facility.

20. A process according to claim 19, further comprising the step of:
controlling certain of the operations of at least one of the formats under control of at least certain of the calling number identification signals.

21. A process for receiving calls through a communication facility from a multitude of terminals in an 800 call mode for processing data in accordance with an identified one of a plurality of interface formats and involving digital signals including digital signals provided by the multitude of terminals for identification or data, the process comprising the steps of:
receiving calls in the 800 call mode wherein digital signals indicative of at least a first called number (DNIS) identify a first interface format;
receiving calls in the 800 call mode wherein digital signals indicative of a second distinct called number (DNIS) identify a second interface format;
receiving calling number identification signals automatically provided by the communication facility to indicate calling terminal numbers for certain of the multitude of terminals to verify on-line the calls received for at least one of the two distinct called numbers to provide verified calls;
processing calls received in the 800 call mode for the two distinct called numbers in accordance with preliminary operations of the first and second interface formats, wherein the preliminary operations compromise:
providing a distinct automated greeting under control of the digital signals (DNIS) to callers calling at least one of the two distinct called numbers associated with the first and second formats in the 800 call mode; and
coupling the calls received in the 800 call mode for the two distinct called numbers wherein at least certain calls are verified calls for concurrent processing in accordance with common operations of the first and second interface formats.

22. A telephone call processing system according to claim 21, wherein the means for processing processes data provided by callers to update a databank relating to the callers.

23. A telephone call processing system according to claim 21, wherein the first response unit and the second response unit are incorporated within a single composite unit.

24. A process according to claim 21, further comprising the step of receiving caller data provided via the multitude of terminals and wherein verification of the calls received in the 800 call mode for at least one of the two distinct called numbers is based upon a test of the caller provided data based upon limited use.

25. A process according to claim 24, wherein the limited use is a one-time only use.

26. A process according to claim, 24, wherein the caller provided data includes digital signals indicative of a personal identification number.

27. A process according to claim 24, wherein the limited use limits use by callers during a single period of time.

28. A process according to claim 24, wherein the caller provided data includes caller pin-number data, which is subject to limited use.

29. A process according to claim 24, further comprising the step of:
storing the caller provided data or the calling number identification signals and restricting the extent of access to the identified one of the plurality of interface formats based on at least one of caller provided data or calling number identification data.

30. A process according to claim 24, wherein the caller data provided is used to update data for the callers in a data bank relating to the callers.

31. A process according to claim 21, further including memory means for storing the digital signal.

32. A process according to claim 21, further comprising the step of:
providing at least one voice prompt to solicit a response in the form of data entered interactively by the callers calling one of the two distinct called numbers associated with the 800 call mode.

33. A process according to claim 32, wherein at least certain of the data entered interactively is stored.

34. A process according to claim 33, wherein the step of providing at least one voice prompt is initiated upon receiving calling terminal numbers associated with at least certain terminals.

35. A process according to claim 21, wherein the calling number identification signals associated with at least certain terminals are used to access a data bank relating to calls from the terminals.

36. A process according to claim 35, wherein the data bank is updated with data relating to the calling number identification signals.

37. A process according to claim 21, wherein the step of verifying includes the step of tallying calls placed to at least one called number in the 800 call mode up to a predetermined limit.

38. A process according to claim 21, wherein the calling number identification signals are tested based on limited use.

39. A process according to claim 21, wherein at least one of the plurality of interface formats is an on-line processing format in real-time.

40. A process according to claim 21, wherein tic process includes multiple comparative processing operations at least a part of which occur during the common operations.

41. A process according to claim 21, wherein the step of concurrent processing of calls includes the step of processing to isolate a subset of callers.

42. A process according to claim 21, wherein at least one of the processing of interface formats is an information format.

43. A process according to claim 42, wherein the information format is a financial information format.

44. A process according to claim 43, wherein the financial information format includes provision of data on stocks and bonds.

45. A process according to claim 21, further comprising:
receiving data provided by the caller via the terminals; and
testing the caller provided data against stored data to determine approval for the caller.

46. A process according to claim 45, wherein there is further testing of the caller provided data against a record of previous use.

47. A process according to claim 45, wherein the testing step utilizes a coincidence detector and storage unit.

48. A process according to claim 21, wherein both the first and second interface formats for the first and second 800 call modes are financial information formats.

49. A process according to claim 21, further comprising the step of:
receiving and utilizing caller provided identification data or utilizing the calling number identifications signals to determine an appropriate cue for a caller.

50. A process according to claim 49, wherein the appropriate cue for a caller is determined by avoiding a cue previously provided to a caller.

51. A telephone call processing system for receiving calls through a telephonic communication facility from a multitude of terminals in a toll free call mode for processing data in accordance with distinct operating process formats and involving digital signals including called number identification signals (DNIS) automatically provided by the telephonic communication facility, the system comprising:
first response unit for receiving calls in the toll free call mode wherein the called number identification signals (DNIS) indicative of at least one of a plurality of distinct called numbers identifies one of the operating process formats;
voice generator means for prompting callers to enter data in response to at least one voice prompt wherein the data entered by the callers is used to update data for the callers in a database relating to the callers;
verification means for verifying at least the calls utilizing the one of the plurality of distinct called numbers in the toll free call mode received by the first response unit to provide verified calls based upon verifying caller entered identification data including caller personal identification data;
second response unit means for receiving calls in the toll free call mode wherein called number identification signals (DNIS) indicative of one other of the plurality of distinct called numbers identifies a different one of the operating process formats;
means for concurrently processing calls received by the first response unit means and the calls received by the second response unit for concurrent processing of data in accordance with at least certain common operations of the operating process formats; and
audio control unit for providing an automated greeting, prior to execution of the certain common operations, under the control of the called number identification signals (DNIS) to callers calling at least one of the distinct called numbers whereby the automated greeting is specific to the one of the plurality of distinct numbers.

52. A telephone call processing system according to claim 51, wherein the verification means verifies the calls in the toll free call mode base upon a test of caller entered identification data based upon limited use.

53. A telephone call processing system according to claim 52, wherein the limited use is a one-time only use.

54. A telephone call processing system according to claim 52, wherein the limited use limits use by callers during a single period of time.

55. A telephone call processing system according to claim 51, wherein the caller pin-number data is subject to limited use.

56. A telephone call processing system according to claim 51, wherein digital signals representing calling terminal numbers associated with at least certain terminals are automatically provided by the telephonic communication facility.

57. A telephone call processing system according to claim 56, further including memory means for storing the digital signals.

58. A telephone call processing system according to claim 56, wherein the verification means tests the digital signals representing calling terminal numbers associated with at least certain of the multitude terminals that are automatically provided from the telephonic communication facility.

59. A telephone call processing system according to claim 51, further including memory means for storing data and control means for restricting the extent of access to a select operating process format based on at least one of caller entered data or calling terminal data automatically provided by the telephonic communication facility.

60. A telephone call processing system according to claim 51, wherein the voice generator means prompts responses to at least one voice prompt in the form of data interactively provided by the callers calling at least one of the distinct called numbers.

61. A telephone call processing system according to claim 60, wherein at least one of the responses is stored.

62. A telephone call processing system according to claim 60, wherein the voice generator means prompts responses to at least one question upon receiving calling terminal numbers associated with the multitude of terminals that are automatically provided by the telephonic communication facility.

63. A telephone call processing system according to claim 51, wherein digital signals representing calling terminal numbers associated with at least certain terminals are automatically provided by the telephonic communication facility and are used t access a data bank relating to calls from the terminals.

64. A telephone call processing system according to claim 63, wherein the data bank is updated with data relating to the calling terminal numbers.

65. A telephone call processing system according to claim 51, wherein the verification means tallies calls placed to at least one of the toll free call mode distinct numbers up to a predetermined limit.

66. A telephone call processing system according to claim 51, wherein the data entered by the callers is used to update data for the callers in a data bank relating to the callers.

67. A telephone call processing system according to claim 51, wherein at least one of the distinct operating process formats is an on-line processing format in real-time.

68. A telephone call processing system according to claim 51, wherein the means for concurrently processing calls utilizes at least certain of multiple comparative processing operations as part of the common operations.

69. A telephone call processing system according to claim 51, wherein the means for concurrently processing calls, isolates a subset of callers.

70. A telephone call processing system according to claim 51, wherein at least one of the distinct operating process formats is a form of financial information format.

71. A telephone call processing system according to claim 70, wherein the financial information format includes provision of data on stocks and bonds.

72. A system according to claim 51, wherein the verification means tests the digital signals representing calling number identification signals associated with at least certain of the multitude of terminals for limited use.

73. A system according to claim 72, wherein the caller entered data is tested against stored data for approval.

74. A system according to claim 72, wherein there is testing of the caller entered data against a record of previous use.

75. A system according to claim 74, wherein the testing utilizes a coincidence detector and storage unit.

76. A system according to claim 51, wherein both the interface operating formats for the first response unit and the second response unit are financial information formats.

77. A system according to claim 51, wherein the means for concurrently processing together with the voice generator means utilizes caller entered identification data or calling number identification signals to determine an appropriate cue for a caller.

78. A system according to claim 77, wherein the appropriate cue is determined to avoid a cue previously provided to a caller.

79. A system according to claim 51, further comprising:
a third response unit for receiving calls in an area code mode.

80. A process for receiving calls through a communication facility from a multitude of terminals in an 800 call mode for processing data in accordance with an identified one of a plurality of interface formats and involving digital signals including digital signals provided by the multitude of terminals for identification or data, the process comprising the steps of:
receiving calls in the 800 call mode wherein digital signals indicative of at least a first called number (DNIS) identify a first interface format;
receiving calls in the 800 call mode wherein digital signals indicative of a second distinct called number (DNIS) identify a second interface format;
processing calls received in the 800 call mode for the two distinct called numbers in accordance with preliminary operations of the first and second interface formats, wherein the preliminary operations comprise at least the step of:
providing a distinct automated greeting voice prompt to callers calling at least one of the two distinct called numbers associated with the first and second formats in the 800 call mode;
receiving caller provided data entered by the callers and testing the caller entered data to verify on-line the calls received for at least one of the two distinct called numbers to provide verified calls; and
coupling the calls received in the 800 call mode for the two distinct called numbers wherein at least certain calls are verified calls for concurrent processing in accordance with at least certain common operations of the first and second interface formats.

81. A process according, to claim 80, further comprising the step of:
receiving caller data provided via the terminals and wherein verification of the calls received in the 800 call mode for at least one of the two distinct called numbers is based upon a test of the caller provided data based upon limited use.

82. A process according to claim 81, wherein the limited use is one-time only use.

83. A process according to claim 81, wherein the caller provided data includes digital signals indicative a personal identification number.

84. A process according to claim 81, wherein the limited use limits use by callers during a single period of time.

85. A process according, to claim 81, wherein the caller provided data includes caller pin-number data, which is subject to limited use.

86. A process according to claim 80, further comprising the step of:
receiving digital signals representing calling number identification signals associated with at least certain terminals that are tested.

87. A process according to claim 86, further comprising the step of:
storing the caller provided data or the calling number identification signals and restricting the extent of access to at least one of the first or second formats based on at least one of caller provided data or calling number identification data.

88. A process according to claim 87, wherein at least one of the plurality of interface formats is an information format.

89. A process according to claim 88, wherein the information format is a financial information format.

90. A process according to claim 89, wherein the financial information format includes provision of data on stocks and bonds.

91. A process according to claim 80, further comprising the step of:
providing at least one voice prompt to solicit a response in the form of data entered interactively by the callers calling at least one of two distinct called numbers associated with the 800 call mode.

92. A process according to claim 91, wherein at least certain of the data entered interactively is stored.

93. A process according to claim 91, wherein the step of providing at least one voice prompt is initiated upon receiving calling terminal numbers associated with at least certain terminals.

94. A process according to claim 80, wherein calling number identification signals associated with certain terminals are received and used to access a data bank relating to calls from the certain terminals.

95. A process according to claim 94, wherein the data bank is updated with data relating to the calling number identification signals.

96. A process according to claim 80, wherein the testing step includes the step of tallying calls placed to at least one number of the toll free call mode up to a predetermined limit.

97. A process according to claim 80, wherein the caller provided data is used to update data for the callers in a data bank relating to the callers.

98. A process according to claim 80, wherein the calling number identification signals are tested based on limited use.

99. A process according to claim 80, wherein at least one of the plurality of interface formats is an on-line processing format in real-time.

100. A process according to claim 80, wherein the process includes multiple comparative processing operations at least a process of which occur during the common operations.

101. A process according to claim 80, wherein the step of concurrent further processing of calls includes the step of processing to isolate a subset of callers.

102. A process according to claim 80, wherein the caller provided data is tested against stored data to determine approval for a caller.

103. A process according to claim 102, wherein there is testing of the caller provided data against a record of previous use.

104. A process according to claim 102, wherein the testing step utilizes a coincidence detector and storage unit.

105. A process according to claim 80, wherein both the first and second interface formats for the first and second 800 call modes are financial information formats.

106. A process according to claim 80, further comprising the step of utilizing caller entered identification data or calling number identifications signals to determine an appropriate cue for a caller.

107. A process according to claim 106, wherein the appropriate cue for a caller is determined by avoiding a cue previously provided to a caller.

* * * * *

UNITED STATES PATENT AND TRADEMARK OFFICE
CERTIFICATE OF CORRECTION

PATENT NO. : 6,434,223 B2
DATED : August 13, 2002
INVENTOR(S) : Ronald A. Katz

It is certified that error appears in the above-identified patent and that said Letters Patent is hereby corrected as shown below:

Title page,
Item [63], Related U.S. Application Data,
Please delete "07/260,104, filed on Oct. 20, 1998" and replace with the following:
-- 07/260,104, filed on Oct. 20, 1988 --
Please delete "07/018,244, on Feb. 27, 1987" and replace with the following:
-- 07/018,244, filed on Feb. 24, 1987 --

Column 10,
Line 52, after "push" please insert the following: -- buttons --
Line 56, please delete "DIS" and replace the following: -- DNIS --

Column 12,
Line 32, please delete "participation" and replace with the following: -- identification --

Column 13,
Line 24, please delete "Step" and replace with the following: -- step --
Line 27, please delete "signal" and replace with the following: -- signals --

Column 14,
Line 9, please delete "21" and replace with the following: -- 51 --
Line 12, please delete "21" and replace with the following: -- 51 --
Line 15, please delete "of receiving" and replace with the following:
-- of:
receiving --
Lines 31 and 34, please delete "caller provided" and replace with the
following: -- caller-provided --
Line 36, please delete "24" and replace with the following: -- 32 --
Line 40, please delete "signal" and replace with the following: -- signals --

Column 15,
Line 1, please delete "tic" and replace with the following: -- the --
Line 8, please delete "processing" and replace with the following: -- plurality --
Line 17, please delete "caller provided" and replace with the following:
-- caller-provided --
Line 20, please delete "caller provided" and replace with the following:
-- caller-provided --
Line 31, please delete "identifications" and replace with the following:
-- identification --
Lines 55-56, please delete "caller entered" and replace with the
following: -- caller-entered --

UNITED STATES PATENT AND TRADEMARK OFFICE
CERTIFICATE OF CORRECTION

PATENT NO.    : 6,434,223 B2
DATED         : August 13, 2002
INVENTOR(S)   : Ronald A. Katz It is certified that error appears in the above-identified patent and that said Letters Patent is hereby corrected as shown below:

Column 16,
Line 56, please delete "t" and replace with the following: -- to --

Column 17,
Line 21, please delete "72" and replace with the following: -- 51 --
Lines 21-22, please delete "caller entered" and replace with the following: -- caller-entered --
Line 26, please delete "74" and replace with the following: -- 73 --
Line 32, please delete "caller entered" and replace with the following:
-- caller-entered --
Line 50, please delete "first called" and replace with the following: -- first-called --
Line 51, please delete "first interface" and replace with the following:
-- first-interface --
Line 65, please delete "caller entered" and replace with the following:
-- caller-entered --

Column 18,
Line 11, please delete "caller provided" and replace with the following:
-- caller-provided --
Line 13, after "use is" please insert the following: -- a --
Lines 14-15, please delete "caller provided" and replace with the following:
-- caller-provided --
Line 15, after "indicative" please insert the following: -- of --
Lines 17-18, please delete "limited use" and replace with the following: -- limited-use --
Lines 19-20, please delete "caller provided" and replace with the following: -- caller-provided --
Line 32, please delete "caller provided" and replace with the following:
-- caller-provided --
Lines 63-64, please delete "caller provided" and replace with the following:
-- caller-provided --

UNITED STATES PATENT AND TRADEMARK OFFICE
CERTIFICATE OF CORRECTION

PATENT NO. : 6,434,223 B2
DATED : August 13, 2002
INVENTOR(S) : Ronald A. Katz

It is certified that error appears in the above-identified patent and that said Letters Patent is hereby corrected as shown below:

Column 19,
Line 6, please delete "process" and replace with the following: -- part --
Lines 10-11, please delete "caller provided" and replace with the following:
-- caller-provided --
Line 14, please delete "caller provided" and replace with the following:
-- caller-provided --

Column 20,
Line 7, after "step of" please insert the following: -- : --
Line 8, please delete "caller entered" and replace with the following: -- caller-entered --
Line 9, please delete "identifications" and replace with the following: -- identification --

Signed and Sealed this

Seventeenth Day of December, 2002

JAMES E. ROGAN
*Director of the United States Patent and Trademark Office*

(12) EX PARTE REEXAMINATION CERTIFICATE (10119th)
United States Patent
Katz

(10) Number: US 6,434,223 C1
(45) Certificate Issued: *Apr. 17, 2014

(54) TELEPHONE INTERFACE CALL PROCESSING SYSTEM WITH CALL SELECTIVITY

(75) Inventor: Ronald A. Katz, Los Angeles, CA (US)

(73) Assignee: General Electric Capital Corporation, Atlanta, GA (US)

Reexamination Request:
No. 90/008,051, Jun. 2, 2006

Reexamination Certificate for:
Patent No.: 6,434,223
Issued: Aug. 13, 2002
Appl. No.: 09/313,120
Filed: May 17, 1999

Certificate of Correction issued Dec. 17, 2002

(*) Notice: This patent is subject to a terminal disclaimer.

Related U.S. Application Data

(63) Continuation of application No. 08/480,185, filed on Jun. 7, 1995, now Pat. No. 5,974,120, which is a continuation of application No. 08/132,062, filed on Oct. 4, 1993, now Pat. No. 5,828,734, which is a continuation of application No. 07/779,762, filed on Oct. 21, 1991, now Pat. No. 5,251,252, which is a continuation of application No. 07/425,779, filed on Oct. 23, 1989, now Pat. No. 5,128,984, which is a continuation-in-part of application No. 07/312,792, filed on Feb. 21, 1989, now Pat. No. 5,073,929, which is a continuation-in-part of application No. 07/194,258, filed on May 16, 1988, now Pat. No. 4,845,739, which is a continuation-in-part of application No. 07/018,244, filed on Feb. 24, 1987, (Continued)

(51) Int. Cl.
*A63F 3/08* (2006.01)
*G07C 11/00* (2006.01)
*G07C 15/00* (2006.01)
*H04M 3/36* (2006.01)
*H04M 3/38* (2006.01)
*H04M 3/436* (2006.01)
*H04M 3/46* (2006.01)
*H04M 3/493* (2006.01)
*H04M 3/51* (2006.01)
*H04M 11/00* (2006.01)
*H04Q 3/00* (2006.01)
*H04Q 3/545* (2006.01)
*H04Q 3/66* (2006.01)
*H04Q 3/72* (2006.01)
*H04Q 3/74* (2006.01)
*H04M 3/42* (2006.01)
*H04M 3/50* (2006.01)
*H04Q 3/64* (2006.01)
*H04M 3/487* (2006.01)

(52) U.S. Cl.
USPC .................................. 379/93.13; 379/93.02

(58) Field of Classification Search
None
See application file for complete search history.

(56) References Cited

To view the complete listing of prior art documents cited during the proceeding for Reexamination Control Number 90/008,051, please refer to the USPTO's public Patent Application Information Retrieval (PAIR) system under the Display References tab.

*Primary Examiner* — Erik Kielen

(57) ABSTRACT

For use with a public telephone network CO incorporating a vast number of terminals T1-Tn, a system CS limits and controls interface access to implement voice-digital communication for statistical processing. The system CS accommodates calls in different modes, e.g. "800", "900" or area code and incorporates qualifying apparatus to restrict against caller misuse. Alternative calling modes are used to reach an interface facility that also affords some control based on calling terminal identification, e.g. as by ANI equipment.

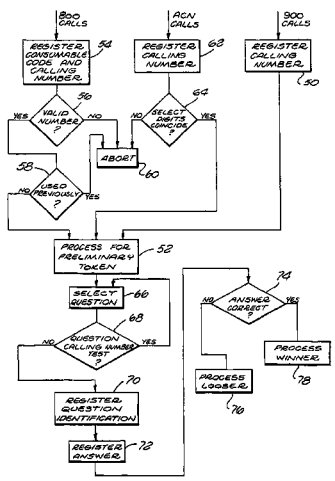

Related U.S. Application Data now Pat. No. 4,792,968, which is a continuation-in-part of application No. 06/753,299, filed on Jul. 10, 1985, now abandoned, said application No. 08/132,062 is a continuation-in-part of application No. 08/306,751, filed on Sep. 14, 1994, which is a continuation of application No. 08/047,241, filed on Apr. 13, 1993, now Pat. No. 5,351,285, and a continuation-in-part of application No. 07/640,337, filed on Jan. 11, 1991, now abandoned, which is a continuation of application No. 07/509,691, filed on Apr. 16, 1990, now abandoned, which is a continuation of application No. 07/335,923, filed on Apr. 10, 1989, now Pat. No. 6,016,334, which is a continuation of application No. 07/194,258, which is a continuation-in-part of application No. 07/018,244, which is a continuation-in-part of application No. 06/753,299, said application No. 07/509,691 is a continuation-in-part of application No. 07/260,104, filed on Oct. 20, 1988, now Pat. No. 4,930,150, which is a continuation-in-part of application No. 07/018,244, which is a continuation-in-part of application No. 06/753,299, filed on Jul. 10, 1985, now abandoned, said application No. 08/132,062 is a continuation-in-part of application No. 07/335,923, which is a continuation of application No. 07/194,258, which is a continuation-in-part of application No. 07/018,244, which is a continuation-in-part of application No. 06/753,299.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 80 is cancelled.

Claims 1-79 and 81-107 were not reexamined.

* * * * *